United States Patent [19]
Koizumi et al.

[11] Patent Number: 5,668,790
[45] Date of Patent: Sep. 16, 1997

[54] DISK REPRODUCING APPARATUS WITH PLURAL DISK TRAYS

[75] Inventors: Satoru Koizumi; Hiroshi Matsukawa; Hiroaki Miyashige, all of Higashihiroshima, Japan

[73] Assignee: Sharp Kabushiki Kaisha, Osaka, Japan

[21] Appl. No.: 536,464

[22] Filed: Sep. 29, 1995

[30] Foreign Application Priority Data

Jun. 7, 1995 [JP] Japan ................... 7-140953

[51] Int. Cl.$^6$ .......................... G11B 17/04
[52] U.S. Cl. ........................ 369/194; 369/178
[58] Field of Search ................ 369/191, 194, 369/178, 75.2, 77.1, 34, 37; 360/99.02, 99.03, 99.06, 99.07

[56] References Cited

U.S. PATENT DOCUMENTS

| 5,218,592 | 6/1993 | Isshiki et al. ............... 369/75.2 |
| 5,524,002 | 6/1996 | Morita et al. ................ 369/191 |
| 5,544,147 | 8/1996 | Koizumi et al. ............. 369/191 |

FOREIGN PATENT DOCUMENTS

| 61-80654 | 4/1986 | Japan. |
| 63-304480 | 12/1988 | Japan. |
| 6-195838 | 7/1994 | Japan ..................... 369/178 |

Primary Examiner—Stuart S. Levy
Assistant Examiner—William R. Korzuch

[57] ABSTRACT

A flexible rack member has a substantially V-shaped cam portion formed therein. There is a substantially U-shaped guide slit formed on a wall of a housing. A support bar projected from a reproducing unit is formed so as to fit in a cam portion through the guide slit. Further, tray racks are formed on respective side faces of each tray. Joint pins mounted on both end portions of the rack member are guided by a guide groove formed on each tray while being in mesh therewith. As a result, by moving the rack member between the trays, an up-and-down movement of the reproducing unit, a movement of the reproducing unit between the trays, and an opening and closing of each tray can be carried out successively. Additionally, there is a tray gear member as the only drive source, and a contact portion formed on the guide groove is a key to switch each operation. The described arrangement provides an inexpensive disk reproducing device which enables the operation to be switched with an accurate timing.

29 Claims, 33 Drawing Sheets

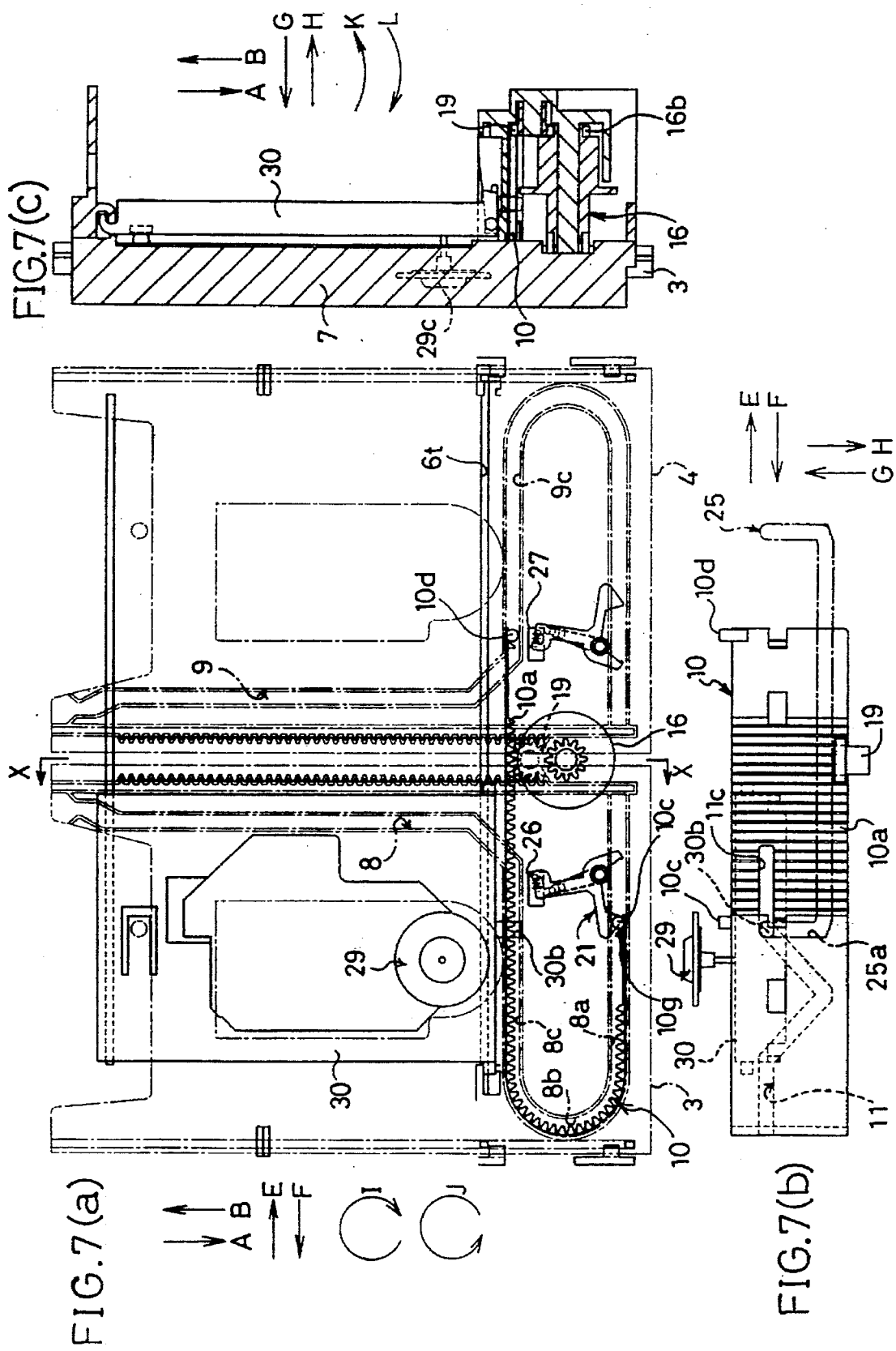

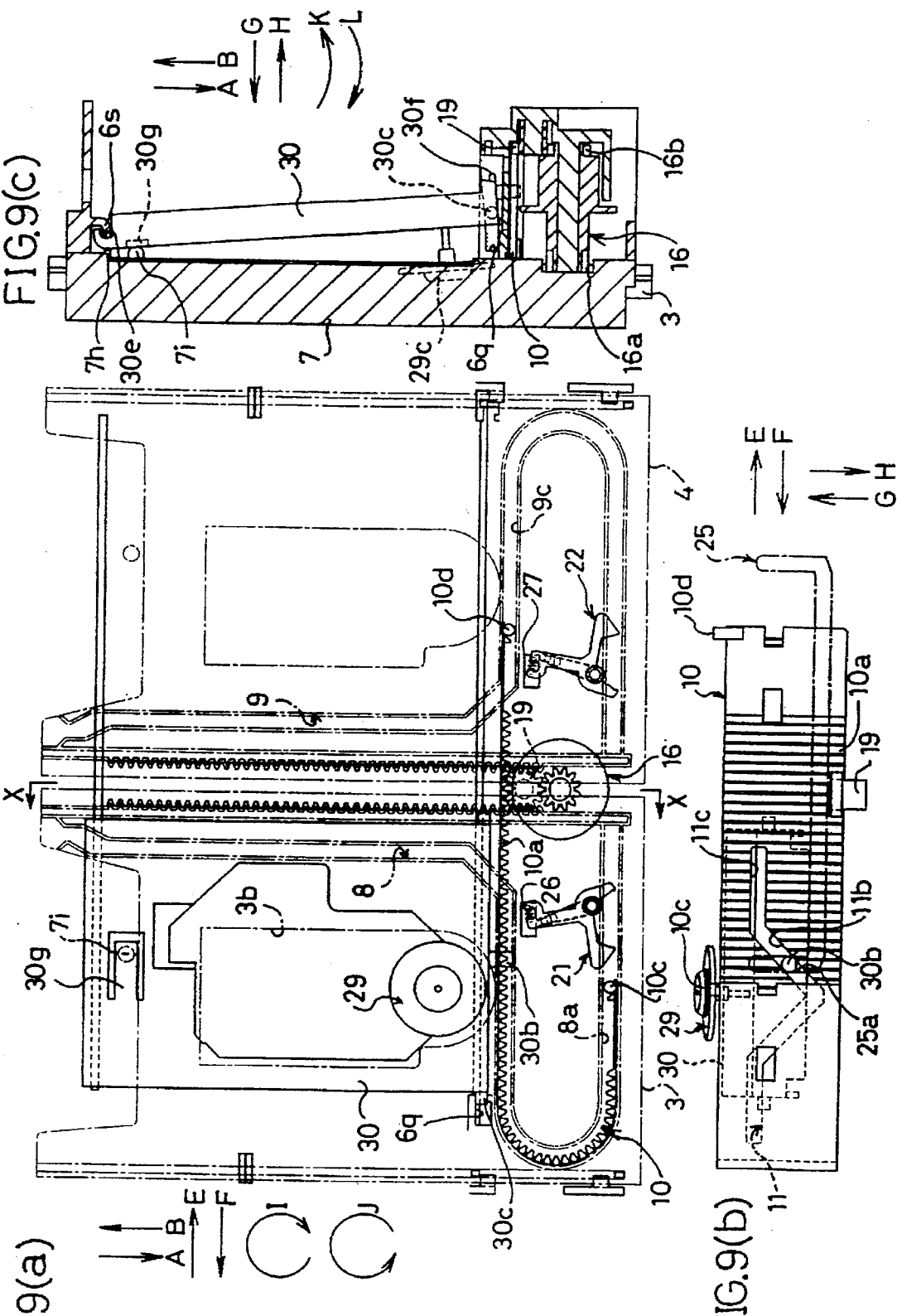

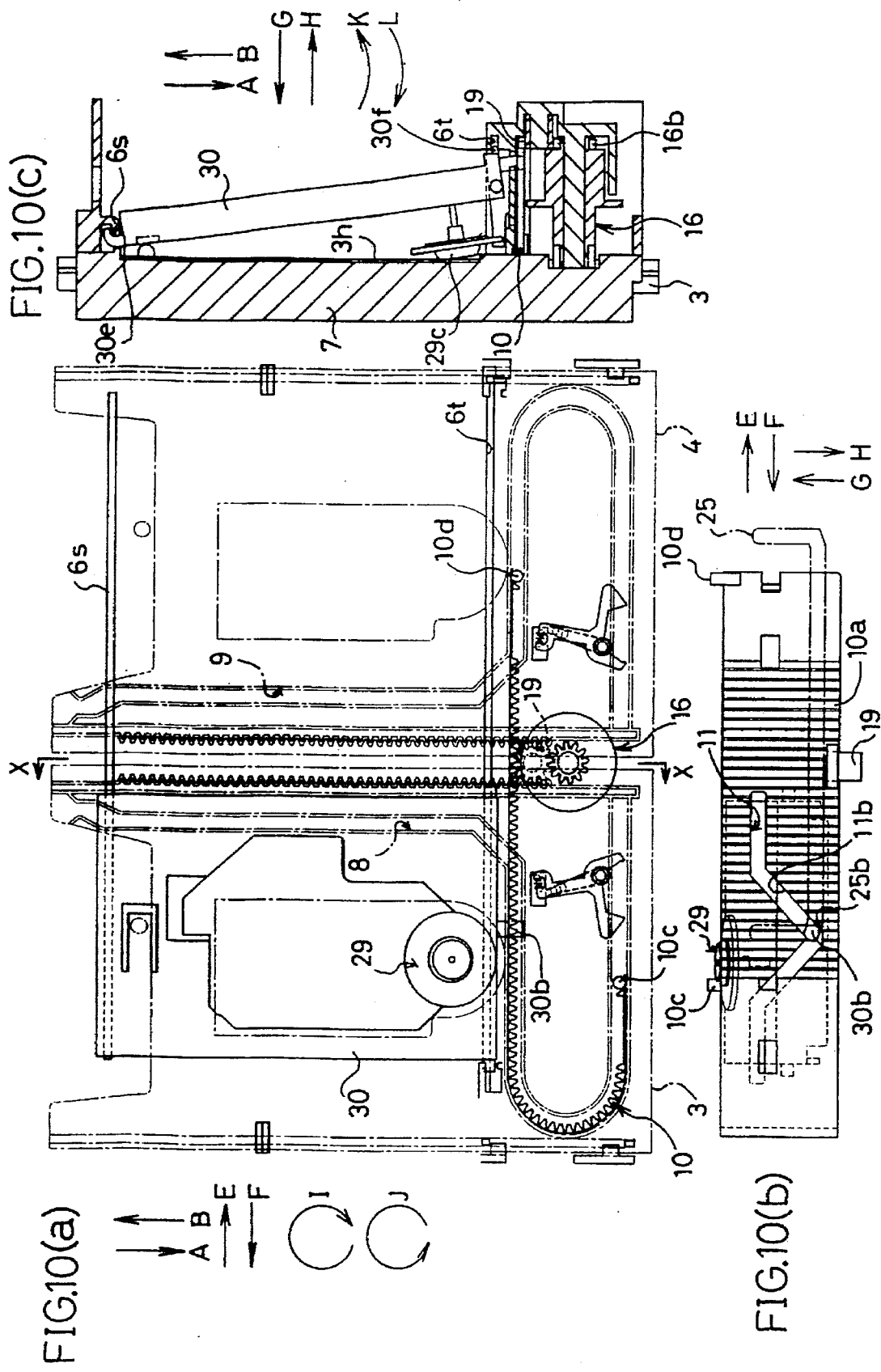

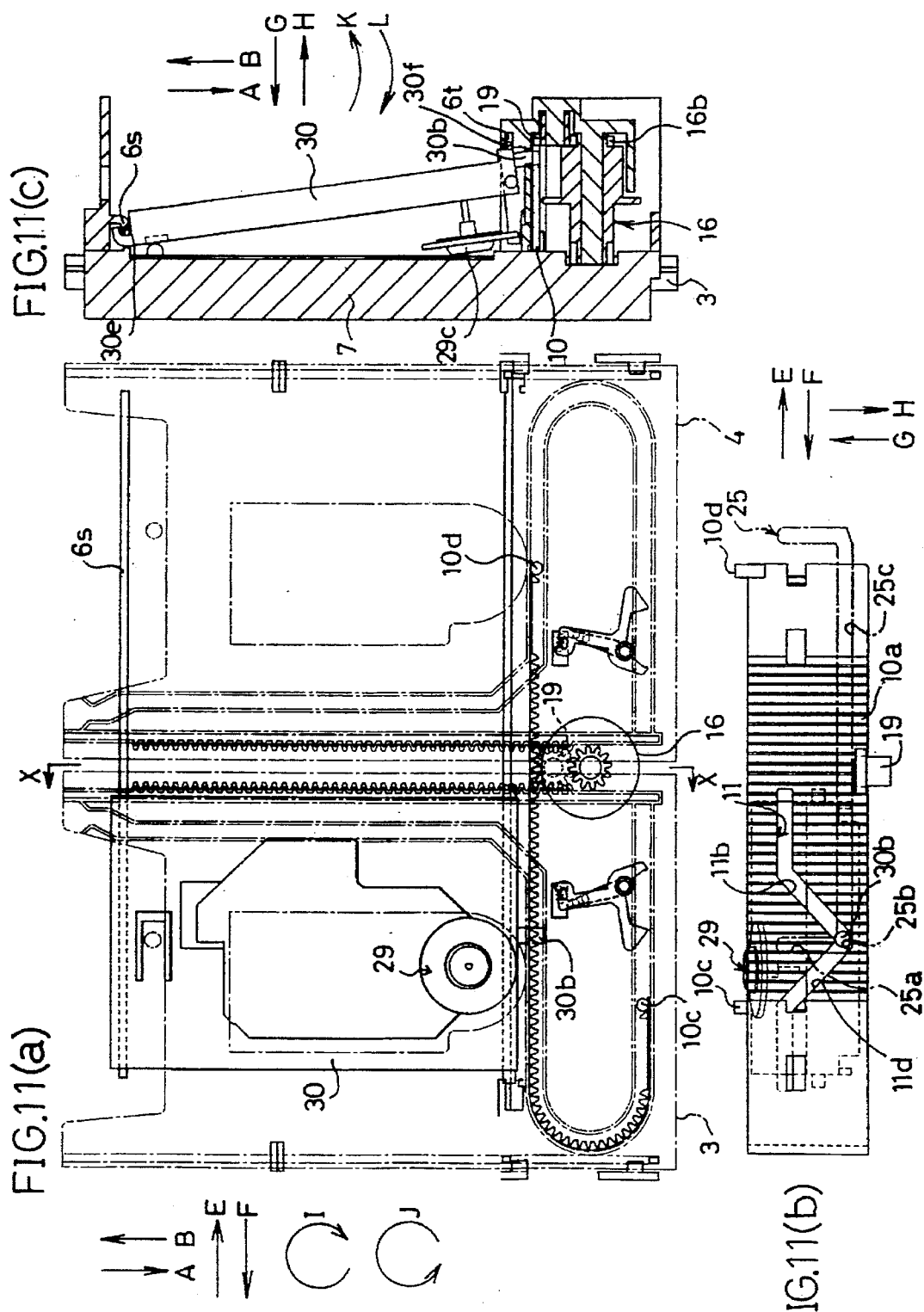

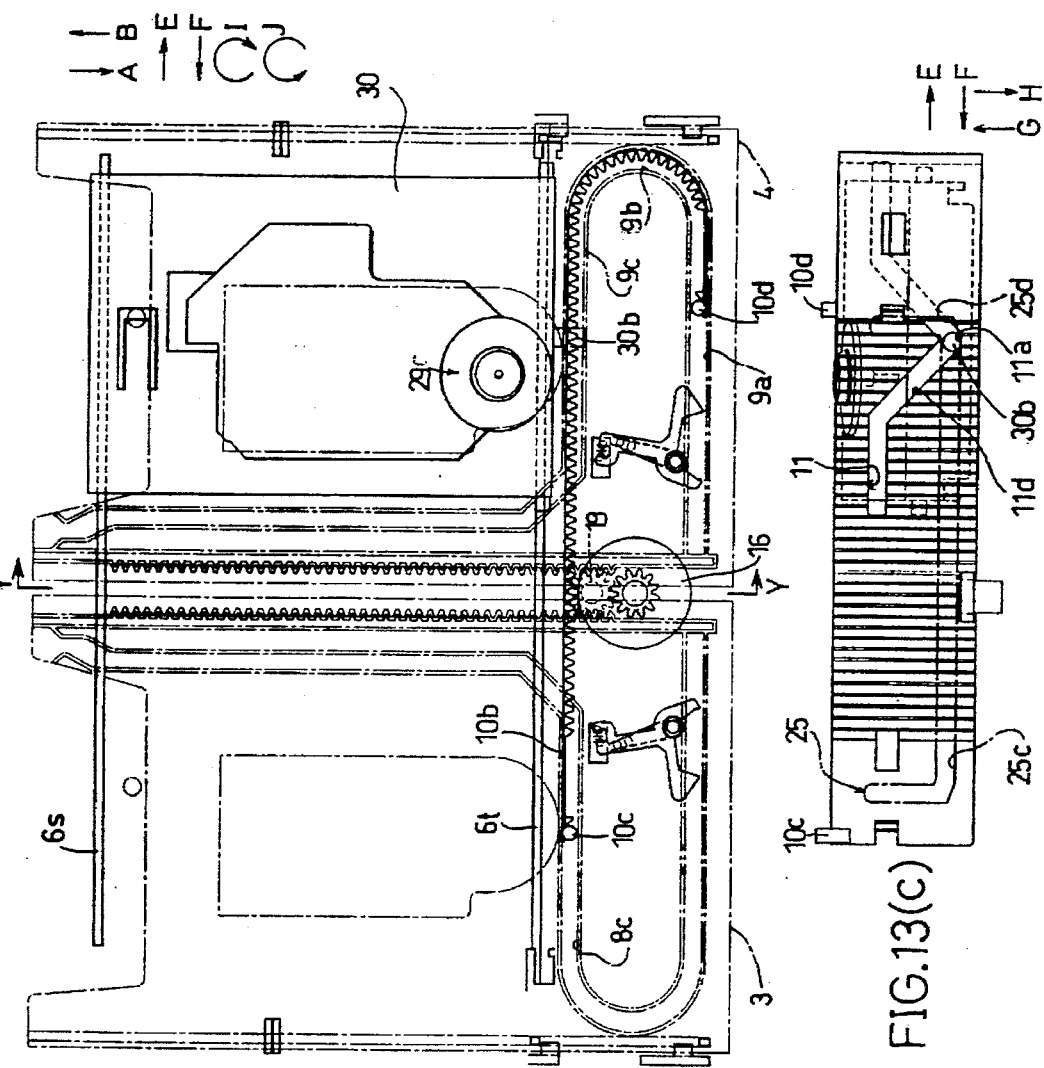
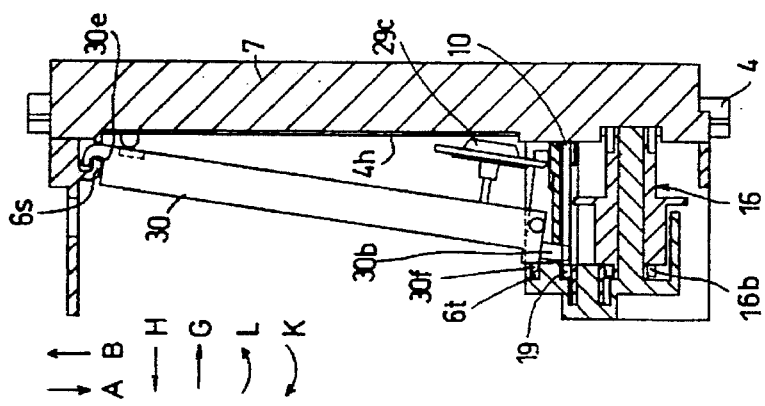
FIG.13(a) FIG.13(b) FIG.13(c)

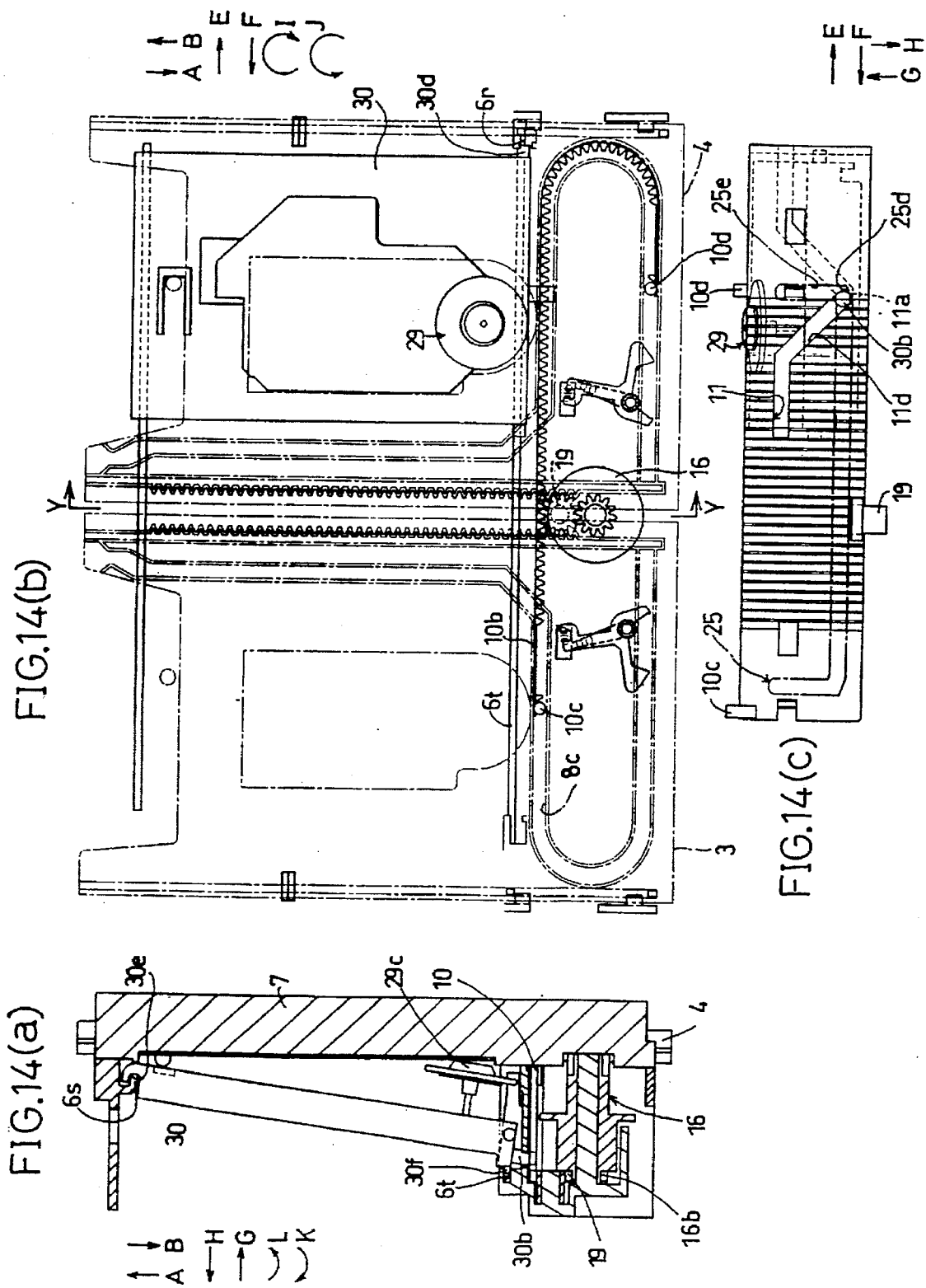

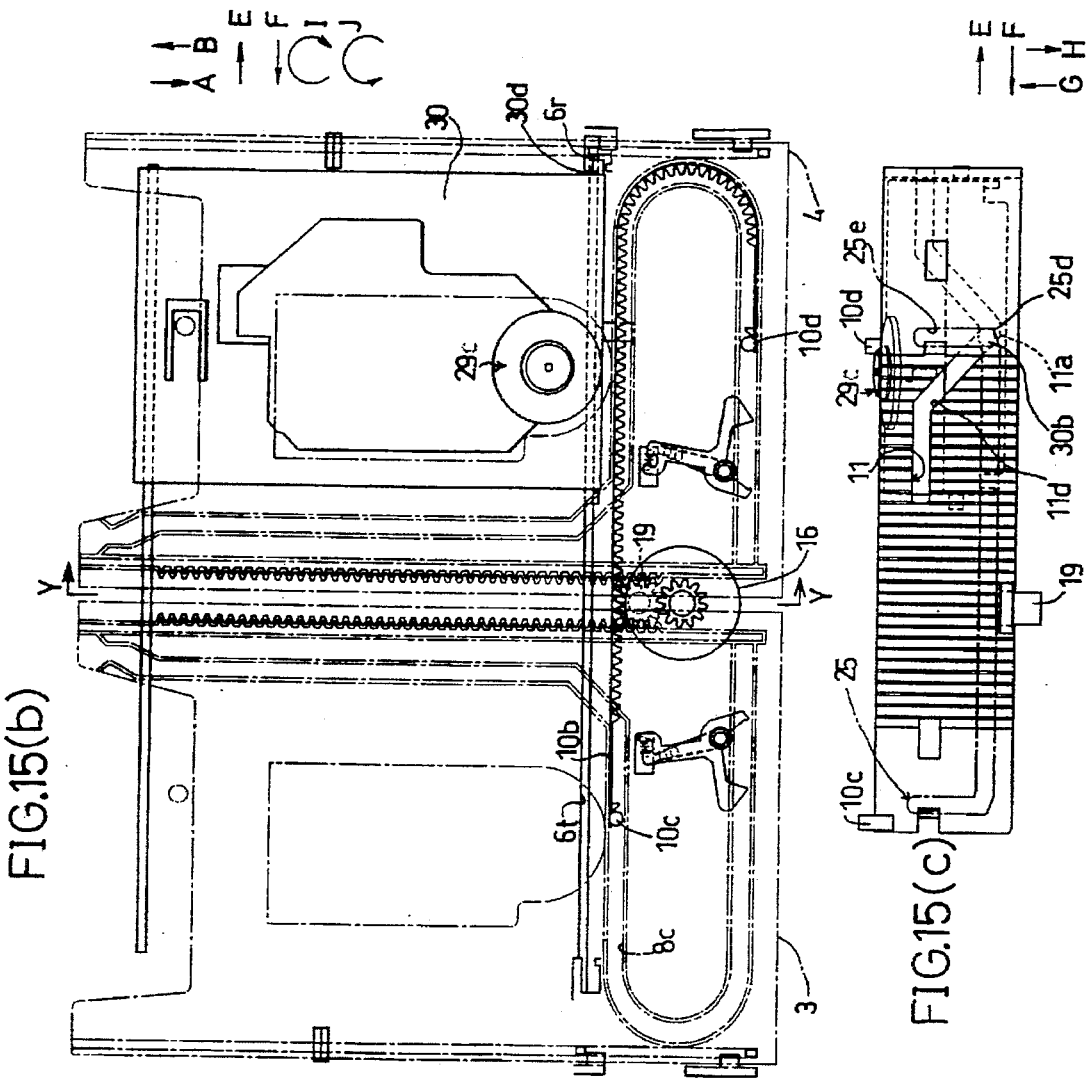

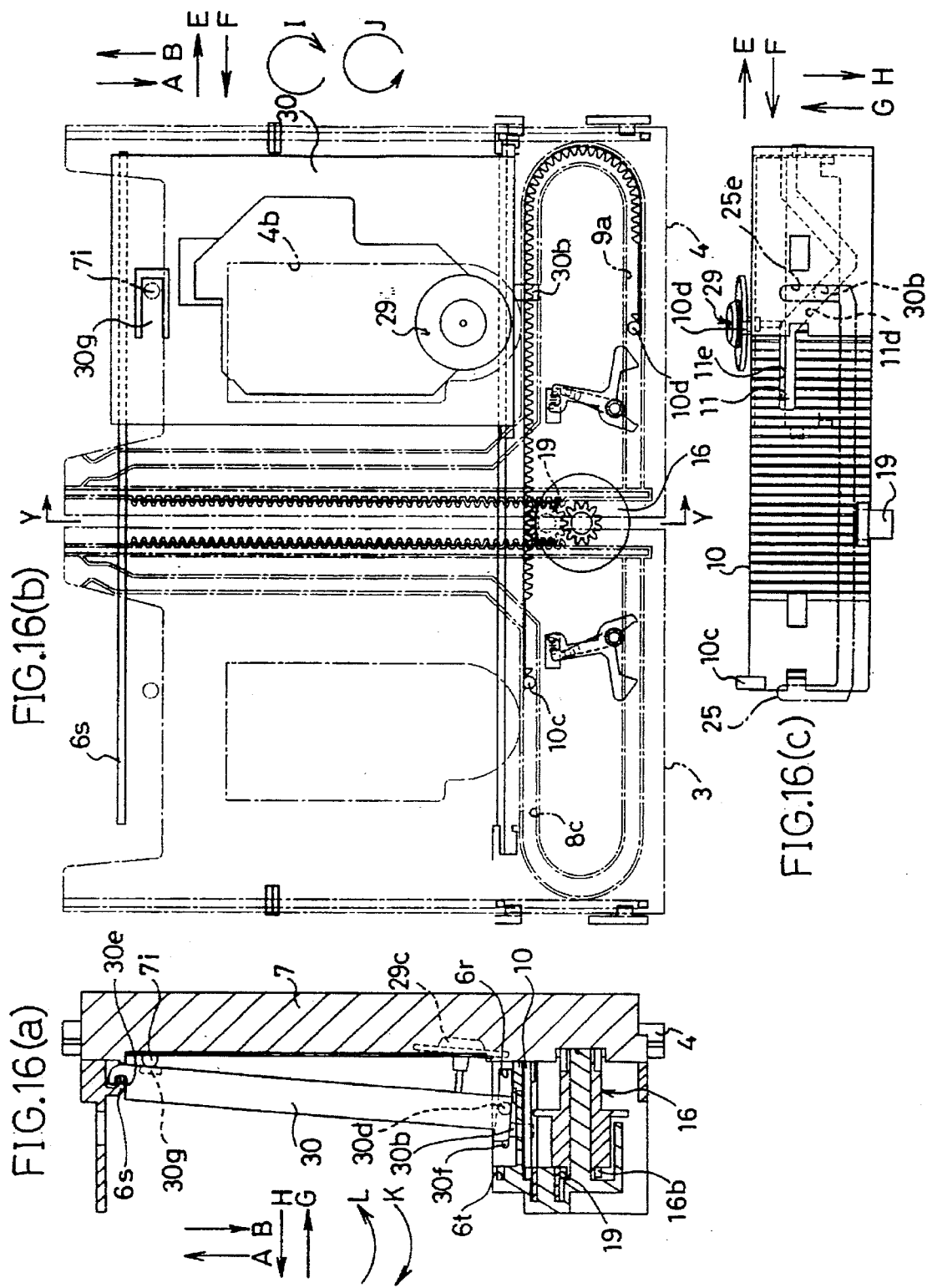

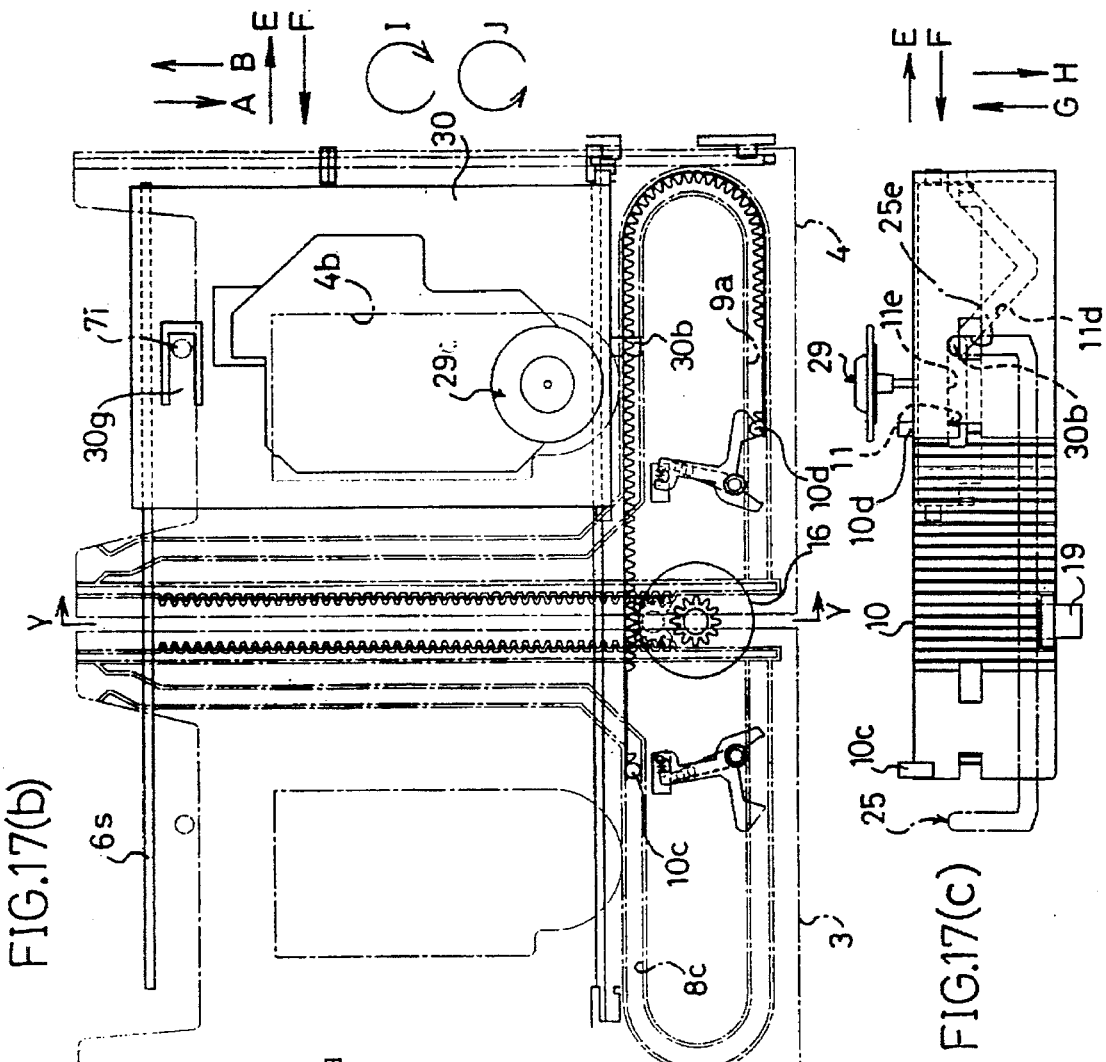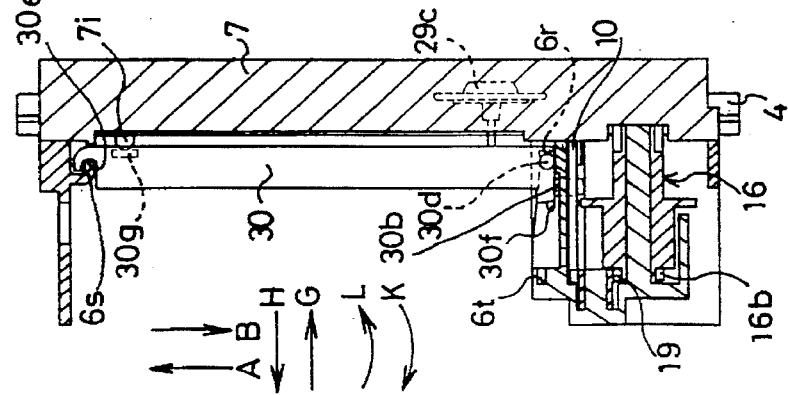

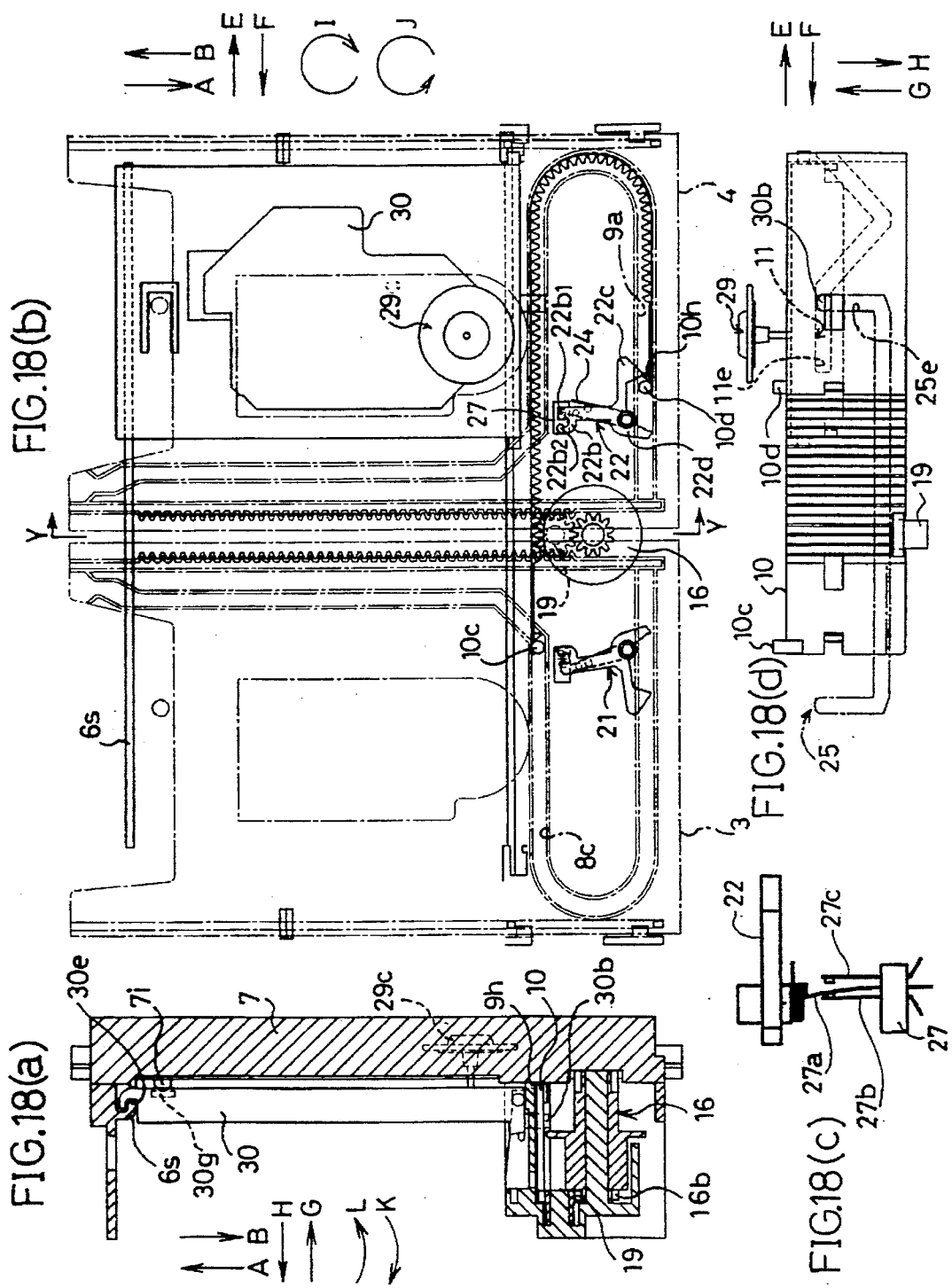

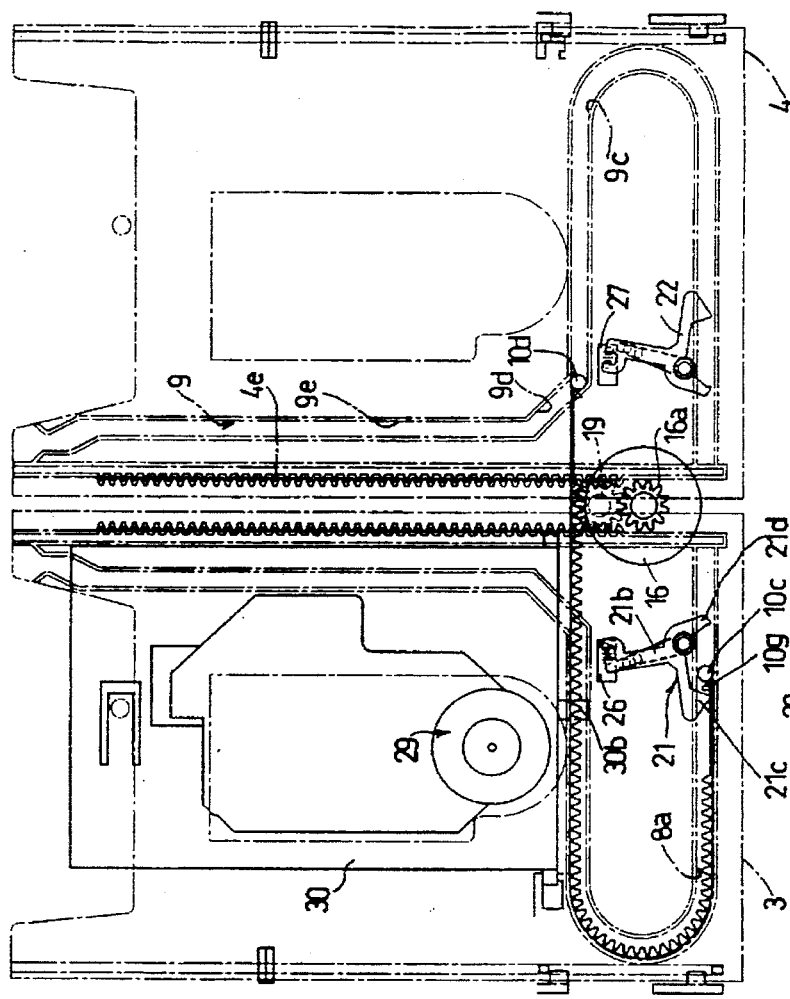
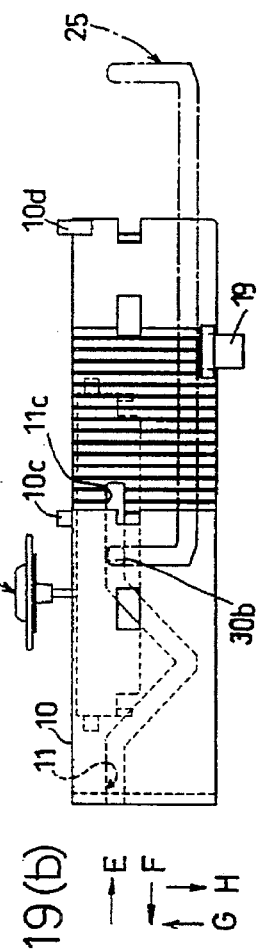
FIG.19(a)
FIG.19(b)

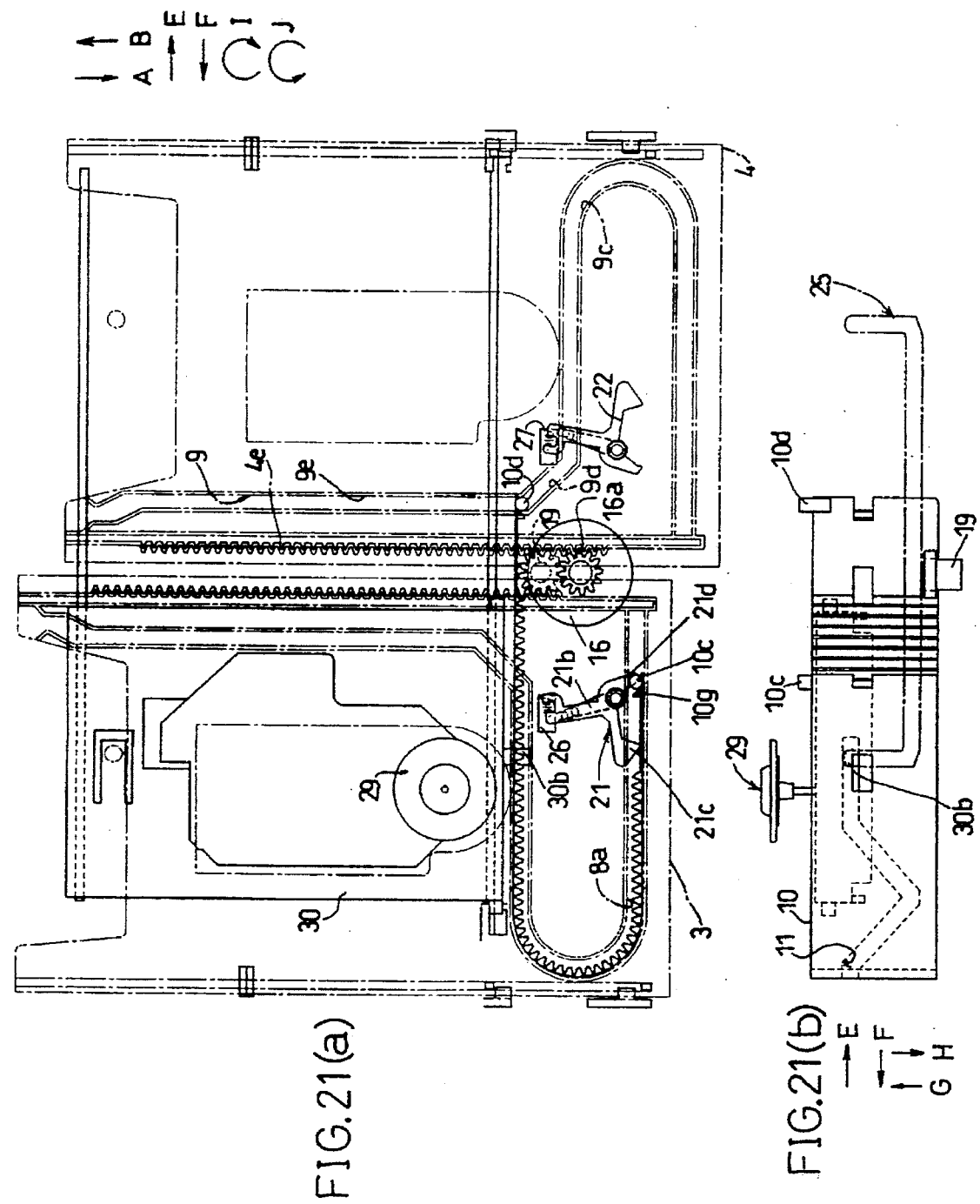

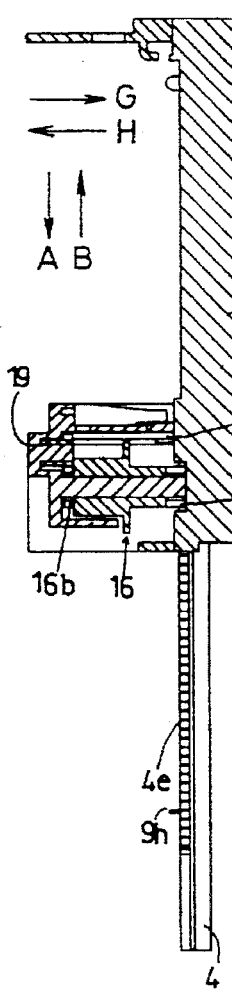
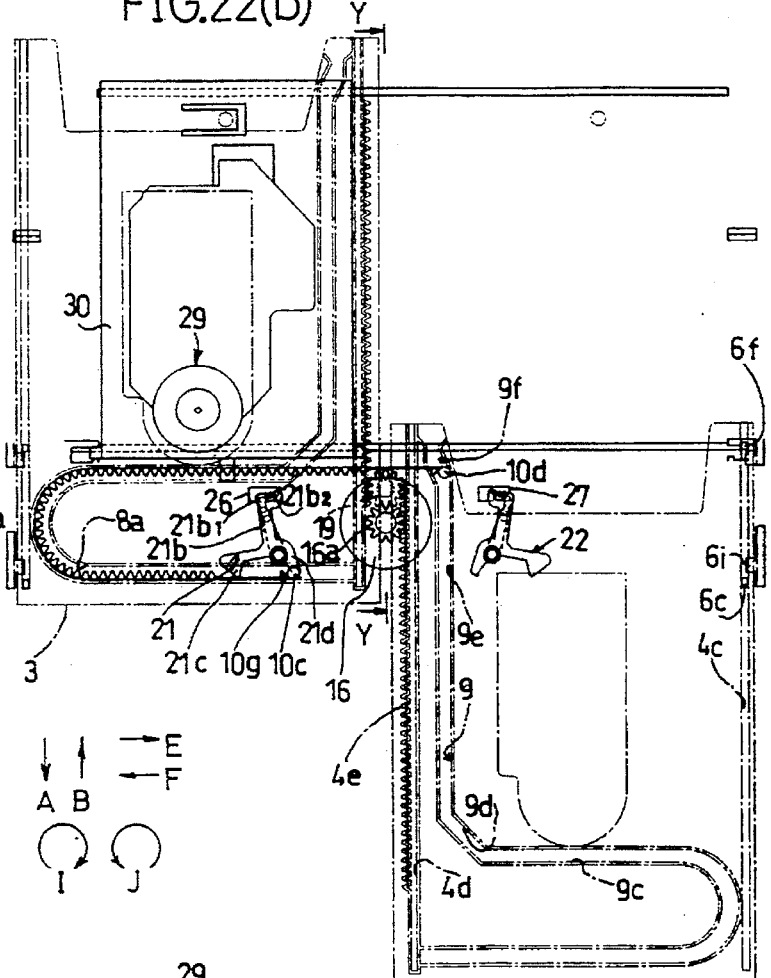
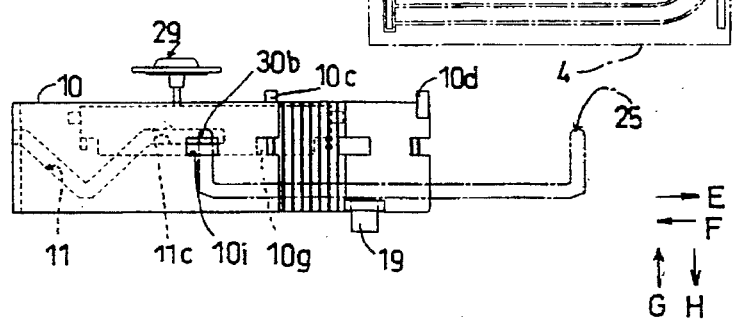

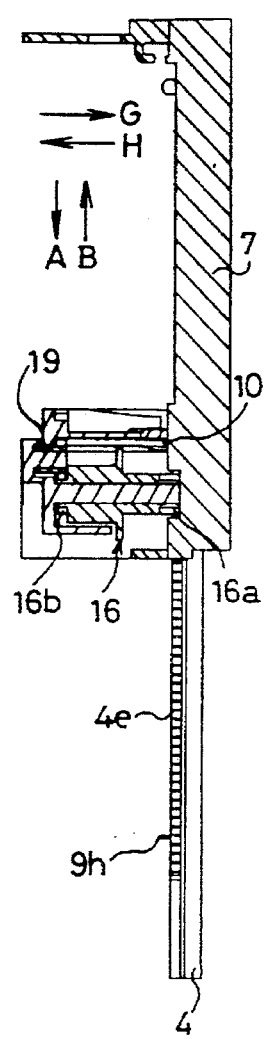
FIG.23(a)
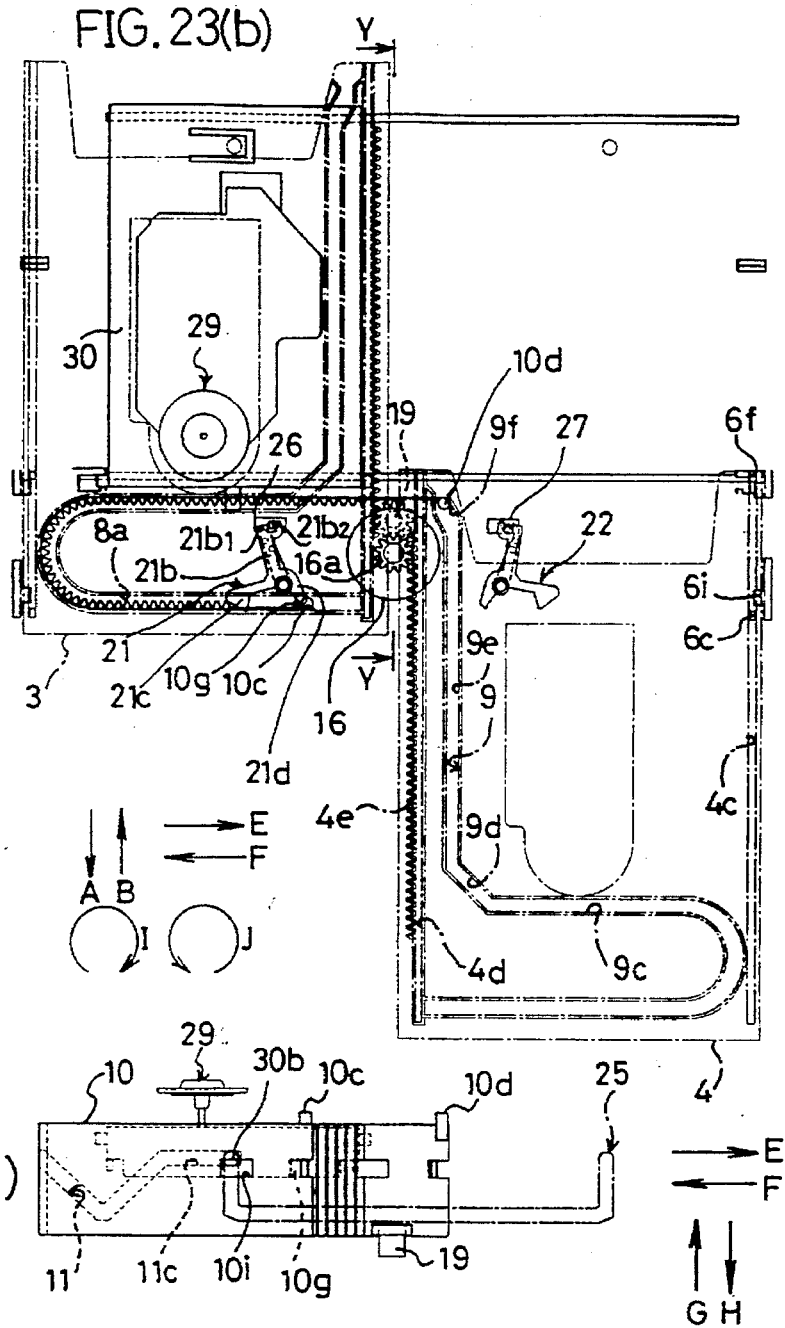
FIG.23(b)
FIG.23(c)
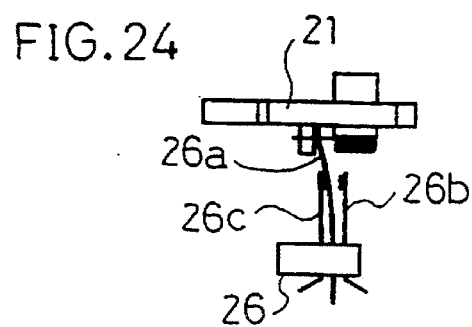
FIG.24

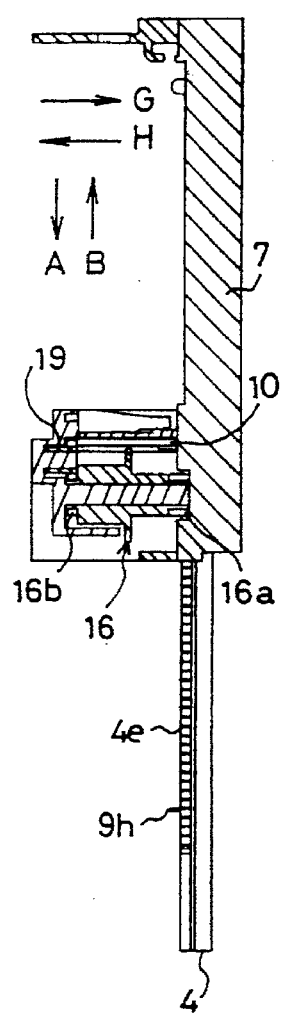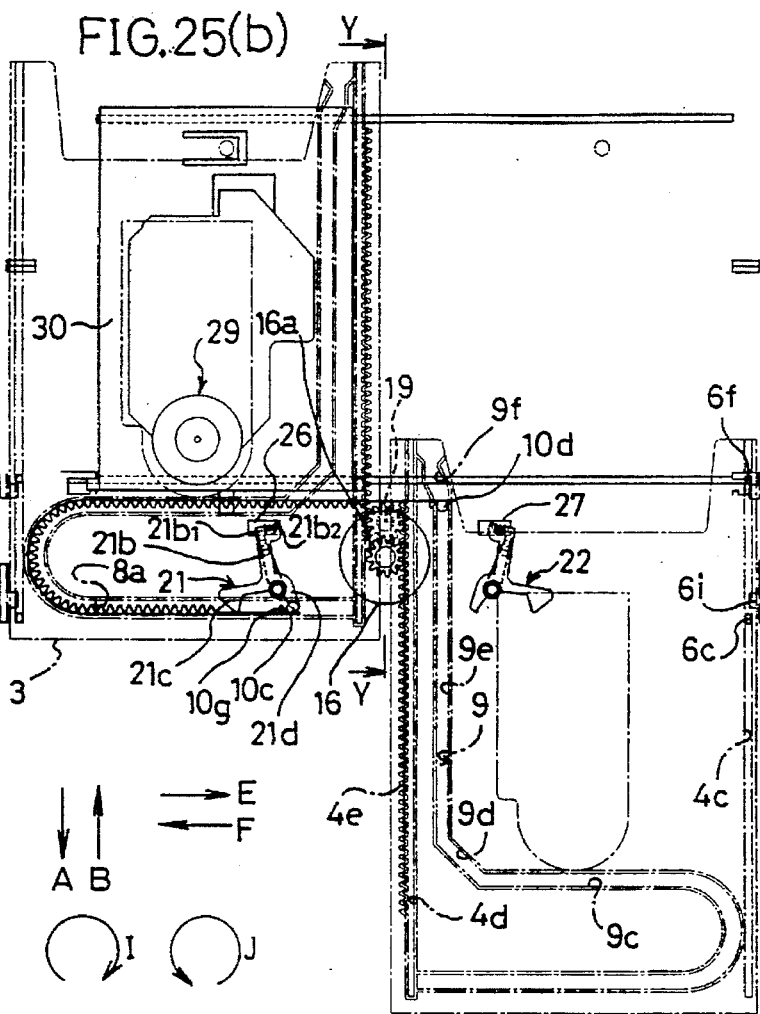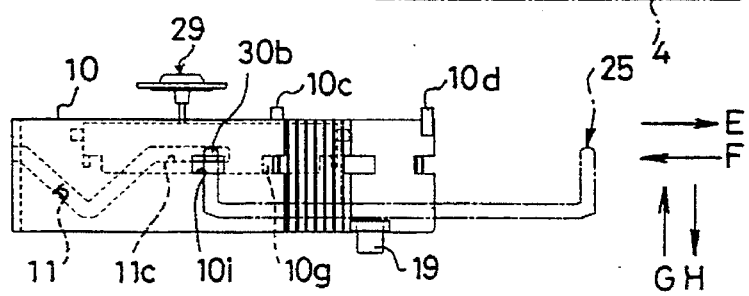

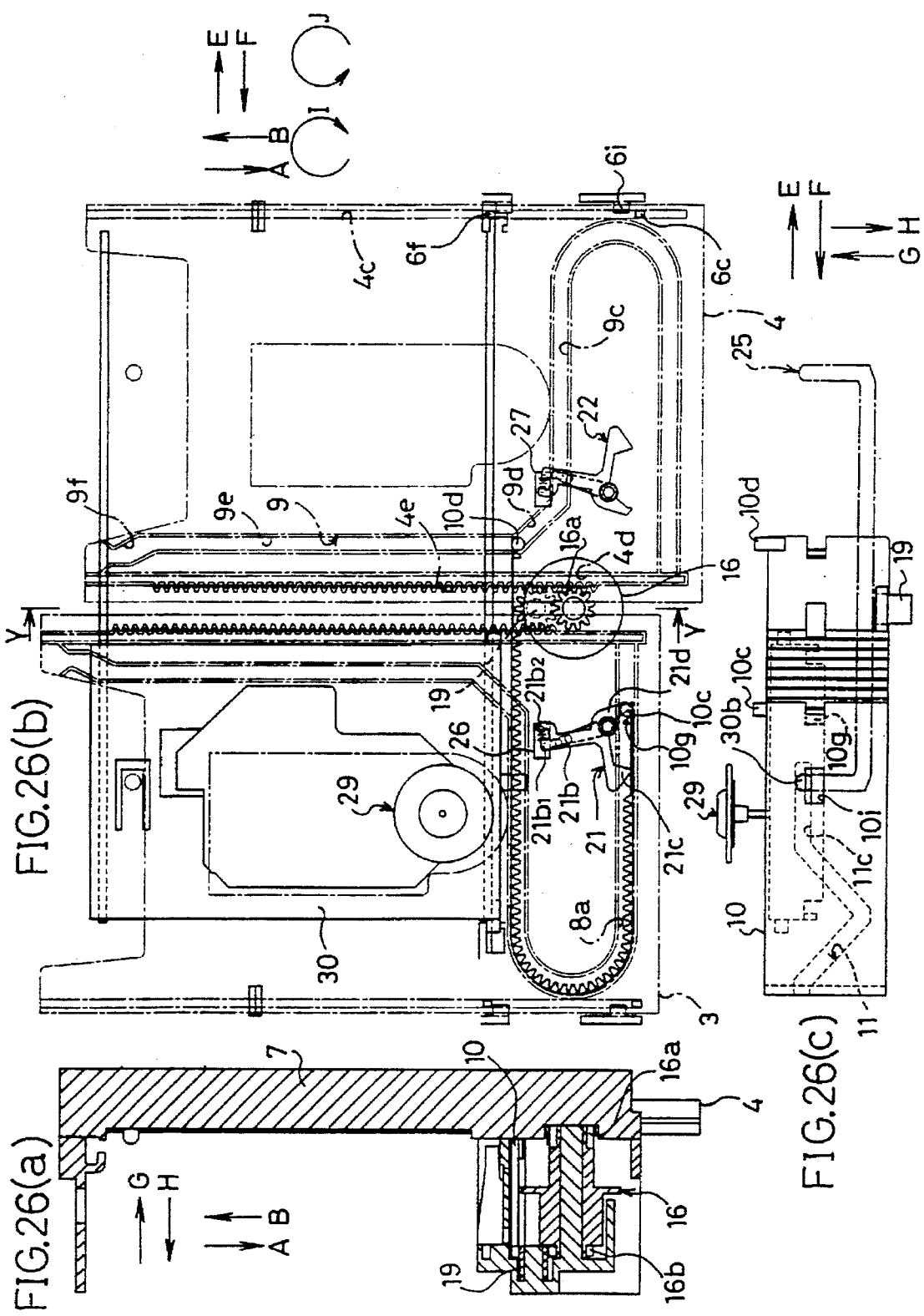

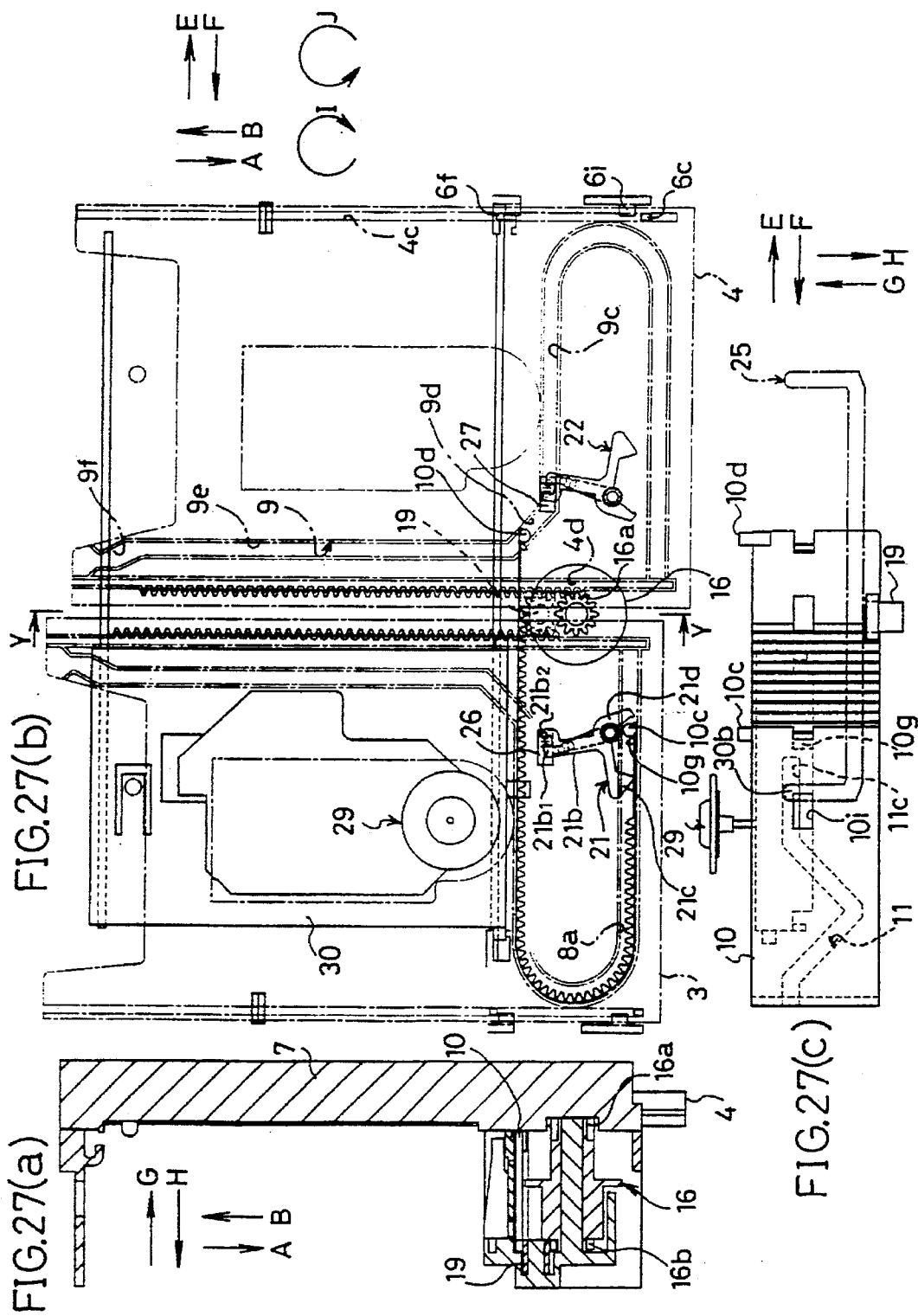

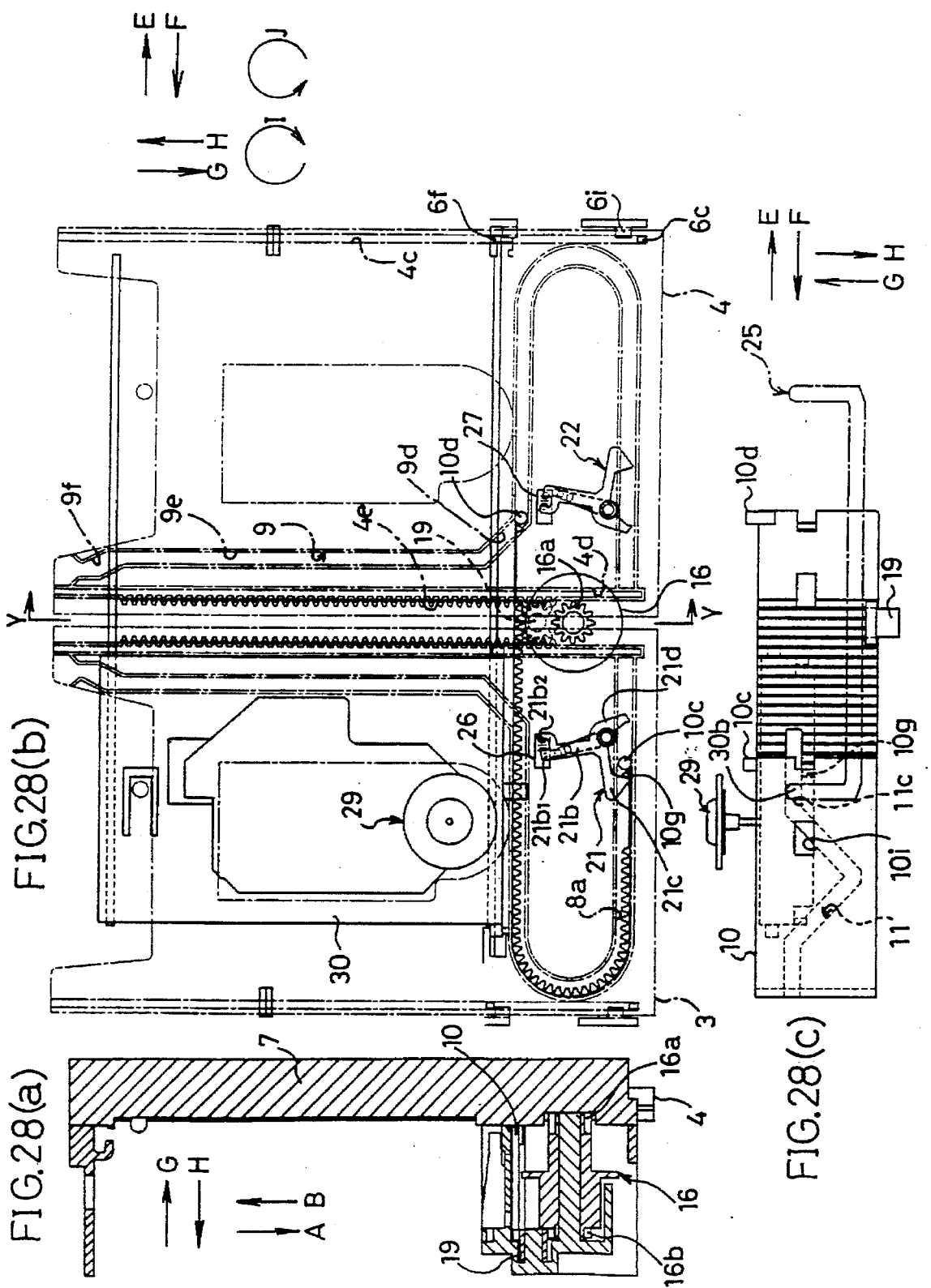

DISK REPRODUCING APPARATUS WITH PLURAL DISK TRAYS

FIELD OF THE INVENTION

The present invention relates to a disk drive device such as a disk reproducing device, etc., which is provided with plural disk trays for accommodating therein disks (recording medium) such as compact disks, etc., the disk drive device enabling, for example, during a reproducing operation from a selected disk accommodated in one of the plural disk trays, a disk accommodated in another disk tray to be exchanged for another disk, thereby permitting a continuous reproducing operation from the disks respectively accommodated in the plural disk trays.

BACKGROUND OF THE INVENTION

Recently, the demand for disks as recording media such as reproduction-only compact disks, recording-reproduction mini disks, etc., have been increasing. To meet the demand, the various modifications of disk drive devices provided with at least disk reproducing function have been proposed.

First Example of Prior Art

For example, Japanese Laid-Open Patent Publication No. 80654/1986 (Tokukaisho 61-80654) discloses a disk recording and reproducing device provided with two disk trays in a single cabinet of the device, which enables, during a reproducing operation from a disk accommodated in one disk tray, a disk accommodated in another disk tray to be exchanged for another disk.

More specifically, as shown in FIG. 30, two disk trays 201 and 202 are formed on a main body chassis 200 parallel with one another. The disk trays 201 and 202 are respectively capable of moving horizontally and in parallel with one another both in an M-direction, i.e., a forward direction of the disk recording and reproducing device and in an N-direction, i.e., an opposite direction to the M-direction. Hereinafter, the movement of the disk trays 201 and 202 in the M-N directions is referred to as a loading operation.

As a mechanism of generating a drive force for this loading operation, a loading drive section 203 is mounded to each of the disk trays 201 and 202. The loading drive section 203 includes a gear mechanism 203a and a loading motor 204. The rotations of the loading motor 204 are transmitted to a tray rack 205 formed on the side face of the disk tray 201 through the gear mechanism 203a, and is used in the loading operation of the disk tray 201.

As shown in FIG. 31, a reproduction drive section is stored in a sub-chassis 207. The reproduction drive section includes a disk motor (not shown) for generating a rotation drive force of a disk 206, an optical pickup and their driving mechanisms. The sub-chassis 207 pivots up and down about a bearing 208 formed at the end portion of the sub-chassis 207 in the N-direction. Also, the sub-chassis 207 fits in the bearing 208 so as to slide along a guide shaft extending in the O–P direction orthogonal to the M–N direction.

As a mechanism for generating a drive force for rotating the sub-chassis 207 up and down, an elevator drive section 210 is formed. On the other hand, as a mechanism of generating the drive force for sliding the sub-chassis 207 in the O–P direction, as shown in FIG. 32, a sliding movement drive section 211 is formed. FIG. 32 is a perspective view of the sub-chassis 207 and the sliding movement drive section 211 taken from the side of the bottom face.

The elevator drive section 210 shown in FIG. 31 includes an elevator motor 212 whose rotations are controlled both in forward and reverse directions, and a cam mechanism 213 for transforming the rotations of the elevator motor 212 to the up-down movement of the sub-chassis 207. The cam mechanism 213 includes a spiral elevator cam 213a and a pin 213b projected out of the side face of the sub-chassis 207. As a result, the rotations of the elevator motor 212 are transmitted to the elevator cam 213 through gears, and the pin 213b is driven by making a sliding contact with the spiral face of the elevator cam 213a, thereby enabling an up-down movement of the sub-chassis 207 about the bearing 208.

The sliding movement drive section 211 shown in FIG. 32 includes a slide motor 214 for generating a drive force for sliding the sub-chassis 207 in the O–P direction and a slide mechanism 215 composed of a gear and a rack.

As shown in FIG. 31, when reproducing recorded information from the disk 206, the disk 206 is made in tight contact with a turn table (not shown) by a clamper 216. The clamper 216 is moved up and down by an operation of a clamper elevator mechanism 217 formed in the inside of the sub-chassis 207.

According to the described arrangement, during the loading operation of the disk trays 201 and 202, the reproduction drive section is lowered by the operation of the elevator drive section 210. When the disk 206 is accommodated in the disk tray 201 or the disk tray 202, and the disk tray 201 or the disk tray 202 reaches its reproducible position, i.e., retreat position in the N-direction as being driven by the operation of the loading drive section 203, the disk drive section is raised by the operation of the elevator drive section 210. When the disk drive section is raised, the clamper 216 is simultaneously lowered on the disk 206 by the operation of the clamper elevator mechanism 217.

When one of the disk tray 201 and the disk tray 202 is in the reproducible position, a disk accommodated in the other one of the disk tray 201 and the disk tray 202 which is not in the reproducible state can be exchanged for another disk. Further, upon inputting an instruction of reproducing from the substituted disk, the reproduction drive section is lowered by the operation of the elevator driving section 210, and is moved between the disk trays 201 and 202 by the operation of the sliding movement drive section 211. Then, the reproduction drive section is raised again by the operation of the elevator drive section 210. The reproducing operation of the recorded information from the substituted disk is performed in the described manner.

As described, the disk recording and reproducing device disclosed by Japanese Laid-Open Patent Publication No. 80654/1986 (Tokukaisho 61-80654) includes means for moving the disk trays 201 and 202 in the M–N direction (tray moving means), and means for sliding the reproduction drive section in the O–P direction (reproduction drive section elevator means), wherein both disks respectively accommodated in the disk trays 201 and 202 are reproduced by a single reproduction drive section, and the disk trays 201 and 202 are moved outside of the cabinet when exchanging the disks accommodated therein.

In the described arrangement, the loading motor 204 is provided for each loading drive section 203, and the elevator motor 212 and the slide motor 214 are respectively formed in the elevator driving section 210 and the sliding movement drive section 211. This arrangement provides the following advantages. That is, since drive motors are provided independently for respective operations, an operation of each motor can be controlled independently by a control circuit at any timing as desired. However, the described arrangement is not desirable in the term of cost as a significant cost increase of the disk recording and reproducing apparatus is expected due to the cost incurred on the motors, wires, assembly, etc. Moreover, as a greater number of components are required, it is difficult to reduce the weight and size of the disk recording and reproducing device.

Second Example of Prior Art

A loading device for a compact disk player having the arrangement which resolves the described problem is disclosed by the Japanese Laid-Open Patent Publication No. 304480/1988 (Tokukaisho 63-304480). The loading device includes two disk trays formed in parallel to one another and tray moving means having independent drive sources for respective disk trays as in the case of the First Prior Art.

As shown in FIG. 33, as the reproduction drive section moving means, a swing gear 222 which is substantially fan shaped shape is formed. One end of the swing gear 222 is supported by a shaft, and upon receiving rotations of a drive motor (not shown), the swing gear 222 is rotated parallel to the surface whereon the disk trays 220 and 221 are formed in parallel from one another. As shown in FIG. 34, the disk drive section 223 is supported by a shaft integrally with the swing gear 222 so that the reproduction drive section 223 is placed above the swing gear 222, thereby enabling an up-down movement of the reproduction drive section 223 about a shaft 224.

As the reproduction drive section elevator means, a base member 225 and an elevator cam mechanism 226 formed on the base member 225 are provided. The base member 225 is integrally formed with the swing gear 222 between the swing gear 222 and the reproduction drive section 223. The elevator cam mechanism 226 is accommodated in the base member 225, and the reproduction drive section 223 is moved up and down facing the disk tray 220 or the disk tray 221. The elevator cam mechanism 226 includes a main gear 226a for receiving rotations of the drive motor, an inclined face 226b formed on the upper surface of the main gear 226a and a projection 226c projected out of the lower surface of the reproduction drive section 223 near the inclined face 226b. Assumed here that the moving-out direction of the disk trays 220 and 221 is the forward direction of the loading device, the front face side of the upper face of the main gear 226a is a plane face, and the inclined face 226b is sloped upward from a middle portion to the backward.

As shown in FIG. 33, on the lower face of the main gear 226a, formed is a cam groove 227, and a switching lever 228 is supported by a shaft on the upper surface of the switching gear 222 in a vicinity of the main gear 226a. On the switching lever 228, a pin (not shown) is formed in such a manner that the leading end thereof fits in the cam groove 227. In the vicinity of the rotation end of the switching lever 228, provided are an UP switch 229 and a DOWN switch 230 which detect the stop timing of the rotation of the drive motor. The switches 229 and 230 are respectively fixed to a base member (not shown), which are integrally rotated with the switching gear 222.

By the described arrangement, for example, when reproducing from a disk accommodated in the disk tray 221, the switching gear 222 is rotated to the side of the disk tray 221 by receiving the rotation force from a drive motor in the state where the reproduction drive section 223 is lowered. In the meantime, the main gear 226a is rotated in a clockwise direction by the rotations of the same drive motor. As a result, the projection 226c of the reproduction drive section 223 is in sliding contact with the inclined face 226b formed on the main gear 226a, and the projection 226c slides up along the inclined face 226b. As a result, the reproduction drive section 223 is raised to the disk tray 221. Moreover, by guiding the pin of the switching lever 228 to a vicinity of the end of the cam groove 227, the rotation end of the switching lever 228 switches the UP switch 229 ON.

When the UP switch 229 is switched ON, the rotation of the drive motor will be stopped after a predetermined time elapses, and thus a position to which the reproduction drive section 223 is raised can be determined.

On the other hand, when exchanging the disk on the disk tray 221, by rotating the main gear 226a in a counterclockwise direction, the projection 226c slides down along the inclined face 226b while contacting therewith, and thus the reproduction drive section 223 is lowered. In the meantime, by guiding the pin of the switching lever 228 to a vicinity of the center of the cam groove 227, the rotation end of the switching lever 228 switches the DOWN switch 230 ON, and it is detected that the reproduction drive section 223 is lowered, thereby stopping the rotations of the drive motor. As a result, the exchange of the disk in the tray 221 is permitted.

Furthermore, when moving the reproduction drive section 223 to the disk tray 220, by continuing the rotation of the drive motor even after the DOWN switch 230 is switched ON, the swing gear 222 is moved to the side of the disk tray 222 in the state where the reproduction drive section 223 is lowered.

As described, in the loading device disclosed by the Japanese Laid-Open Patent Publication No. 63-304480 (Tokukaisho 63-304480), by rotating the cam of an inclined face, the reproduction drive section moving means and the reproduction drive section elevator means receive the drive force from the single drive motor.

The operation of the reproduction drive section moving means is based on the rotating movement of the swing gear 222, while the operation of the reproduction drive section elevator means is based on the rotation movement of the inclined face 226b. Therefore, both the reproduction drive section moving means and the reproduction drive section elevator means perform the rotation movements. This arrangement has an advantage over the arrangement of the First Example of Prior Art where one of the reproduction drive section moving means performs a linear movement as the design for the device can be simplified.

In the arrangement of the Second Example of Prior Art, however, although the number of drive motors is reduced by one from the arrangement of the First Prior Art, two drive motors are required for the tray moving means. Therefore, a sufficient cost reduction cannot be achieved from this arrangement.

Furthermore, in order to allow the reproduction drive section to pivot between the disk trays, a rotation space with a radial diameter of at least the distance from the rotation shaft to the rotation end of the reproduction drive section is required. Therefore, the total width of the disk drive device in which two disk trays are horizontally aligned in parallel from one another must be set sufficient to ensure the rotation space, thereby hindering the reduction in size of the disk reproducing device.

SUMMARY OF THE INVENTION

In accordance with the present invention, there is provided a disk reproducing device including tray moving means, reproduction drive unit moving means and reproduction drive unit elevator means, which permits a reproduction from a disk accommodated in each disk tray by a reproduction drive unit in a predetermined process and also permits an exchange of a disk by moving the disk trays in respective unloading positions. An object of the present invention is to provide the described disk reproducing device which offers the following effects:

(a) a cost of the disk reproducing device can be significantly reduced by adopting only the single drive source for driving the above-mentioned three means;

(b) the disk reproducing device can be significantly reduced in size; and (c) the following effects are achieved by overcoming various difficulties associated in achieving the effect (a).

For example, during the reproduction from a disk accommodated in one of the two disk trays, the disk accommodated in the other disk tray can be exchanged;

The reproducing operation can be stopped in a middle for allowing the disk to be exchanged for another disk at an unloading position; and The respective reproducing operations from disks accommodated in two disk trays can be successively carried out without giving an instruction for reproduction second time.

In order to achieve the above object, the disk reproducing device in accordance with the present invention includes:

(1) a reproducing unit for reproducing information recorded on a disk (for example, CD);

(2) first and second trays mounted in a housing so as to be aligned in parallel from one another, the first and second trays being capable of reciprocating between an unloading position at which the disk is detachable and a loading position at which the information can be reproduced from the disk;

(3) a moving member (for example, a rack member) arranged so as to be capable of reciprocating between the first tray and the second tray;

(4) a moving cam (for example, a slit-like cam portion formed in the rack member) for moving the reproducing unit by being integrally moved with the moving member which moves from one of the first and second trays to an other of the first and second trays, the moving cam being arranged so as to activate the reproducing unit to move from a reproducible position at which the information can be reproduced from a selected disk accommodated in one of the first and second trays to a retreat position which is apart from a recording surface of the selected disk in a substantially vertical direction and further to a retreat position of the other of the first and second trays and to a reproducible position with respect to the other of the first and second trays; and (5) drive means (for example, a tray gear member) for driving the other of the first and second trays to reciprocate between its loading position and unloading position when the reproducing unit is at the reproducible position with respect to one of the first and second trays, wherein a reciprocating movement of the other of the first and second trays by the drive means is guided by an engagement with the moving member, and (6) the drive means serves as a drive source for the moving member.

According to the above arrangement, since the first and second trays are arranged in parallel to one another in a housing, respective recording surfaces of the disks accommodated in the first or second trays are also aligned in parallel almost on the same plane. On the other hand, the retreat position of each tray is apart from the recording surface of the disk in a substantially vertical direction, and the first moving direction of each tray between the reproducible position and the retreat position is substantially vertical to the moving direction of the moving member which reciprocates between the first and second trays. On the other hand, the second moving direction from one of the retreat position to the other retreat position is substantially identical with the moving direction of the moving member. Furthermore, the third moving direction between the loading position and the unloading position of each tray is different from both the direction parallel to the first and second trays, i.e., the second moving direction and the first moving direction.

According to the present invention, separate drive sources are not needed for respective movements in three different directions, and only a single drive source is required. This feature of adopting only a single drive source eliminates a special arrangement such as a control circuit, for adjusting a switching timing for driving among plural drive sources. Thus, the present invention provides an inexpensive disk reproducing device.

Additionally, the feature that the drive means is only required to move the moving member in the second moving direction permits a simplified arrangement for moving the moving member. Furthermore, only by moving the moving member in the second moving direction by the drive means, the moving cam which moves together with the moving member converts the movement of the moving member in the second moving direction to the movement of the reproducing unit in the first moving direction, and further the reproducing unit can be moved in the second moving direction. Therefore, the moving member serves as a body for forming a moving cam provided with the described function, and also serves as guide means for moving the other one of the first and second trays in the third moving direction when the reproducing unit is at the reproducible position of the first tray or the second tray. This feature permits various movements to be driven with a minimum number of components, thereby achieving a still improved performance of the disk reproducing device at minimum cost.

Furthermore, by adopting the moving member having the following features (7) through (9), a moving direction of the reproducing unit can be switched at an accurate timing with a simplified structure:

(7) A rack for moving the moving member parallel to the moving direction of the reproducing unit and the moving cam are formed on the moving member;

(8) The rack is arranged so as to be engaged with a drive gear which rotates by a drive force from the drive means; and (9) The moving cam includes an elevator cam portion (for example, the first oblique cam and the second oblique cam) for generating a component force in a substantially vertical direction to the reproducing unit with the movement of the rack and a joint portion (for example, the first oblique cam, the second oblique cam and the horizontal portion) for moving the reproducing unit between respective retreat positions, and the moving cam is successively engaged with the elevator cam portion and the joint portion.

Furthermore, by adopting the following features (10) through (12), a simple structure of driving the movement of the reproducing unit in the first and the second moving directions and the reciprocating movements of the trays by means of a single drive source can be achieved.

(10) The drive source gear in mesh with the drive gear is formed on the drive means;

(11) A tray rack in mesh with the drive source gear is formed on each of the first and second trays; and

(12) When reproducing unit is in a reproducible position with respect to one of the first and second trays, the drive source gear is in mesh with the tray rack of the other of the first and second trays.

According to the described arrangement, the drive force from the drive means is transmitted to the rack of the moving member through the drive gear from the drive source gear, and is transmitted to each tray rack through the drive source gear, thereby permitting the moving member, and the first and second trays to be driven by the single drive source.

However, the first and second trays will not be driven by the drive means simultaneously. Namely, when the reproducing unit is at the reproducible position with respect to the first or second tray, the other of the first and second trays is driven by the engagement between the tray rack and the drive source gear. According to the described arrangement, during the reproduction from the disk accommodated in one of the first and second trays, the disk accommodated in the other of the first and second trays can be exchanged with such a simple structure that the drive source gear is formed in the drive means, and the tray rack is formed on each of the first and second trays.

Furthermore, by adopting the following arrangements (13) through (17), while maintaining the reproducing unit at the reproducible position with respect to one of the first and second trays, the disk accommodated in the other of the first and second trays can be exchanged by reciprocating the tray between the loading position and the unloading position;

(13) A first joint member (for example, the first joint pin) is formed at the end portion on the first tray side of the moving member, and a second joint member (for example, a second joint pin) is formed at the end portion on the second tray side of the moving member;

(14) A first guide groove for sliding therealong the first joint member in mesh therewith and a second guide groove for sliding therealong the second joint member in mesh therewith are respectively formed on the first tray and the second tray;

(15) The first reciprocating cam portion and the second reciprocating cam portion, formed respectively in the first and second trays, for engaging the drive source gear and the tray rack and disengaging the drive source gear from the tray rack by transforming the reciprocating movement of the moving member between the first and second trays to the forward movement of the first and second trays;

(16) A release portion (for example, a horizontal portion) is formed on the moving cam, for holding the reproducing unit at the reproducible position even while the moving member is being moved from one of the first and second trays to the other of the first and second tray when the reproducing unit is at the reproducing position with respect to the other of the first and second trays; and

(17) The first reciprocating cam portion and the second reciprocating cam portion are respectively formed on the first tray and the second tray in such a manner that the second joint member is positioned adjacent to the second reciprocating cam portion when the reproducing unit is at the reproducible position with respect to the first tray, while the first moving member is positioned adjacent to the first reciprocating cam portion when the reproducing unit is at the reproducible position with respect to the second tray.

According to the described arrangement, when the reproducing unit is at the reproducible position at the first tray, the second joint member provided at the end portion of the rack on the second tray side is adjacent to the second reciprocating cam portion formed on the second tray. In this state, when the rack is moved from the second tray to the fist tray, as the release portion is formed in the moving cam, the second reciprocating cam portion can further slide along the second joint member while maintaining the reproducing unit at the reproducible position of the first tray. As a result, the second tray can be moved so that the drive source gear is in mesh with the tray rack of the second tray.

After the drive source gear becomes engaged with the tray rack of the second tray, the second tray can reciprocate between the loading position and the unloading position while sliding the second joint member along the second guide groove.

The described mechanism can be applied also to the first tray when the reproducing unit is at the reproducing position with respect to the second tray.

Furthermore, the rotation movement of the reproducing unit about a rotation shaft between the reproducing position and the retreat position can be smoothed by adopting the following features (18)–(21):

(18) The moving member is formed at a rotation end side of the reproducing unit;

(19) The first guide means (for example, a unit receiving rail) for guiding the movement of the reproducing unit between the respective retreat positions can be formed in the housing so as to serve also as shaft of the rotation center;

(20) The second guide means (for example, a lower guide groove) is formed in the housing at the rotation end side, for guiding the movement of the reproducing unit between the respective retreat positions;

(21) The first joint portion (for example, a unit joint groove) which engages with the first guide means is formed on the side of the rotation center of the reproducing unit, and the second joint portion (for example, a joint end) which engages with the second guide means is formed on the rotation end side of the reproducing unit; and

(22) The engagement between the first guide means and the first joint portion is selected to be looser than the engagement between the second guide means and the second joint portion.

The same effect can be achieved also by including:

(23) a reproducing unit for reproducing information recorded on a disk (for example, CD);

(24) first and second trays mounted on the housing so as to be aligned in parallel from one another, the first and second trays being capable of reciprocating between an unloading position at which the disk is detachable and a loading position at which information can be reproduced from the disk;

(25) a drive source (for example, a tray gear member) for generating a drive force;

(26) a drive source gear (for example, a lower gear) being provided in the drive source;

(27) a drive gear (for example, a rack drive gear) in mesh with the drive source gear;

(28) a rack which is in mesh with the drive gear and is engaged with the reproducing unit, for linearly moving the reproducing unit between the retreat position of the first tray and the retreat position of the second tray, said retreat position of the first tray being apart from the recording surface of the disk accommodated in the first tray in a substantially vertical direction, the retreat position with respect to the second tray being apart from the recording surface of the disk accommodated in the second tray in the substantially vertical direction;

(29) tray racks respectively formed on the first and second trays, so as to be in mesh with the drive source gear; and

(30) reciprocating cam portions (for example, a contact portion) in mesh with the racks respectively formed on the first and second trays provided in such a manner that the linear movement of the rack from one of the first and second trays to the other one of the first and second trays is transformed to the reciprocating movement of one of the first and second trays,

(31) wherein the drive source gear is in mesh with the tray rack of the other one of the first and second trays when the reproducing unit is at the reproducible position of one of the first and second trays,

(32) the rack includes an elevator cam groove (for example, first and second inclined cams) for generating a component force substantially vertical to the reproducing unit so as to move the reproducing unit between the reproducible position and the retreat position of each tray and a holding groove for holding the reproducing unit at the reproducible position by activating the reciprocating cam portion by the linear movement of the rack during engaging and disengaging the tray rack of the tray which is not subject to reproduction with the drive source gear when the reproducing unit is at either one of the reproducible positions, and

(33) the elevator cam groove also serves as the joint portion for linearly moving the reproducing unit.

According to the described arrangement, the rack in mesh with the reproducing unit is linearly moved from one of the first and second trays to the other one of the first and second trays by receiving the drive force through the drive gear. The linear movement of the rack generates a force from the elevator cam groove formed on the rack in a direction substantially vertical to the reproducing unit. Following the linear movement of the rack, the reproducing unit is moved substantially vertical to the linear movement of the rack, for example, downward to the retreat position of one of the trays.

When the rack is further moved linearly in the same direction, the elevator cam groove serves as the joint portion for moving linearly the reproducing unit in the same direction as the rack moving direction. As a result, the reproducing unit is integrally moved with the rack from the retreat position of one tray to the retreat position of the other tray.

When the rack is still further moved linearly in the same direction, the elevator cam groove generates a component force in the direction substantially vertical to the reproducing unit again, thereby moving (for example, raising) the reproducing unit from the retreat position of the other tray to its reproducible position.

When the rack is further moved linearly in the same direction after the reproducing unit reaches the reproducible position of the other tray, the reciprocating cam portion formed on the tray in non-reproducible position is activated to drive the tray at the unreproducible position to reciprocate so that the tray rack in the tray in the unreproducible position is engaged with the drive source gear. Additionally, since the rack includes a holding groove for holding the reproducing unit at the reproducible position while engaging or disengaging the tray rack with and from the drive source gear in the tray of the non-reproducible side, the reproducing unit can be maintained at the reproducible position irrespectively of the movement of the rack.

As a result, the tray rack of the tray at the non-reproducible position is driven by the drive source gear, and the tray in the non-reproducible position is allowed to reciprocate while maintaining the other tray at the reproducible position. As a result, the disk in the tray in the non-reproducible state can be exchanged.

As described, the linear movement of the reproducing unit, the vertical movement of the reproducing unit and the reciprocating movement of the first and second trays can be achieved only by linearly moving the rack in one direction by means of a single drive source. Additionally, by setting the elevator cam groove in the rack and the shape of the holding groove in the rack, the switching timing of three operations can be adjusted precisely and easily.

For a fuller understanding of the nature and advantages of the invention, reference should be made to the ensuing detailed description taken in conjunction with the accompanying drawings.

BRIEF DESCRIPTION OF THE DRAWINGS

FIG. 7(a) is a plan view showing the state of a reproducing unit directly before being moved down from its reproducible position.

FIG. 7(b) is an explanatory view showing a state of a rack member in accordance with FIG. 7(a).

FIG. 7(c) is a cross-sectional view taken along the plane indicated by the line X—X.

FIG. 9(a) is a plan view showing the state of the reproducing unit being lowered from a reproducible position with respect to the first tray to its retreat position.

FIG. 9(b) is an explanatory view showing the state of the rack member in accordance with FIG. 9(a).

FIG. 9(c) is a cross sectional view taken along the plane indicated by the line X—X.

FIG. 10(a) is a plan view showing a movement of an oblique slit for switching from a movement of a reproducing unit between its reproducible position and its retreat position to a movement of the reproducing unit between respective retreat positions.

FIG. 10(b) is an explanatory view showing the state of the rack member in accordance with FIG. 10(a).

FIG. 10(c) is a cross-sectional view of FIG. 10(a) taken along the plane indicated by the line X—X.

FIG. 11(a) is a plan view showing the state of the reproducing unit directly before transforming from the movement between the reproducible position and the retreat position to the movement between the respective retreat positions.

FIG. 11(b) is an explanatory view showing the state of the rack member in accordance with FIG. 11(a).

FIG. 11(c) is a cross-sectional view taken along the plane indicated by the line X—X

FIG. 13(b) is a plan view corresponding to the state shown by FIG. 13(a).

FIG. 13(c) is an explanatory view showing the state of the rack member in accordance with FIG. 13(b).

FIG. 14(a) which shows the state of the reproducing unit while the movement of the reproducing unit between the retreat positions is being transformed to the movement between the reproducing position and the retreat position is a cross-sectional view taken along the plane indicated by the line Y—Y of FIG. 14(b).

FIG. 14(b) is a plan view corresponding to the state of FIG. 14(a).

FIG. 14(c) is an explanatory view showing the state of the rack member in accordance with FIG. 14(b).

FIG. 15(a) which shows the state of the reproducing unit which starts moving up to its reproducible position with respect to the second tray is a cross-sectional view taken along the plane indicated by the arrow Y—Y of FIG. 15(b).

FIG. 15(b) is a plan view corresponding to the state of FIG. 15(a).

FIG. 15(c) is an explanatory view showing the state of the rack member in accordance with FIG. 15(b).

FIG. 16(a) which shows the state where the reproducing unit is being raised from the retreat position to the reproducible position with respect to the second tray is a cross-sectional view taken along the plane indicated by the arrow Y—Y of FIG. 16(b).

FIG. 16(b) is a plan view in accordance with the state shown in FIG. 16(a).

FIG. 16(c) is an explanatory view showing the state of the rack member in accordance with FIG. 16(b).

FIG. 17(a) which shows a state where the reproducing unit reaches the reproducible position with respect to the second tray is a cross-sectional view taken along the plane indicated by the arrow Y—Y of FIG. 17(b).

FIG. 17(b) is a plan view in accordance with the state illustrated in FIG. 17(a).

FIG. 17(c) is an explanatory view showing the state of the rack member in accordance with FIG. 17(b).

FIG. 18(a) which shows the state where the second switch detects that the reproducing unit reaches the reproducible position with respect to the second tray is a cross-sectional view taken along the line Y—Y of FIG. 18(b).

FIG. 18(b) is a plan view corresponding to the state of FIG. 18(a).

FIG. 18(c) is an explanatory view showing the relative position of the switch and the switching lever in the state shown in FIG. 18(b).

FIG. 18(d) is an explanatory view showing the state of the rack member in accordance with FIG. 18(b).

FIG. 19(a) is a plan view showing the state of the second tray directly before moving the second tray to its unloading position while maintaining the reproducing unit at the reproducible position of the first tray.

FIG. 19(b) is an explanatory view illustrating the state of the rack member in accordance with FIG. 19(a).

FIG. 21(a) is a plan view showing the state where the rack portion is disengaged from the rack drive gear in the step of moving the second tray to its unloading position while maintaining the reproducing unit at the reproducible position of the first tray.

FIG. 21(b) is an explanatory view showing the state of the rack member in accordance with FIG. 21(a).

FIG. 22(a) which illustrates the state of the second tray directly before detecting the state where the second tray reaches the unloading position while maintaining the reproducing unit at the reproducible position with respect to the first tray is a perspective cross-sectional view taken along the plane indicated by the arrow Y—Y of FIG. 22(b).

FIG. 22(b) is a plan view showing the state of FIG. 15(a).

FIG. 22(c) is an explanatory view showing the state of the rack member in accordance with FIG. 22(b).

FIG. 23(a) which shows the state where it is detected that the second tray reaches the unloading position while maintaining the reproducing unit at the reproducible position of the first tray is a perspective cross-sectional view taken along the plane indicated by the arrow Y—Y of FIG. 23(b).

FIG. 23(b) is a plan view showing the state of FIG. 23(a).

FIG. 23(c) is an explanatory view showing the state of the rack member in accordance with FIG. 23(b).

FIG. 24 is an explanatory view showing a relative position of the switch and the switching lever in the state illustrated in FIGS. 23(a) through (c).

FIG. 25(a) which shows the state where the second tray starts moving back from the unloading position to the loading position while maintaining the reproducing unit at the reproducible position of the first tray is a perspective cross-sectional view taken along the plane indicated by the line Y—Y of FIG. 25(b).

FIG. 25(b) is a plan view in accordance with the state of FIG. 25(a).

FIG. 25(c) is an explanatory view showing the state of the rack member in accordance with FIG. 25(b).

FIG. 26(a) which shows the state before a tray rack of the second tray is disengaged from the upper gear upon completing the movement of the second tray back to the loading position while maintaining the reproducing unit in the reproducible position of the first tray is a perspective cross-sectional view taken along the plane indicated by the line Y—Y of FIG. 26(b).

FIG. 26(b) is a plan view showing the state of FIG. 26(a).

FIG. 26(c) is an explanatory view showing the state of the rack member in accordance with FIG. 26(b).

FIG. 27(a) which shows the state where the tray rack of the second tray is about to be disengaged from the upper gear, and the rack portion is about to be engaged with the rack drive gear while maintaining the reproducing unit at the reproducible position with respect to the first tray upon completing the movement of the second tray back to the loading position is a perspective cross-sectional view taken along the plane indicated by the line Y—Y of FIG. 27(b).

FIG. 27(b) is a plan view corresponding to the state of FIG. 27(a).

FIG. 27(c) is an explanatory view showing the state of the rack member in accordance with FIG. 27(b).

FIG. 28(a) which shows the state directly before detecting that the second tray is moved back to the loading position while maintaining the reproducing unit at the reproducible position of the first tray is a cross-sectional view taken along the plane indicated by the arrow Y—Y of FIG. 28(b).

FIG. 28(b) is a plan view in accordance with the state of FIG. 28(a).

FIG. 28(c) is an explanatory view showing the state of the rack member in accordance with FIG. 28(b).

FIGS. 99(a) and (b) are explanatory views showing the relative position between the switch and the switching lever in the state shown in FIGS. 28(a) through (c).

DESCRIPTION OF THE EMBODIMENTS

Figure 2:
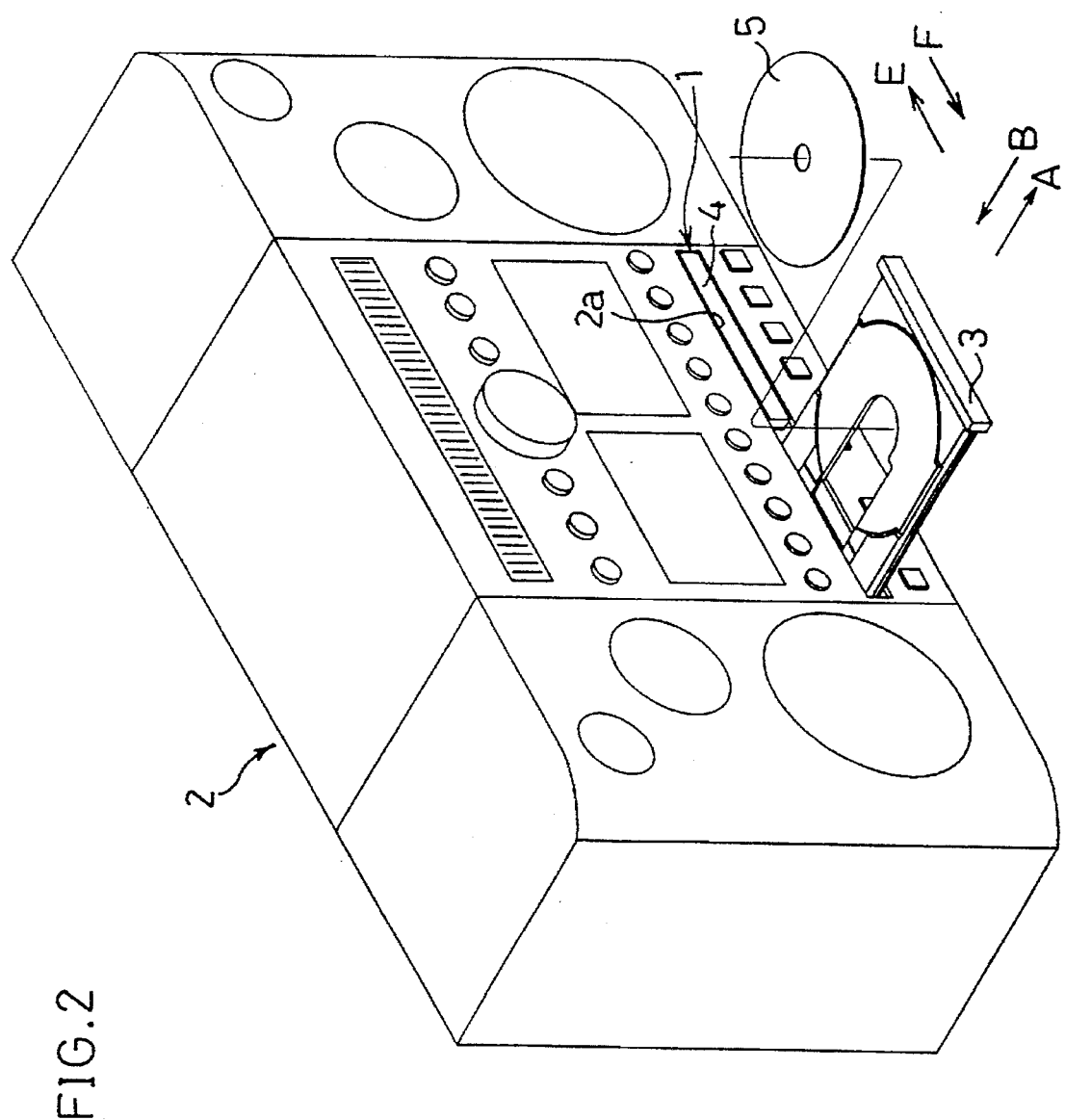
FIG. 2 is a perspective view showing an appearance of an audio device equipped with the disk reproducing device of FIG. 1.

The following description will discuss one embodiment of the present invention,

FIG. 2 shows an appearance of a so-called CD radio cassette device 2 provided with a disk reproducing device 1 as an audio device in accordance with the present embodiment. The CD radio cassette device 2 has functions of not only reproducing from an optical disk such as a compact disk (hereinafter referred to as CD) but also listening radio programs and recording and reproducing information on and from a compact cassette tape. Other than the CD, examples of optical disks which permit reproduction by means of the CD radio cassette device 2 include: an LD (laser disks), a DVD (digital video disks), a CDG (CD graphics), a single CD, a CDV (CD video), etc.

Figure 1:
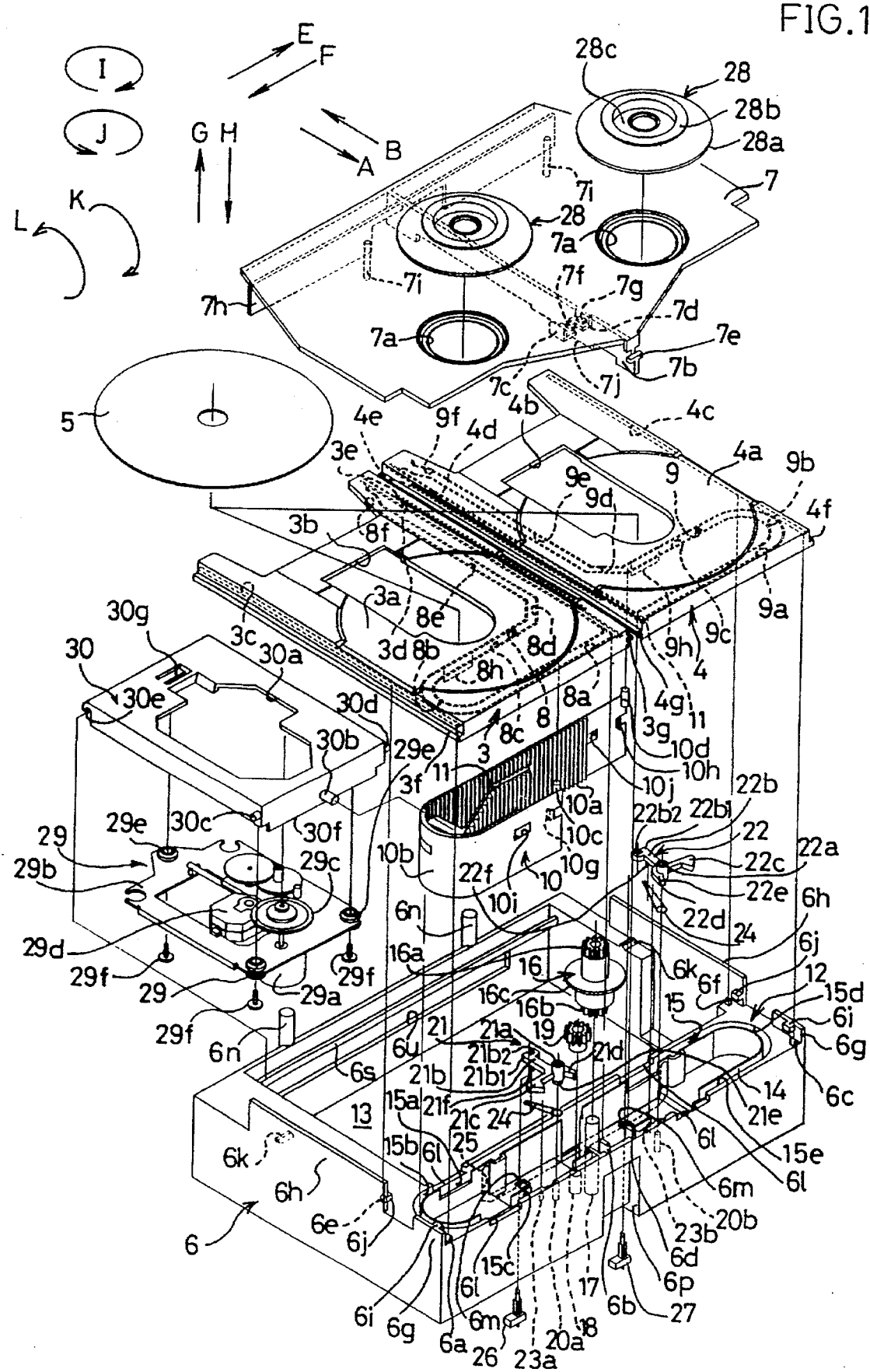
FIG. 1 is a broken away perspective view illustrating one example of a disk reproducing device in accordance with the present invention.

As shown in FIGS. 1 and 2, for convenience in explanations, respective directions are defined as follows: The forward direction of the CD radio cassette device 2 is an A-direction, and the backward direction of the CD radio cassette 2 is a B-direction (opposite direction to the A-direction). Facing the B-direction, to the right hand side direction is an E-direction, to the left hand side direction is an F-direction, the vertical upward direction is a G-direction and the vertical downward direction is an H-direction. Facing the H-direction, the clockwise direction is an I-direction, and the counterclockwise direction is a j-direction. Facing the E-direction, the clockwise direction is a K-direction, and the counterclockwise direction is an L-direction.

On the front face of the CD radio cassette device 2 shown in FIG. 2, rectangular tray storage openings 2a are formed so as to extend in the E-F direction. In the tray storage openings 2a, a first tray 3 and a second tray 4 of the disk reproducing device 1 are respectively formed in parallel in the E-F direction. The trays 3 and 4 are provided so as to be capable of reciprocating in the A-B direction, and in the example shown in FIG. 2, the first tray 3 is moved to a position where a CD 5 is detachable.

For convenience in explanations, a position where the tray 3 or 4 has been moved in the A-direction from the tray storage opening 2a and an exchange of the CD is permitted is defined as an unloading position, while a position where the tray 3 or 4 is stored in the tray storage opening 2a and the reproduction from the CD is permitted is defined as a loading position. Similarly, a state where the tray 3 or 4 is moved to the unloading position is defined as a unloading state, and a state where the tray 3 or 4 is moved to a loading position is defined as a loading state.

The CD radio cassette device 2 permits a successive reproducing operation from two CDs respectively accommodated in the trays 3 and 4. While reproducing from the CD accommodated in the tray 3 or 4 and maintaining the reproducing state from the CD, the CD accommodated in the other of the tray 3 or 4 can be exchanged for another disk by moving the tray to the unloading position. After the CD is exchanged, by moving the other one of the trays 3 and 4 to the loading position, a successive reproducing operation is permitted. Needless to mention, even in the middle of the reproducing operation from a CD, the CD can be removed at any time as desired.

Figure 3:
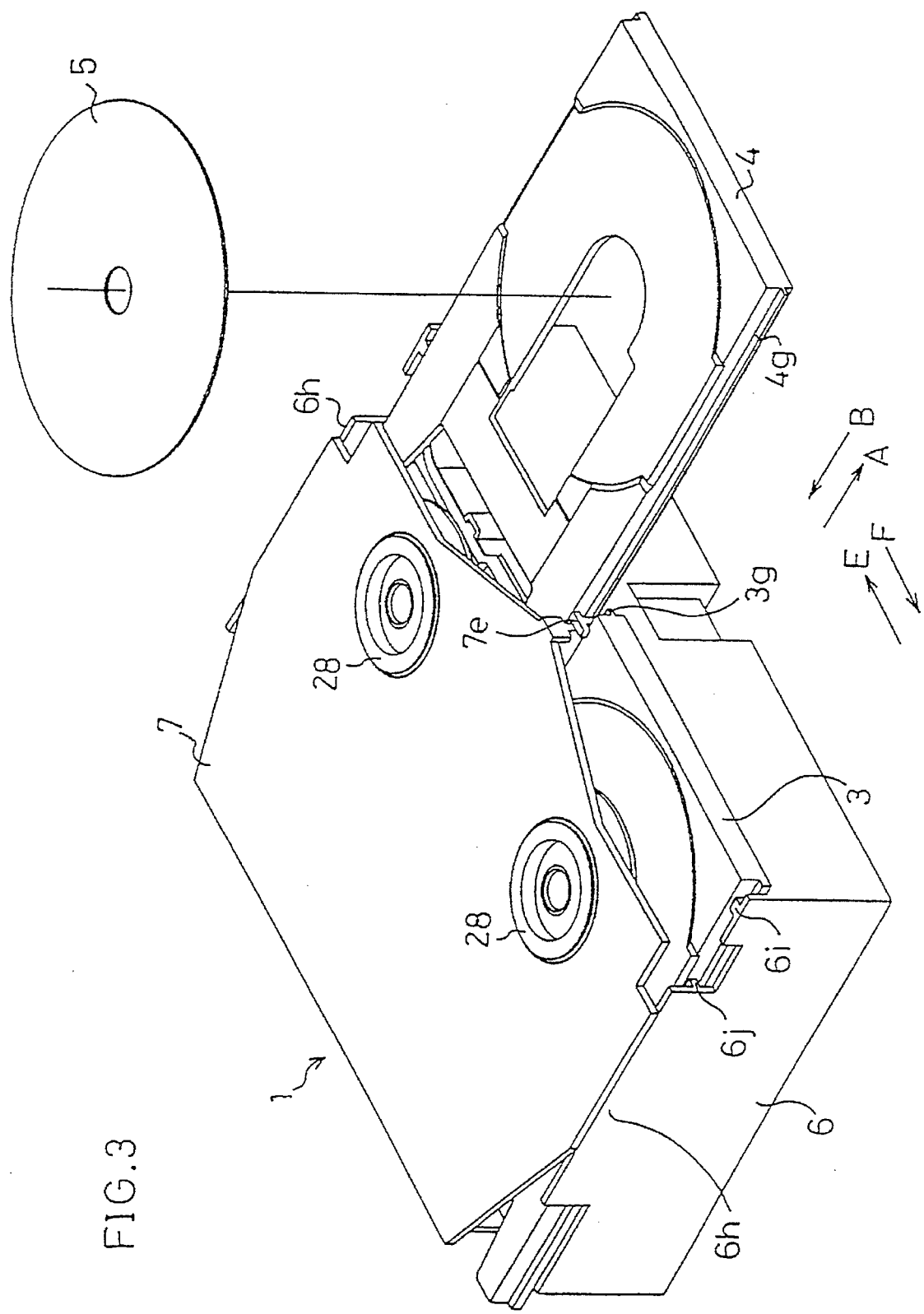
FIG. 3 is a perspective view showing an unloading state of a second tray in the disk reproducing device of FIG. 1.

FIG. 3 shows an appearance of the disk reproducing device 1. The members which constitute the cabinet of the disk reproducing device 1 include a housing 6 (base) and a disk holding plate 7 formed as a cover for the housing 6. The upper surface of the almost box-shaped housing 6 is an opening. The housing 6 also guides and restricts the respective movements of the tray 3 and 4 in the A-B direction. The trays 3 and 4 are respectively moved in the A-B direction within a clearance formed between the housing 6 and the disk holding plate 7. The disk holding plate 7 holds the CD accommodated in each tray 3, 4 at the loading position. The disk holding plate 7 also guides and restricts the movement of the tray 3, 4 in the A-B direction together with the housing 6.

The disk holding plate 7 includes disk holders 28 (to be described later) respectively formed so as to correspond to the rotation shafts of the CDs respectively accommodated in the trays 3 and 4.

Each section of the disk reproducing device 1 will be explained in detail in reference to FIG. 1.

[First Tray and Second Tray]

The first tray 3 has a square shape, and a disk placement part 3a for mounting thereon the CD 5 is formed to be recessed for allowing the CD 5 to fit therein. The width of the first tray 3 in the E–F direction is selected to be substantially identical with a diameter of the CD 5. On the disk placement part 3a, a tray opening 3b is formed so as to extend from a vicinity of the center of the disk placement part 3a in the B-direction. The tray opening 3b is required for reading out recorded information from the CD 5 by optically scanning the CD 5 in a radial direction by the reproducing unit 29 (to be described later) while rotating the CD 5.

Figure 4:
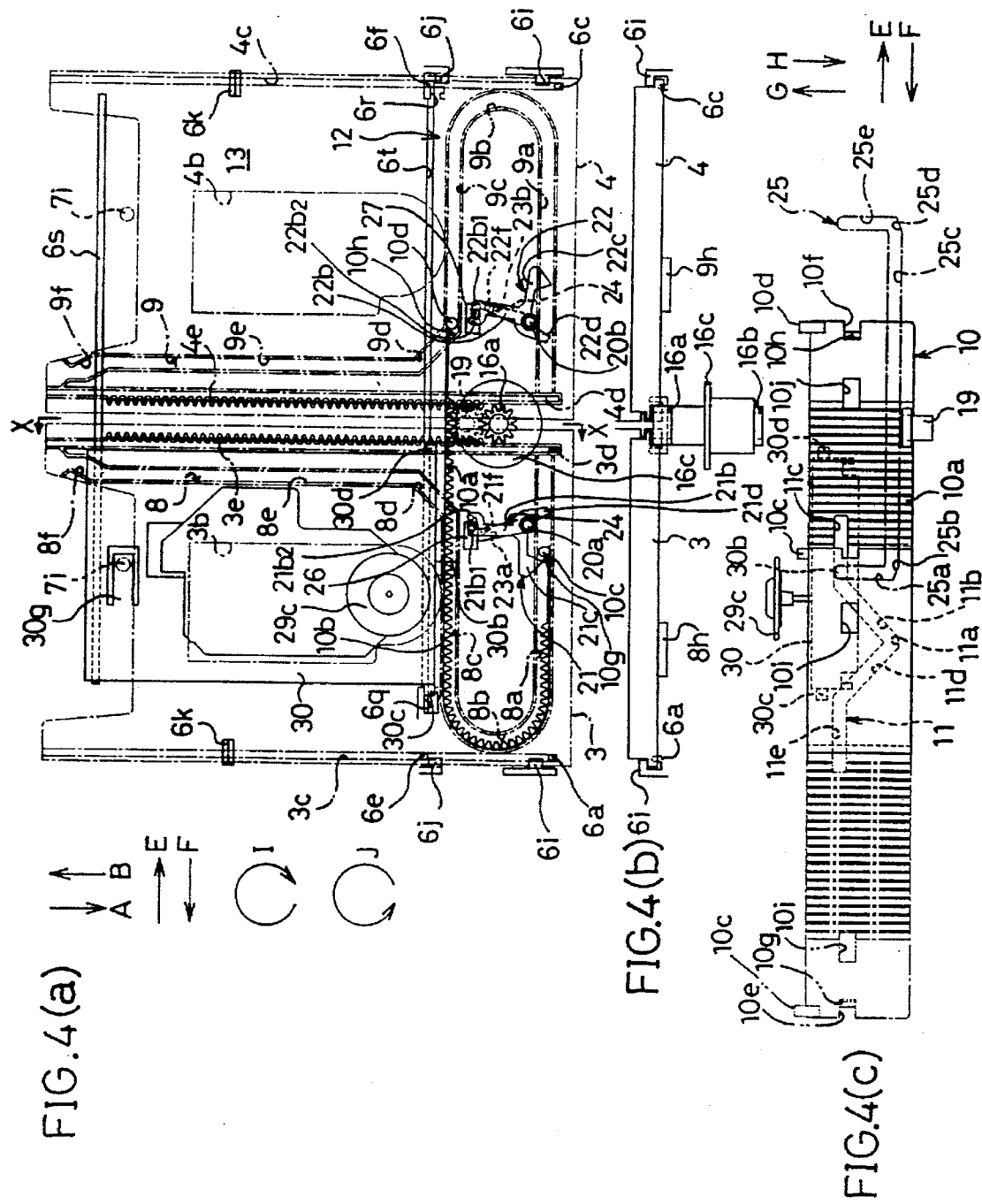
FIG. 4(a) is a plan view showing essential components of the disk reproducing device of FIG. 1.
FIG. 4(b) is a front view of the disk reproducing device of FIG. 1.
FIG. 4(c) is an explanatory view showing an operation of a cam portion for holding a first tray at its reproducible position.

As also shown in FIG. 4(a), on the back surface of the first tray 3, a guide groove 3c is formed at the end portion in the F-direction so as to extend in the A–B direction, and at the end portion in the E-direction, a guide groove 3d is formed in the A–B direction. On the other hand, on the side face in the F-direction of the first tray 3, a guide rim 3f (see FIG. 1) is formed so as to extend in the A–B direction. The guide rim 3f is provided for supporting the first tray 3 by the housing 6 and guiding the movement of the first tray 3 in the A–B direction. On the side face in the E-direction of the first tray 3, a guide rim 3g is formed so as to extend in the A–B direction. The guide rim 3g is provided for supporting the first tray 3 by the disk holding plate 7.

Outside of the guide groove 3d in the E-direction, a rack in mesh with a gear is formed so as to extend in the A–B direction. However, a rack is not formed on neither end portions of the guide groove 3d in the A and B-directions. Hereinafter, the rack formed on the first tray 3 is referred to as a tray rack 3e. The tray rack 3e and a tray rack 4e (to be described later) correspond to a tray rack recited in claims.

As shown in FIG. 4(a), on the back surface of the first tray 3, a guide groove 8 (first guide groove) is formed in an area between the guide groove 3c and the guide groove 3d. The guide groove 8 includes a first guide portion 8a, a second guide portion 8b, a third guide portion 8c and a contact portion 8d, a fourth guide portion 8e and a cam piece 8f. The first guide portion 8a is formed adjacent to the guide groove 3d at the end portion of the first tray 3 in the A-direction so as to extend in the F-direction. The second guide portion 8b has a circular arc shape for allowing the direction of the first guide portion 8a to change in the B-direction and further to the E-direction. The third guide portion 8c (moving member guide groove) is formed so as to extend from the second guide portion 8b in the E-direction over the tray opening 3b. The contact portion 8d (reciprocating cam portion or first reciprocating cam portion) is formed so as to extend to a vicinity of the guide groove 3d at 45 degrees to the B-direction with respect to the E-direction. The fourth guide portion 8e is formed so as to extend to a vicinity of the end portion in the B-direction of the first tray 3 along the guide groove 3d. The cam piece 8f extends from the fourth guide portion 8e so as to be slightly curved in the E-direction.

Lastly, the first tray 3 is arranged such that a part of the side face in the B-direction of the third guide portion 8c is projected towards the H-direction to form a stopper 8h (stopping member) as shown in FIG. 1 and FIG. 4(b). The function of the stopper 8h will be explained later.

The second tray 4 and the first tray 3 are symmetrically formed. Namely, the disk placement part 3a corresponds to a disk placement part 4a, a tray opening 4b corresponds to the tray opening 3b, a guide groove 4c corresponds to the guide groove 3c, a guide groove 4d corresponds to the guide groove 3d, a tray rack 4e corresponds to the tray rack 3e, a guide rim 4f corresponds to the guide rim 3f, a guide rim 4g corresponds to the guide rim 3g, a guide groove 9 (second guide groove) corresponds to the guide groove 8, a first guide portion 9a corresponds to the first guide portion 8a, a second guide portion 9b corresponds to the second guide portion 8b, a third guide portion 9c (moving member guide groove) corresponds to the third guide portion 8c, a contact piece 9d (reciprocating cam portion or the second reciprocating cam portion) corresponds to the contact portion 8d, a fourth guide portion 9e corresponds to the fourth guide portion 8e, a cam piece 9f corresponds to the cam piece 8f, and a stopper 9h (stopping member) corresponds to the stopper 8h. The tray rack 3e and the tray rack 4e are placed so as to face one another with a predetermined interval between them.

[Rack Member]

In the disk reproducing device 1 in accordance with the present embodiment, an up-down movement of a reproducing unit 29 (to be described later) in the G–H direction, the movement of the reproducing unit 29 in the E–F direction and the respective movements of the trays 3 and 4 in the A–B direction are all driven by a single drive source. A rack member 10 (moving member or a rack moving means) plays the most important role in driving these three movements by means of the single drive source. The rack member 10, which is engaged with the guide grooves 8 and 9 of the trays 3 and 4, reciprocates in the E–F direction mainly between the trays 3 and 4. However, in order to minimize the width in the E–F direction of the disk reproducing device 1 while ensuring the moving stroke of the rack member 10 in the E–F direction, the rack member 10 moves along the orbit of the long circle formed by combining the linear orbit in the E–F direction and the circular orbit on both ends.

For this reason, the rack member 10 is made of a relatively soft material having flexibility such as a nylon, polypropylene, etc., and is formed in a band shape so as to extend in the E–F direction. The length of the rack member 10 in the E–F direction is selected to be slightly longer than the sum of the length of the trays 3 and 4 which are horizontally aligned. In the rack portion 10a of the rack member 10 excluding the both end portions in the lengthwise direction of the rack member 10, plural gear teeth of the rack are formed in the direction orthogonal to the lengthwise direction of the rack member 10, i.e., parallel to the G–H direction.

The thickness between the teeth bottom of the rack portion 10a and track me surface portion 10b of the rack member 10 is selected to be as thin as, for example, around 0.2 mm to 0.5 mm. Therefore, as shown in FIG. 1, the rack member 10 can be easily bent in the I or J direction in such a manner that the rack portion 10a comes inside. Yet the rack member 10 is difficult to be bent in the widthwise direction orthogonal to the lengthwise direction.

Since the back surface portion 10b is formed so as to come in contact with the stopper 9h and the stopper 8h respectively formed on the second tray 4 and on the first tray 3, the respective movements of the trays 3 and 4 in the A-direction can be prevented by the rack member 10 when an occasion demands, thereby maintaining the respective loading states of the trays 3 and 4.

At both upper corners of the rack member 10 in the lengthwise direction, a first joint pin 10c (first joint member) and a second joint pin 10d (second joint member) are respectively formed so as to be projected in the G-direction. The first joint pin 10c fits in the guide groove 8 so as to slide therealong, while the second joint pin 10d fits in the guide groove 9 so as to slide therealong. The joint pins 10c and 10d also serve to maintain the respective loading positions of the trays 3 and 4 and guide the movements of the trays 3 and 4 in the A–B direction.

As shown in FIG. 4(c), at both end portions of the rack member 10 in the lengthwise direction, respective portions below the first joint pin 10c and the second joint pin 10d are cut so as to form recesses 10e and 10f. On the bottom portions of U-shaped recesses 10e and 10f, the first contact piece 10g and the second contact piece 10h are respectively formed so as to be projected out in the same direction as a teeth array of the rack portion 10a. Around both ends of the rack portion 10a, a release hole 10i and a release hole 10j are formed at the same height position as the recess 10e and the recess 10f on the side of the recess 10e. The release hole 10i is formed on the side of the recess 10e, while the release hole 10j is formed on the side of the recess 10f. The functions of the release holes 10i and 10j will be explained later.

At around the center of the rack member 10, a substantially V-shaped slit is formed as a cam portion 11 (moving cam). The cam portion 11 is key to the up-and-down movement of the reproducing unit 29 (to be described later) and the movement of the reproducing unit 29 between the trays 3 and 4. A bottom section of the substantially V-shape slit is slightly biased to the E-direction from the center of the rack member 10, and forms a horizontal piece 11a which is shorter in the E–F direction. A first oblique cam 11b is formed so as to be sloped upward from the horizontal piece 11a to the right in the B-direction, and a first cam 11c is formed in a parallel direction to the E-direction. On the other hand, a second oblique cam 11d is formed so as to be sloped upward from the horizontal piece 11a to the left in the B-direction, and a second cam 11e is formed in the parallel direction to the F-direction.

The first oblique cam 11b and the second oblique cam 11d correspond to an elevator cam portion and a joint portion and an elevator cam groove recited in claims, while the first cam 11c and the second cam 11e correspond to a release portion and a holding groove recited in claims.

[Housing]

The housing 6 is provided for housing therein various components of the disk reproducing device 1. As shown in FIG. 1, the housing 6 is mainly composed of a rack storage section 12 provided in the A-direction and a reproducing unit storage section 13 provided in the B-direction. In the rack storage section 12, a space for storing the rack member 10 and for allowing the rack member 10 to move and also a space for storing various gears (to be described later) are formed. In the reproducing unit storage section 13, a space for storing the reproducing unit 29 (to be described later) and for allowing the reproducing unit 29 to move is formed.

In the rack storage section 12, a recess which is longer in the E–F direction is formed. The both ends in the E–F direction of the recess are formed in a circular arc shape. Along the inner wall of the recess, a thin wall 14 is formed, and by using the space between the inner wall of the recess and the wall 14 as a rack storage groove 15, the part of the rack member 10 is bent in the circular arc shape so as to ensure the space for storing and moving the rack member 10. Further, the inside of the wall 14 is used as the storage space for various gears.

The rack storage groove 15 is composed of first to fifth storage grooves 15a–15e. The first storage groove 15a is formed in the B-direction of the rack storage section 12 so as to extend in the E–F direction. The second storage groove 15b has a circular shape which is bent to the A-direction from the end in the F-direction of the first storage groove 15a. The third storage groove 15c is formed so as to extend from the second storage grove 15b to a vicinity of the center of the rack storage section 12 in the E-direction. The fourth storage groove 15d has a circular arc shape which is bent to the A-direction from the end portion in the E-direction of the first storage groove 15a. The fifth storage groove 15e is formed so as to extend from the fourth storage groove 15d to a vicinity of the center of the rack storage section 12 in the F-direction.

The outline of the rack storage groove 15 corresponds to the outline of the guide groove 8 and the guide groove 9 formed at the bottom surfaces of the trays 3 and 4. The rack storage groove 15 is formed in a position corresponding to the respective positions of the guide groove 8 and the guide groove 9 at the respective loading positions of the trays 3 and 4.

On the end portion in the A-direction of the upper surface of the rack storage section 12, a guide portion 6a which fits in the guide groove 3c of the first tray 3, a guide portion 6b which fits in the guide groove 3d of the first tray 3, a guide portion 6c which fits in the guide groove 4c of the second tray 4, and a guide portion 6d which fits in the guide groove 4d of the second tray 4 are formed so as to be projected out in the G-direction. On the upper surface of the rack storage section 12, at a position slightly displaced from the guide portion 6a in the B-direction, a guide portion 6e which fits in the guide groove 3c of the first tray is formed so as to be projected in the G-direction like the guide portion 6a. Similarly, the guide portion 6f which fits in the guide groove 4d of the second tray 4 is formed so as to be projected in the G-direction at position biased to the B-direction with respect to the guide portion 6c.

On the side wall of the housing 6 in the F-direction, upright pieces 6g and 6h are formed so so to vertically extend respectively from the upper surface of the rack storage section 12 and the upper surface of the reproducing unit storage section 13. 0n the upright pieces 6g and 6h, float-preventing pieces 6i and 6j for preventing the first tray from floating are formed. The float-preventing pieces 6i and 6j are formed slightly above the guide portions 6a and 6e so as to contact the upper surface of the guide rim 3f of the first tray 3. On the upper surface of the reproducing unit storage section 13, a support piece 6k is formed so as to be projected in the G-direction, in contact with the upright piece 6h. The support piece 6k is provided for preventing the first tray 3 from rotating in the H-direction by the dead weight of the first tray 3.

On the end portion in the E-direction of the housing 6, the float-preventing pieces 6i and 6j and a support piece 6k are formed for the second tray 4 in the same manner as formed for the first tray 3.

Recesses 61 are formed for releasing therein the stoppers 8h and 9h formed on the bottom surfaces of the trays 3 and 4 when moving them in the A-direction at four end portions in the A-direction and the B-direction on the upper surface of the rack storage section 12.

Figure 5:
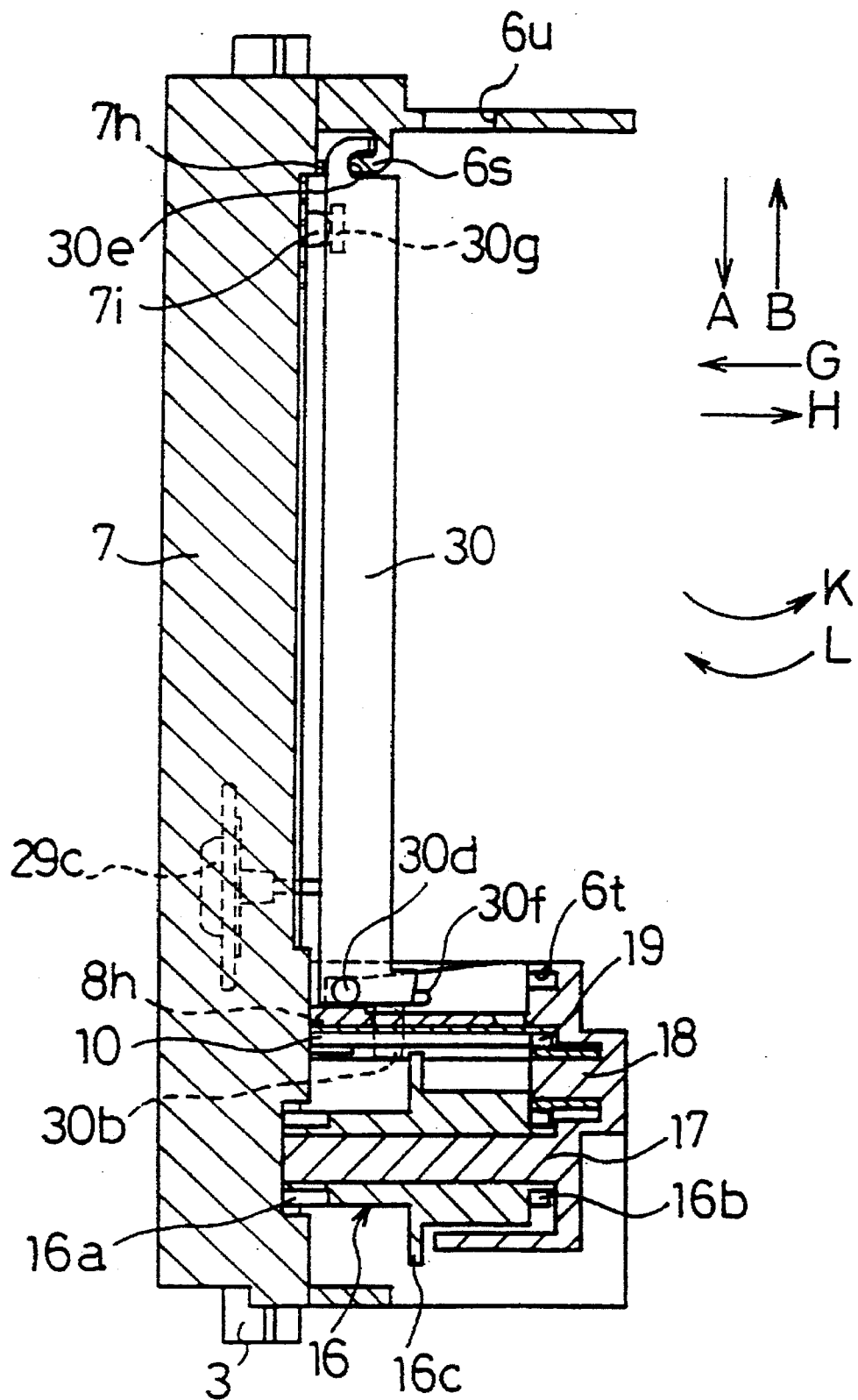
FIG. 5 is a cross-sectional view taken along the plane indicated by the line X—X.

In the storage space in the wall 14 of the rack storage section 12, as shown in FIG. 5, a shaft 17 which is the rotation shaft of a tray gear 16 is formed upright from the bottom portion of the rack storage section 12 to be biased to the B-direction with respect to the center between the guide portions 6b and 6d. On the upper portion of the tray gear member 16, an upper gear 16a is formed so as to be sandwiched between the tray racks 3e and 4e of the trays 3 and 4 and in mesh therewith, and a lower gear 16b having the same number of teeth as the upper gear 16a is formed at the lower portion of the tray gear member 16 as a drive source gear. A transmission part 16c is formed between the upper gear 16a and the lower gear 16b. The transmission part 16c is normally composed of a gear or a pulley, etc., and receives the rotating force from the drive source such as a motor, etc., (not shown). However, in the present embodiment, the tray gear member 16 is considered as the drive source or the drive means for the disk reproducing device 1.

The upper gear 16a, the lower gear 16b and the transmission part 16c are arranged so as to integrally pivot. Alternatively, the upper gear 16a and the lower gear 16b may be integrally formed at above or below the transmission part 16c to be a single drive source gear.

In the B-direction side of the shaft 17, a shaft 18 is formed upright, and a rack drive gear 19 as the drive gear which is always in mesh with the lower gear 16b is inserted so as to be freely rotatable. The rack drive gear 19 has the same number of teeth as the upper gear 16a and the lower gear 16b. However, the rack drive gear 19 pivots in an opposite direction to the rotation direction of the tray gear member 16. The rack drive gear 19 is formed so as to be in mesh with the rack portion 10a of the rack member 10.

In the present embodiment, the rack portion 10a is formed to the length of the width of the rack member 10 in the G–H direction, and the cam portion 11 is formed as a hole on the rack portion 10a. However, as shown in FIG. 5, since the rack drive gear 19 is in mesh with the end of the rack portion 10a in the H-direction, the width of the rack portion 10a in the G–H direction can be made shorter. In this case, although the cam portion 11 is formed other than the rack portion 10a, this would not affect the operation of the rack member 10.

As will be described later in more detail, respective timings for the engagement between the upper gear 16a and the tray racks 3e and 4e and the engagement between the rack drive gear 19 and the rack portion 10a are adjusted so that respective leading ends of the teeth would not contact.

Shafts 20a and 20b are symmetrically formed about the shaft 17 respectively in a vicinity of the third storage groove 15c and in a vicinity of the fifth storage groove 15e. The pivot axis 20a is formed in a vicinity of the destination when moving the first joint pin 10c of the rack member 10 in the third storage groove 15c in the E-direction, while the pivot axis 20b is formed in a vicinity of the destination when moving the second joint pin 10d of the rack member 10 in the fifth storage groove 15e in the F-direction. The first switching lever 21 pivots about the pivot axis 20a, and the second switching lever 22 pivots about the pivot axis 20b.

As shown in FIG. 1 and FIG. 4(a), the first switching lever 21 includes a fulcrum ring 21a inserted into the pivot axis 20a so as to be freely rotatable, a switch contact arm 21b extending from the fulcrum ring 21a in the substantially B-direction, a first joint arm 21c extending out of the fulcrum ring 21a in the substantially F-direction and a second joint arm 21d extending from the fulcrum ring 21a in the substantially A-direction. The leading end of the switch contact arm 21b is divided to a first pressing part $21b_1$ and a second pressing part $21b_2$. The leading ends of the first joint arm 21c and the second joint arm 21d are respectively projected out in the third storage groove 15c so as to be in contact with the first joint pin 10c of the rack member 10. As a result, while being interlocked with the movement of the rack member 10, the first switching lever 21 pivots in the I-direction or the J-direction. The lower portion of the fulcrum ring 21a is a boss section 21e which is slightly projected downward, where a spring 24 is wound and fixed.

The second switching lever 22 has the same configuration as the first switching lever 21. Namely, the second switching lever 22 includes a fulcrum ring 22a, a switch contact arm 22b, a first joint arm 22c, a second joint arm 22d, a first pressing section $22b_1$, a second pressing section $22b_2$ and a boss section 22e.

As shown in FIG. 4(a), at a position slightly biased to the B-direction of the shafts 20a and 20b, pins 23a and 23b are formed. On the respective back surfaces of the switching levers 21 and 22, the first joint pin 21f and the second joint pin 22f are respectively formed in the H-direction. The two legs of the spring 24 which is fixed so as to be wound around the boss section 21e are placed so as to sandwich the pin 23a and the first joint pin 21f. Therefore, even if the first switching lever 21 pivots in the I-direction or the J-direction, a restoring force of the spring 24 is exerted to maintain the first switching lever 21 at a neutral position. Similarly, the restoring force from the spring 24 which is fixed so as to be wound around the boss section 22e is exerted so as to maintain the second switching lever 22 at a neutral position.

The first switching lever 21 switches ON/OFF the first switch 26 by making the leading end of the switch contact arm 21b contact the first switch 26 by rotating in synchronous with the movement of the rack member 10. Therefore, the first switch 26 is mounted on the back surface of the rack storage section 12 so as to be projected upward from the switch hole 6m formed on the bottom face of the rack storage section 12. The second switch 27 which is switched ON/OFF by the second switching lever 22 has the same arrangement as the first switch 26.

Figure 6:
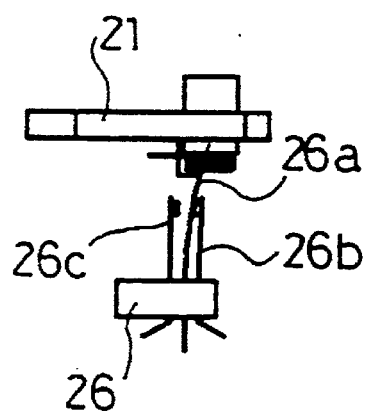
FIGS. 6(a) and (b) are explanatory views of a switch for detecting an operation state of a disk reproducing device and of a switching lever which serves as a switching member for the switch.

For example, as shown in FIG. 6(a), the switch 26 is a switch of two-circuit and two-contact switch. The switch 26 includes a movable piece 26a made of a flexible material so as to be bent when being pushed by the first pressing section $21b_1$ or the second pressing section $21b_2$ of the first switching lever 21, a first contact 26b being in contact with the movable piece 26a by the rotation of the first switching lever 21 in the I-direction and the second contact 26c being in contact with the movable piece 26a by the rotation of the first switching lever 21 in the J-direction.

Figure 6B:
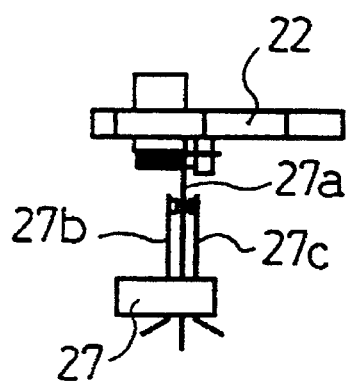

As shown in FIG. 6(b), the second switch 27 has the same configuration as the first switch 26. Namely, the second switch 27 includes a movable piece 27a, a first contact 27b and a second contact 27c. Opposite to the first switch 26, the movable piece 27a is made in contact with the first contact 27b by the rotation of the second switching lever 22 in the J-direction. Whereas, the movable piece 27a is made in contact with the second contact 27c by the rotation of the second switching lever 22 in the I-direction. However, the difference lies in the following:

As shown in FIG. 1, a guide slit 25 for guiding the up-and-down movement and the movement between the trays 3 and 4 of the reproducing unit 29 (to be described later) is formed on the side face of the rack storage section 12 in the B-direction. As shown in FIG. 4(c), the guide slit 25 has substantial U-shape extending in the E–F direction. Namely, the guide slit 25 includes a first vertical slit 25a (first vertical guide slit) formed at position corresponding to the loading position of the first tray 3 so as to extend in the G–H direction, a horizontal slit 25c (horizontal guide slit) extending in the E–F direction, a first oblique slit 25b for connecting in an oblique direction the first vertical slit 25a and the horizontal slit 25c with a very short distance, a second vertical slit 25e (second vertical guide slit) which is formed at a position corresponding to the loading position of the second tray 4 so as to extend in the G–H direction and a second oblique slit 25d for connecting the second vertical slit 25e and the horizontal slit 25c with a very short distance.

Here, the first oblique slit 25b and the second oblique slit 25d may be formed in a curved shape.

The respective lengths of the first vertical slit 25a and the second vertical slit 25e are selected to be identical with the height difference between the first cam 11c or the second cam 11e and the horizontal piece 11a of the cam portion 11. The guide slit 25 and the cam portion 11 are arranged so as to always penetrate through varying one portion.

As shown in FIG. 1, on the side face in the B-direction of the housing 6, hooks 6n for mounting the disk holding plate 7 with a screw, etc., are formed so as to be projected in the G-direction. As shown in FIG. 3, for mounting the disk holding plate 7, the upright pieces 6h are also used. Additionally, on the upright in the A-direction of the housing 6, i.e., on the front face, a window portion 6p (see FIG. 1) is formed, which allows the tray gear 16 to be manually rotated without using a motor. As a result, for example, in repairing, an operation of each part can be confirmed by repeating an operation by a randomly selected part of the disk reproducing device 1.

[Disk Holding Plate]

On the disk holding plate 7, holding circles 7a are formed so that respective centers thereof coincides with the rotation axes of the CDs accommodated in the trays 3 and 4 at the loading position. Each holding circle 7a has a taper shape so as to extend in the G-direction within the thickness of the disk holding plate 7.

The disk holder 28 includes a holding plate 28a with a diameter larger than the diameter of the holding circle 7, the holding plate 28a being freely rotatable, a circular support section 28b which mates with the holding circle 7a and a circular magnet 28c which is formed in a recess in the support portion 28b. When reproducing the recorded information from the CD 5 mounted on the turn table (to be described later) of the reproducing unit 29, the magnetic suction force is exerted between the magnet 28c and the turn table, and the holding plate 28a formed on the back surface side of the disk holding plate 7 is separated from the back surface of the disk holding plate 7 so as to press the CD 5 to the turn table. In this state, the turn table, the CD 5 and the holding plate 28a are integrally pivot.

When the magnet 28c and the turn table are in such position that the suction force is not exerted therebetween, the holding plate 28a is lowered in the H-direction by its dead weight. However, this would not hinder the movements of the trays 3 and 4 in the A-B direction.

At the center on the back surface of the disk holding plate 7, a rib plate 7b projected in the H-direction is formed so as to extend in the A-B direction. On the side face in the F-direction of the rib plate 7b, a guide small piece 7c which is projected in the F-direction and is bent in the G-direction is formed. Further, on the side face in the E-direction of the rib plate 7b, a guide small piece 7d which is projected in the E-direction and is bent in the G-direction is formed. As in the case of the guide portions 6a and 6b of the housing 6, the upper ends of the guide small pieces 7c and 7d respectively fit in the guide grooves 3d and 4d of the trays 3 and 4, thereby guiding the movement of the trays 3 and 4 in the A-B direction.

Further, as shown in FIG. 3, at the end in the A-direction of the rib plate 7b, the projection 7e extending in both E and F directions are formed so as to prevent the guide rims 3g and 4g of the trays 3 and 4 from lifting up when the trays 3 and 4 move in the A-B direction. The projections 7f and 7g are formed so as to be projected in the E-direction and the F-direction respectively from the rib plate 7b so as to correspond to the positions of the small guide pieces 7c and 7d at the same height positions as the projection 7e. These projections 7f and 7g also serve to prevent the guide rims 3g and 4g from lifting up together with the projection 7e.

The bottom portion of the rib plate 7b positioned between the small guide pieces 7c and 7d and the projection 7e is slightly biased to the G-direction from the upper end portion of the rack member 10, which prevents the rack member 10 from floating in the G-direction.

In a vicinity of the end in the B-direction, on the back surface of the disk holding plate 7, a holding piece 7h which is projected out to the H-direction is formed so as to extend in the E–F direction. Further, holding pins 7i are projected in the H-direction from the back surface of the disk holding plate 7 at position between the holding piece 7h and each holding circle 7a at position biased to the holding piece 7h. The functions of the holding piece 7h, and the holding pins 7i will be explained later when explaining the configuration of the reproducing unit 29.

[Reproducing Unit]

The reproducing unit 29 reads recorded information from the CD 5 on the tray 3 or 4 at a loading position while rotating the CD 5. The reproducing unit 29 can be apart from and approximate to the tray 3 or 4 at the loading position and can linearly reciprocate between the trays 3 and 4.

More specifically, a spindle motor 29a is mounted on the back surface of the chassis 29b to be biased to the end portion in the A-direction, and a turn table 29c is mounted to the rotation shaft of the spindle motor 29a projected to the surface of the chassis 29b. An optical pickup 29d which optically scans the CD 5 in the radial direction is supported by the chassis 29b so as to be allowed to move in the A–B direction between the mounted position of the spindle motor 29a and the end portion in the B-direction of the chassis 29b.

On the peripheral portion of the chassis 29b, plural anti-vibration rubbers 29e are formed. Through these anti-vibration rubbers 29e, the chassis 29b is mounted to the back surface of a cover-like holding chassis 30 using a vis 29f, etc. As a result, vibrations generated from the outside of the reproducing unit 29 can be absorbed by the anti-vibration rubber 29e. Therefore, the reproducing unit 29 can be set in the floating state in which the vibrations are less likely to receive. The reproducing unit 29 and the holding chassis 30 which are formed in one integral part correspond to a reproducing unit recited in claims.

On the holding chassis 30, an opening 30a for exposing therethrough the turn table 29c and the optical pickup 29d which moves in the A–B direction is formed. The width of the holding chassis 30 in the E–F direction is selected to be one size smaller than the width of the first tray 3 or the second tray 4 in the E–F direction, and the length of the holding chassis 30 in the A–B direction is selected to be substantially identical with the length in the A–B direction of the reproducing unit storage section 13.

On the upright piece, i.e., the side face in the A-direction of the holding chassis 30, a support bar 30b as a joint pin is mounted in the A-direction to fit in the cam portion 11 of the rack member 10 through the guide slit 25 formed in the rack storage section 12.

Further, at the end portion in the A-direction of the side wall in the F-direction of the holding chassis 30, a pin 30c is formed so as to be projected out in the F-direction. At the end portion in the A-direction of the side wall of the end face in the E-direction of the holding chassis 30, a pin 30d is formed so as to be projected out in the E-direction. At the corner in the F-directiose on the boundary between the rack storage section 12 and the reproducing unit storage section 13, a groove 6q (see FIG. 4(a)) for fitting therein the pin 30c in the reproducible state of the reproducing unit 29 with respect to the first tray 3 is formed. Similarly, at the corner in the E-direction on the boundary between the rack storage section 12 and the reproducing unit storage section 13, a groove 6r (see FIG. 4(a)) for fitting therein the pin 30d in the reproducible state of the reproducing unit 29 with respect to the second tray 4 is formed.

Namely, by the engagement between the pin 30c and the groove 6q, the position in the A–B direction of the reproducing unit 29 in the reproducible state with respect to the first tray 3 is determined. On the other hand, by the engagement between the pin 30d and the groove 6r, the position of the reproducing unit 29 in the A–B direction in the reproducible state with respect to the second tray 4 is determined.

Next, the mechanism for supporting the up-and-down movement in the G–H direction and the movement in the E–F direction of the reproducing unit 29 will be explained. As shown in FIG. 1 and FIG. 5, at the end portion in the B-direction of the back surface of the holding chassis 30, a unit joint groove 30e (first joint section) is formed so as to extend in the E–F direction. On the other hand, a unit receiving rail 6s (first guide means) in mesh with the unit joint groove 30e is formed on the inner surface of the rear wall, i.e., the side face in the B-direction of the housing 6 to the entire length of the reproducing unit storage section 13 in the E–F direction. As a result, the unit joint groove 30e slides along the unit receiving rail 6s, thereby guiding the reproducing unit 29 in the E–F direction.

Moreover, the unit receiving rail 6s also serves as a rotation axis of the holding chassis 30 which integrally pivots in the L–K direction with the reproducing unit 29. When the holding chassis 30 pivots in the K-direction, the reproducing unit 29 is lowered to be away from the first tray 3 or the second tray 4. On the other hand, when the holding chassis 30 pivots in the L-direction, the reproducing unit 29 is raised to approximate to the first tray 3 or the second tray 4.

As shown in FIG. 4(a) or FIG. 5, the downward movement of the reproducing unit 29 is stopped by a downward movement guide groove 6t (second guide means) formed at the lower position of the boundary between the rack storage section 12 and the reproducing unit storage section 13. Namely, the bottom end of the upright piece which serves as the side face in the A-direction of the holding chassis 30 is formed as a joint end 30f (second joint section) which is projected out in the H-direction. As the joint end 30f fits in the downward movement guide groove 6t, the downward movement of the reproducing unit 29 is stopped.

Like unit receiving rail 6s, the downward movement guide groove 6t is formed to the entire length of the reproducing unit storage section 13 in the E–F direction. This enables the reproducing unit 29 to be guided in the E–F direction while maintaining it at the lower position.

Here, the engagement between the unit receiving rail 6s and the unit joint groove 30e is smoother than the engagement between the joint end 30f and the downward movement guide groove 6t. In other words, the clearance in the A–B direction between the joint end 30f and the downward movement guide groove 6t is selected to be smaller than the clearance in the A–B direction between the unit receiving rail 6s and the unit joint groove 30e. This enables the holding chassis 30 to be freely rotatable about the unit receiving rail 6s which serves as a rotation shaft. Moreover, when guiding the movement of the reproducing unit 29 in the E–F direction at the lower position thereof, the reproducing unit 29 can be prevented from wobbling in the I–J direction. As a result, the movement of the reproducing unit 29 in the E–F direction can be smoothened and accelerated.

A portion in a vicinity of the end portion in the B-direction of the upper surface of the holding chassis 30 is cut in U-shape so as to form a tongue-like piece 30g (hereinafter referred to as a formed spring) as elastic pushing means. For example, when the reproducing unit 29 is set in the reproducible state with respect to the first tray 3, the aforementioned holding pin 7i of the disk holding plate 7 comes in contact with the formed spring 30g and presses it in the H-direction. As a result, a force is exerted from the formed spring 30g in a direction of preventing the unit joint groove 30e from floating above the unit receiving rail 6s.

The same function can be achieved by providing the holding pin 7i in the reproducing unit 29 and forming the formed spring 30g on the disk holding plate 7.

As shown in FIG. 5, when the reproducing unit 29 is set in the reproducible state with respect to the tray 3 or 4, the holding piece 7h of the disk holding plate 7 is moved to approximate to the end portion in the B-direction of the holding chassis 30. It is shown in FIG. 5 that the end portion of the holding chassis 30 in the B-direction is sandwiched between the holding piece 7h and the unit receiving rail 6s. In practice, however, between the end portion in the B-direction of the holding chassis 30a and the holding piece 7h, a small clearance is formed in the G–H direction. Therefore, while maintaining the holding chassis 30 so as to be freely rotatable, the unit joint groove 30e can be prevented from being separated from the unit receiving rail 6s due to the externally generated vibrations, etc.

Lastly, on the back wall, i.e., the end surface in the B-direction of the housing 6, an opening 6u for leading therethrough the wirings of the unit reproducing unit 29 to the outside of the disk reproducing unit 1 is formed at the position below the unit receiving rail 6s. Here, the width of the opening 6u in the E–F direction is selected to be substantially identical with the distance the reproducing unit 29 moves in the E–F direction.

[Reproducible State of the First Tray]

In the described arrangement, the relative positions of various members in the reproducible state with respect to the first tray 3 will be explained in reference to FIG. 1, FIGS. 4(a)–(c), FIG. 5 and FIG. 6. As shown in FIG. 4(a), the trays 3 and 4 are at the respective loading positions. The reproducing unit 29 is at the position where the turn table 29c is projected out of the tray opening 3b of the first tray 3. In this state, the pin 30c projected out of the holding chassis 30 in the F-direction fits in the groove 6q of the housing 6, thereby determining the position of the reproducing unit 29 in the A–B direction. Moreover, as shown in FIG. 5, as the holding pin 7i of the disk holding plate 7 presses the formed spring 30g of the holding chassis 30 in the H-direction, the unit guide groove 30e can be prevented from floating above the unit receiving rail 6s.

The CD 5 mounted on the turn table 29c is fixed onto the turn table 29c by the disk holder 28. The CD 5 held at the position is optically scanned in the radial direction by the optical pickup 29d while being rotatable driven.

On the other hand, as also shown in FIG. 4(b), when the tray 3 or 4 is at its loading position, the end portion in the A-direction of the guide groove 3c or 4c comes in contact with the guide portion 6a or 6c to hold the tray 3, 4 in its stoppage position, thereby preventing the tray 3 or 4 from being moved in the B-direction further from its loading position.

As shown in FIG. 5, since the stopper 8h of the first tray 3 comes in contact with the back surface portion 10b of the rack member 10, the first tray 3 can be prevented from moving in the A-direction. Therefore, in the reproducible state of the first tray 3, the first tray 3 is held at its loading position. Here, although the rack portion 10a of the rack member 10 is in mesh with the rack drive gear 19, since the tray rack 3e formed on the side face of the first tray 3 is not in mesh with the upper gear 16a, even if the tray gear member 16 pivots, the rotation force would not drive the tray rack 3e.

In the reproducible state of the first tray 3, in the guide groove 9 formed on the back surface of the second tray 4, the second joint pin 10d is positioned at the end portion in the F-direction of the third guide portion 9c. Namely, the movement of the second tray 4 in the A-direction is prevented by the second joint pin 10d of the rack member 10.

Next, as shown in FIG. 4(c), the support bar 30b projected out of the holding chassis 30 in the A-direction fits in the portion in a vicinity of the end portion in the F-direction of the first cam 11c of the cam portion 11 formed in the rack member 10 and also fits in the end portion in the G-direction of the first vertical slit 25a of the guide slit 25. The horizontal position of the reproducing unit 29 for rotatably driving the CD 5 is held by the engagement between the support bar 30b and the first cam 11c and the engagement between the unit joint groove 30e and the unit receiving rail 6s. Moreover, as already described, as the support bar 30b fits in the first vertical slit 25a, the position of the reproducing unit 29 in the E–F direction is determined.

As shown in FIG. 1, the rack member 10 is stored in the rack storage groove 15 of the rack storage section 12 for guiding the movement thereof. Especially, in the reproducible state of the first tray 3, the rack member 10 is stored in the first storage groove 15a, the second storage groove 15b and the third storage groove 15c.

The first joint pin 10c of the rack member 10 is positioned at the third storage groove 15c, and the first contact piece 10g as the first switching member presses the leading end of the first joint arm 21c of the first switching lever 21 in the E-direction. As a result, a component force exerted to pivot the first switching lever 21 in the I-direction against the restoring force exerted from the spring 24 is generated at the contact position between the first contact piece 10g and the leading end of the first joint arm 21c. When the first switching lever 21 pivots in the I-direction, as shown in FIG. 6(a), the first pressing section 21b₁ changes the position of the movable piece 26a of the first switch 26 such that the movable piece 26a comes in contact with the first contact 26b. When the first switch 26 is switched ON by the contact between the movable piece 26a and the first contact 26b, the reproducible state of the reproducing unit 29 with respect to the first tray 3 is detected.

Upon detecting the reproducible state of the reproducing unit 29, the control section (not shown) stops the drive source such as a motor, etc.

On the other hand, as shown in FIG. 6(b), the second switch 27 is switched OFF at which the movable piece 27a is connected neither to the first contact 27b nor the second contact 27c by the engagement among the spring 24, the first joint pin 22f and the pin 23b.

[Switching of The Reproducible State From The First Tray to The Second Tray]

Figure 8A:
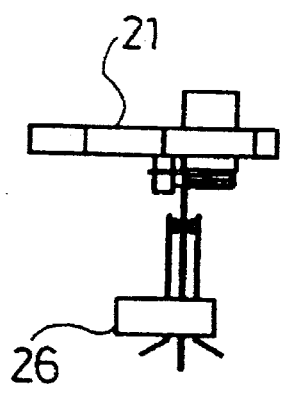
FIGS. 8(a) and (b) are explanatory views showing the relative position of the switch and the switching lever in the state shown by FIGS. 7(a) through (c).
Figure 8B:
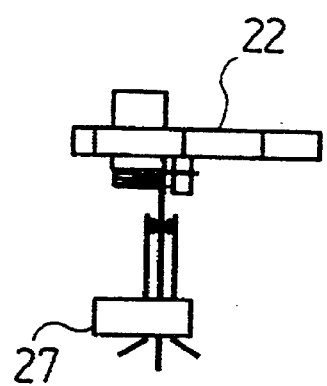

When the tray gear member 16 pivots in the J-direction from the state shown in FIG. 4(a), by a drive source (not shown) such as a motor, etc., the rack drive gear 19 pivots in the I-direction, i.e., a reverse direction by the rotation of the lower gear 16b of the tray gear member 16 in the J-direction. As a result, as shown in FIGS. 7(a) through (c), the rack member 10a in mesh with the rack drive gear 19 starts moving in the E-direction. Therefore, the second joint pin 10d slides along the third guide portion 9c of the second tray 4 in E-direction, while the first joint pin 10c slides along first guide portion 8a of the third tray 3 in the F-direction. As a result, since the first contact piece 10g moves in the F-direction, the first contact piece 10g becomes apart from the first switching lever 21, thereby setting the first switching lever 21 in a neutral position again by the restoring force exerted from the spring 24. As a result, as shown in FIG. 8(a), the first switch 26 is switched OFF. Here, as shown in FIG. 8(b), the second switch 27 is held in its OFF-position.

On the other hand, the support bar 30b of the holding chassis 30 moves along the first cam 11c to the end portion in the F-direction. However, since the first cam 11c is formed parallel to the E–F direction, i.e., horizontally, as is clear when comparing the FIG. 5 with FIG. 7(c), as long as the support bar 30b moves in the first cam 11c, the horizontal position, i.e., the reproducible state of the reproducing unit 29 can be maintained.

When the tray gear member 16 further pivots in the J-direction from the state shown in FIGS. 7(a) through (c), as shown in FIGS. 9(a) and (b), the rack portion 10a in mesh with the rack drive gear 19 is further driven in the E-direction. This, in turn, moves the support bar 30b from the first cam 11c to the first oblique cam 11b. Here, since the support bar 30b fits in the first vertical slit 25a, the first oblique cam 11b converts the movement of the rack member 10 in the E-direction to the movement of the support bar 30b in the H-direction together with the first vertical slit 25a.

Therefore, when the tray gear member 16 pivots in the J-direction from the reproducible state of the first tray 3, and the rack portion 10a in mesh with the rack drive gear 19 is moved in the E-direction, as shown in FIG. 9(c), the reproducing unit 29 is lowered in the H-direction. Here, the reproducing unit 29 is lowered in the H-direction by rotating in the K-direction in fact about the unit receiving rail 6s as a rotation shaft. With the described downward movement of the reproducing unit 29, the holding pin 7i moves apart from the formed spring 30g, thereby forming a predetermined clearance between the unit receiving rail 6s and the unit joint groove 30e. However, in the molding position of the unit joint groove 30e, as the holding chassis 30 is pressed by the holding piece 7h, the unit receiving rail 6s can be prevented from being disengaged from the unit joint groove 30e.

As shown in FIG. 9(c), the pin 30c which is projected out of the holding chassis 30 in the F-direction is lowered along the groove 6q.

The disk holder 28 for holding the CD 5 by sucking the turn table 29c is mounted on a holding circle 7a of the disk holding plate 7. Therefore, by the rotations of the reproducing unit 29 in the K-direction, the suction between the disk holder 28 and the turn table 29 can be cancelled, and as a result, the turn table 29c is moved away from the disk holder 28. As a result, when the turn table 29c is further lowered below the tray opening 3b in the H-direction, the CD 5 is displaced from the turn table 29c to be kept on the disk placement part 3a.

FIGS. 10(a) through (c) show the state where the tray gear member 16 further pivots in the J-direction to move the rack member 10 by the rack drive gear 19, and the support bar 30b starts coming in contact with the first oblique slit 25b of the guide slit 25. In this state, the reproducing unit 29 is about to reach the lower limit position in the H-direction, and is still being lowered. The upper portion in the G-direction of the turn table 29c and the lower portion 3h of the first tray 3 are positioned on the same plane which is parallel to the A–B direction.

In the state where the support bar 30b starts contacting the first oblique slit 25b, the joint end 30f that is projected out of the holding chassis 30 in the H-direction starts fitting in the downward movement guide groove 6t of the housing 6, which is in mesh therewith at the lower limit position.

When the tray gear member 16 further pivots in the J-direction, as shown in FIG. 11(b), the support bar 30b slides along the first oblique slit 25b to the horizontal slit 25c while being pushed by the first oblique cam 11b. The first oblique slit 25b is key to smoothly and surely move the support bar 30b from the first vertical slit 25a to the horizontal slit 25c.

If the support bar 30b cannot be moved from the first vertical slit 25a to the horizontal slit 25c, when the support bar 30b comes in contact with the second oblique cam 11d, the support bar 30b would be pushed by the second oblique cam 11d which may cause the support bar 30b to be inversely driven along the first vertical slit 25a. Since the direction of this inverse movement would coincide with the direction of the gravitational force exerted on the reproducing unit 29, the described inverse movement is likely to generate when the disk reproducing device 1 is placed upside down.

Therefore, by connecting the first oblique slit 25b and the horizontal slit 25c with an oblique slit or a curved surface slit, the support bar 30b can be easily guided to the outside of the first vertical slit 25a. As a result, even when the disk reproducing unit 1 is placed upside down, an operability of the disk reproducing unit 1 can be improved without generating an operation error, thereby providing a disk reproducing device in which an operation error is less likely to generate at low cost.

With the sliding movement of the support bar 30b along the first oblique slit 25b, the support bar 30b is slightly biased to the E-direction. This starts moving the reproducing unit 29 in the E-direction, i.e., to the second tray 4 as shown in FIG. 11(a).

In this state, the movement of the reproducing unit 29 in the E-direction is guided by the unit receiving rail 6s in mesh with the unit joint groove 30e and by the lower guide groove 6 with which the joint end 30f is in mesh.

Figures 12A, 12B, 12C:
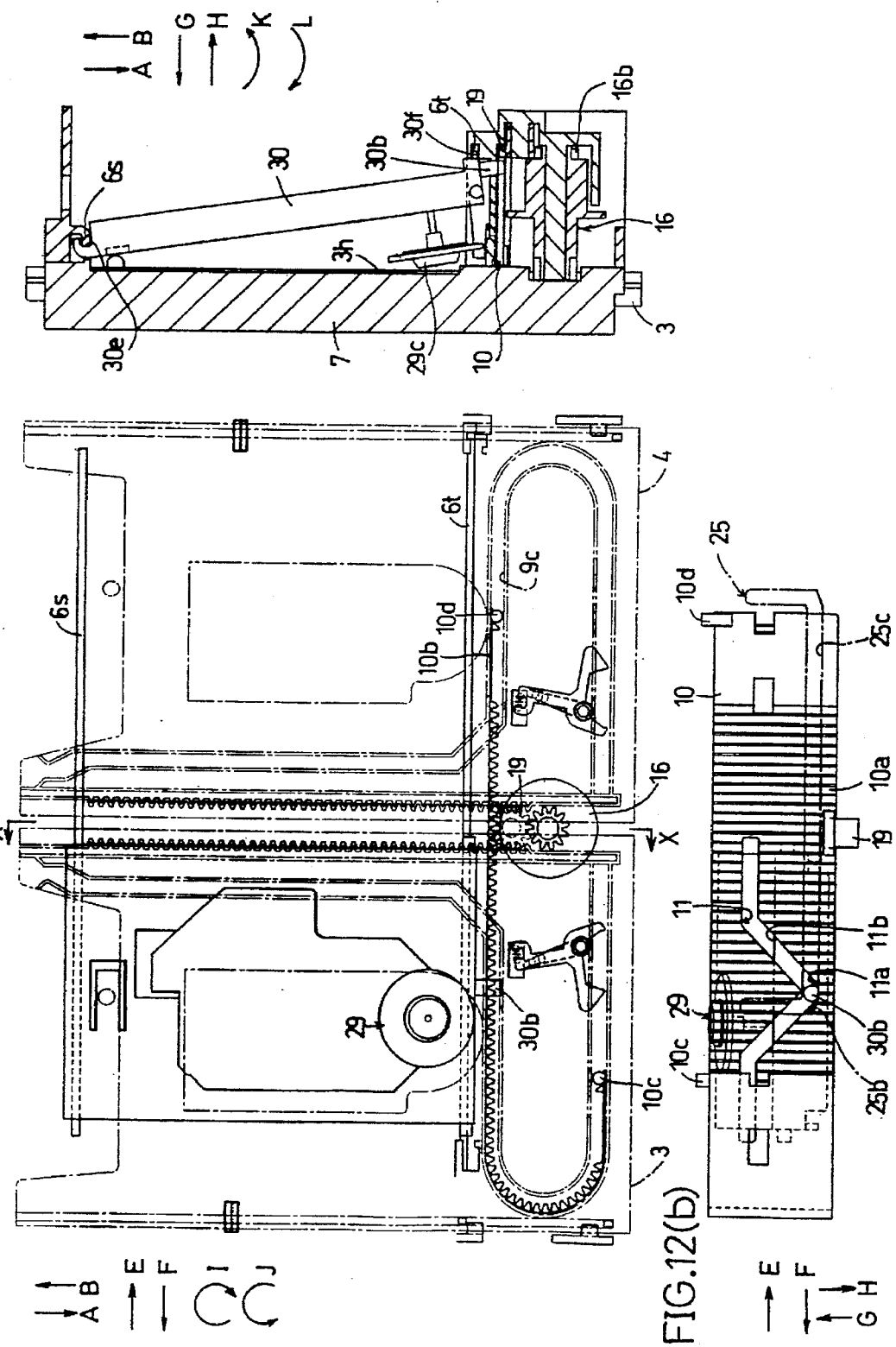
FIG. 12(a) is a plan view showing the state where the reproducing unit reaches the retreat position of the first tray.
FIG. 12(b) is an explanatory view showing the state of the rack member in accordance with FIG. 12(a).
FIG. 12(c) is a cross-sectional view of FIG. 12(a) taken along the plane indicated by the line X—X FIG. 13(a) which is a cross-sectional view of FIG. 13(b) taken along the plane indicated by the line Y—Y illustrates a state where the reproducing unit reaches the retreat position with respect to the second tray.

When the rack portion 10a in mesh with the rack drive gear 19 is further moved in the E-direction from the state shown in FIGS. 11(a) through (c), as shown in FIG. 12(b), the support bar 30b will finish making the sliding contact with the first oblique cam 11b to be moved to the horizontal portion 11a, in the meantimes, finishes the sliding contact with the first oblique slit 25b to start the sliding contact with the horizontal slit 25c. As a result, as shown in FIG. 12(c), the reproducing unit 29 completes the rotating movement in the K direction and is lowered to the lower limit position, thereby forming a clearance between the turn table 29c and the bottom portion 3h of the first tray 3 to fit the joint end 30f completely in the downward movement guide groove 6t. This state is referred to as the movable state of the reproducing unit 29 in the E–F direction.

In this state, the engagement between the unit joint groove 30e and the unit receiving rail 6s is smoother compared with the engagement between the joint end 30f and the downward movement guide groove 6t. Thus, the movement of the reproducing unit 29 in the E–F direction is guided both by the downward movement guide groove 6t as a main guide and the unit receiving rail 6s as a sub-guide. Additionally, since the joint end 30f fits in the downward movement guide groove 6t, the reproducing unit 29 can be smoothly moved in the E–F direction without wobbling in the A–B direction and the I–J direction.

Additionally, since the bottom portion 4h of the second tray 4 has the same shape as the bottom portion 3h of the first tray 3, the movement of the turn table 29c will not be hindered. As shown in FIG. 12(a), the movement of the second tray 4 in the A–B direction is prevented by the second joint pin 10d in mesh with the third guide portion 8c. This movement is also prevented by making the stopper 9h projected out of the second tray 4 in the H-direction in contact with the back surface portion 10b of the rack member 10. As a result, the loading position of the second tray 4 will not be displaced during the movement of the reproducing unit 29 in the E–F direction.

Thereafter, when the rack portion 10a in mesh with the rack drive gear 19 is further moved in the E-direction, as shown in FIG. 13(c), the support bar 30b is pushed by the second oblique cam 11d in the E-direction to slide in the E-direction while being guided by the horizontal slit 25c until it reaches the second oblique slit 25d. As a result, the reproducing unit 29 will be moved towards the second tray 4 with the holding chassis 30 guided by the downward movement guide groove 6t and the unit receiving rail 6s.

With the described movement, the rack member 10 slides along the first storage groove 15a, and is turned at the fourth storage groove 15d to slides along the fifth storage groove 15e, while the second joint pin 10d slides along the third guide portion 9c, the second guide portion 9b and the first guide portion 9a in this order. In this state, the stopper 8h of the first tray 3 will no longer face the back surface portion 10b of the rack member 10. However, as the first joint pin 10c mates with the third guide portion 8c, the first tray 3 can be sill prevented from moving in the A–B direction.

When the rack portion 10a in mesh with the rack drive gear 19 is further moved in the E-direction, as shown in FIG. 14(c), the support bar 30b is made in contact with the second oblique slit 25d while being pushed by the second oblique cam 11d in the E-direction. In this state, as shown in FIG. 15(c), the support bar 30b becomes more apart from the horizontal portion 11a in the G-direction as it moves along the second oblique slit 25d, and as shown in FIG. 14(a) and FIG. 15(a), the reproducing unit 29 is slightly raised in the G-direction. As a result, the joint end 30f becomes disengaged from the downward movement guide groove 6t.

As shown in FIG. 14(c), when the support bar 30b starts contacting the second oblique slit 25d, the pin 30d projected out in the E-direction from the holding chassis 30 starts fitting in the groove 6r as shown in FIG. 14(b).

When the rack portion 10a in mesh with the rack drive gear 19 is further moved in the E-direction from the state shown in FIGS. 15(a) through (c), as shown in FIG. 16(c), the support bar 30b is pushed up in the G-direction by the second oblique cam 11d, and its movement in the G-direction is guided by the second vertical slit 25e. As a result, the holding chassis 30 pivots in the L-direction about the unit receiving rail 6s (the rotation shaft). With this rotating movement, the reproducing unit 29 pivots in the L-direction and is raised to the tray opening 4b of the second tray 4. As a result, the joint end 30f is disengaged from the groove 6r, and the formed spring 30g starts contacting the holding pin 7i of the disk holding plate 7.

On the other hand, the CD accommodated in the disk placement part 4a of the second tray 4 is moved on the turn table 29c, and comes in contact with the disk holder 28. As a result, the turn table 29c is sucked by the magnet 28c, and the CD is held on the turn table 29c.

Thereafter, when the rack portion 10a is further moved in the E-direction, as shown in FIG. 17(c), the support bar 30b is made in contact with the upper end of the second oblique cam 11d, and is raised to the upper end of the second vertical slit 25e. Then, as shown in FIG. 17(a), the reproducing unit 29 is raised to the upper limit position with respect to the second tray 4 by further rotating in the L-direction. This, in turn, makes the disk holder 28 separate from the disk holding plate 7, and the reproducing unit 29, the CD and the disk holder 28 are in the floating state by the anti-vibration rubbers 29e.

When the reproducing unit 29 reaches its upper limit position, it is set in the horizontal reproducible position. However, as shown in FIG. 17(b), since the second joint pin 10d is still being moved along the first guide portion 9a, and the second contact piece 10h has not reached the second switching lever 22, the reproducible state of the reproducing unit 29 will not yet be detected. Namely, the tray gear member 16 keeps rotating in the J-direction, and as a result, the support bar 30b is guided from the upper end of the second oblique cam 11d to the second cam 11e.

The movement of the rack member 10, i.e., the rotation of the tray gear member 16 will continue until the second contact piece 10h pushes the second joint arm 22c of the second switching lever 22. As shown in FIG. 18(b), when the second contact piece 10h (the second switching member) comes in contact with the leading end portion of the first joint arm 22c and pushes it in the F-direction, the second switching lever 22 starts rotating in the J-direction against the restoring force exerted from the spring 24. As a result, the first pushing section $22b_1$ of the switch contact arm 22b moves the movable piece 27a of the second switch 27 to be biased to the F-direction, thereby making the movable piece 27a in contact with the first contact 27b as shown in FIG. 19(b). Then, the movable piece 27a and the first contact 27b are made contact, and the second switch 27 is switched ON, thereby detecting the reproducible state of the reproducing unit 29 with respect to the second tray 4 by the control section as in the case of the first switch 26.

When the control section detects the reproducible state of the second tray 4 in the described manner, as the drive source such as a motor, etc., will be stopped, the tray gear member 16 stops rotating in the J-direction, thereby stopping the movement of the rack member 10 to be held at position shown in FIG. 18(b). Additionally, even when the rack member 10 is moved in the F-direction to pivot the second switching lever 22, since the support bar 30b slides in the direction parallel to the F-direction, i.e., along the horizontal second cam 11e as shown in FIG. 18(d), the horizontal position of the reproducing unit 29 can be maintained as shown in FIG. 18(a).

On the other hand, as shown in FIG. 18(b), since the first joint pin 10c is positioned at the end portion in the E-direction of the third guide portion 8c of the first tray 3, the stopper 8h of the first tray 3 does not face the back surface portion 10b of the rack member 10. Therefore, the movement of the first tray 3 in the A–B direction is determined not by the contact between the back surface portion 10b and the stopper 8h but by engagement between the first joint pin 10c and the third guide portion 8c.

As described, the reproduction from the CD on the first tray 3 can be switched to the reproduction from the CD on the second tray 4 by rotating the tray gear member 16 in the J-direction so as to switch the first switch 26 OFF, and activating the motor until the first contact 27b of the second switch 27 is switched ON, thereby providing a simple and accurate switching mechanism at low price.

Additionally, each reproducible state, the information recorded on the CD can be reproduced by activating the spindle motor 29a and the optical pickup 29d using a known playing circuit (not shown). Needless to mention, the reproduction from the CD placed on the tray 3 or the tray 4 can be stopped in the middle, and upon completing the reproduction from the CD on the tray 3 or 4, by moving the producing unit 29 automatically to the other of the tray 3 or 4, the CD already accommodated in the other of the tray 3 or 4 can be reproduced. Additionally the reproducing unit 29 can reciprocate between the trays 3 and 4 and the information recorded on the CD accommodated in each of the trays 3 or 4 can be reproduced by turns. Furthermore, while the CD accommodated in the tray 3 or 4 is being reproduced, the CD accommodated in the other of tray 3 or 4 can be exchanged for another disk.

Next, in the case of switching the reproduction from the CD on the second tray 4 to the reproduction from the CD on the first tray 3, the drive source such as a motor, etc., pivots in an inverse direction. Namely, by rotating the tray gear member 16 in the I-direction, the rack drive gear 19 pivots in the J-direction, and the rack portion 10a in mesh with the rack drive gear 19 is moved in the F-direction. As a result, the second switch 27 is switched OFF, and by rotating the tray gear member 16 to the position where the first contact 26b of the first switch 26 is turned ON, the reproducing unit 29 can be moved from the second tray 4 to the first tray 3. For the operation of each section, the above-mentioned operation is performed in the inverse order, and thus the explanations thereof shall be omitted here.

[Tray Opening Operation]

The explanation will be given through the case where a successive reproducing operation is performed by sequentially performing an opening operation for discharging the other of the tray 3 or 4 to the unloading position while reproducing information from the CD on one of the tray 3 or 4, and a closing operation for, after a disk has been exchanged, moving the tray back from the unloading position to the loading position. In the disk reproducing device 1 of the present embodiment, while maintaining the reproducible state of the reproducing unit 29 corresponding to one of the tray 3 or 4, i.e., during the reproduction from the CD accommodated in one of the tray 3 or 4, the other of the tray 3 or 4 can be opened and closed for allowing the CD to be exchanged.

As already explained, FIGS. 4(a) through (c) and FIG. 6 show the reproducible state of the reproducing unit 29 with respect to the first tray 3. In the case of discharging the second tray 4 from the disk reproducing device 1 while maintaining the reproducing unit 29 in the reproducible state, the tray gear member 16 pivots in the I-direction opposite to the case of moving the reproducing unit 29 to the second tray 4. This, in turn, pivots the rack drive gear 19 in the J-direction, and moves the rack portion 10a in mesh with the rack drive gear 19 in the F-direction. As a result, as shown in FIG. 19(a), the second joint pin 10d reaches a boundary between the third guide portion 9c and the contact portion 9d of the second tray 4. In this state, as shown in FIG. 19(b), the support bar 30b of the holding chassis 30 slides along the first cam 11c provided on the rack member 10 in the direction parallel to the E–F direction, i.e., to the end portion in the E-direction, thereby maintaining the reproducing unit 29 in the horizontal reproducible state.

Additionally, as the reproducing unit 29 is in the floating state by the anti-vibration rubbers 29e, vibrations which may generate when sliding the first cam 11c are less likely to transmit to the reproducing unit 29, thereby continuing a desirable reproducing operation.

On the other hand, as the first contact piece 10g which pushes the first joint arm 21c of the first switching lever 21 in the E-direction passes in the E-direction, the first switching lever 21 pivots in the J-direction by the restoring force exerted from the spring 24 to be set back to a neutral position. As a result, the first switch 26 is switched OFF.

Figures 20A, 20B:
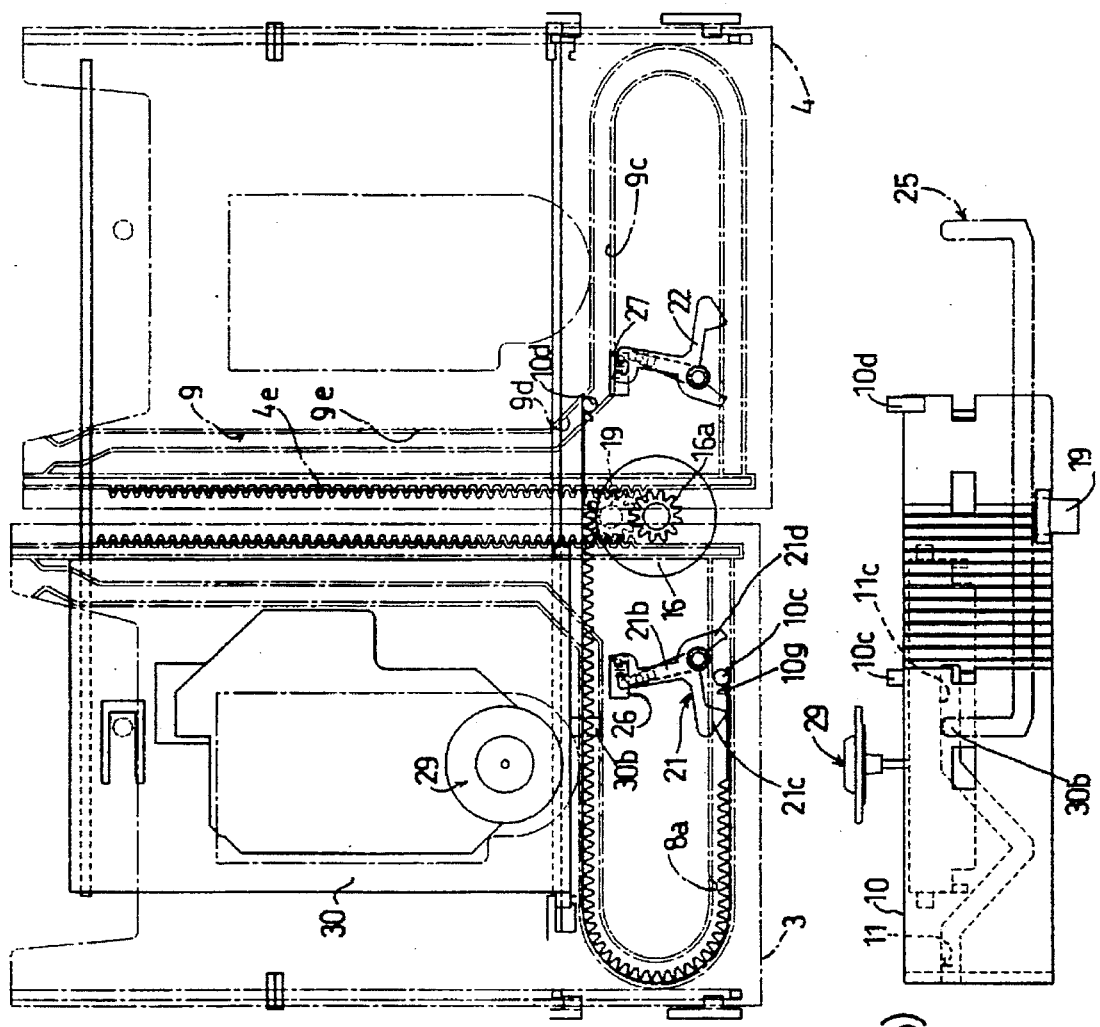
FIG. 20(a) is a plan view showing a movement of a contact portion in a guide groove of the second tray for engaging the tray rack with the upper gear to move the second tray to the unloading position while maintaining the reproducing unit at the reproducible position of the first tray.
FIG. 20(b) is an explanatory view showing a movement of the first cam of the rack member.

From this state, when the rack portion 10a which is in mesh with the rack drive gear 19 is moved in the F-direction, the second joint pin 10d fits in the contact portion 9d. Here, a component force for pushing the contact portion 9d in the A-direction is exerted from the second joint pin 10d, thereby driving the second tray 4 to be pushed in the A-direction as shown in FIG. 20(a). Additionally, when the second joint pin 10d slides the contact portion 9d toward the fourth guide portion 9e, as shown in FIG. 20(b), the support bar 30b further slides along the first cam 11c to the end portion in the E-direction. Additionally, the reproducing unit 29 is kept in its horizontal reproducible state as long as the support bar 30b is at the first cam 11c.

When the second tray 4 is further moved in the A-direction, the tray rack 4e formed on the second tray 4 is moved in the A-direction, namely, to the upper gear 16a of the tray gear member 16. As a result, as shown in FIG. 20(a), the first tooth of the tray rack 4e starts being engaged with the upper gear 16a.

The contact portion 9d of the guide groove 9 is inclined at 45° with respect to the A–B direction and E–F direction. As a result, in the state where the rack drive gear 19 and the rack portion 10a, and the tray rack 4e and the upper gear 16a are respectively engaged, the rack portion 10a and the tray rack 4e can be moved respectively in the E–F direction and in the A–B direction simultaneously. Furthermore, the contact piece 9d is formed at such a position that a timing for avoiding the first tooth of the tray rack 4e to be placed over the leading end of one tooth of the upper gear 16a can be ensured.

From the states shown in FIGS. 20(a) and (b), when the tray gear member 16 further pivots in the I-direction, as shown in FIG. 21(b), the rack drive gear 19 further drives the rack portion 10a in the F-direction, and as shown in FIG. 21(a), the upper gear 16a further drives the tray rack 4e in the A-direction, thereby further moving the second tray 4 in the A-direction. As a result, the second joint pin 10d reaches the boundary between the contact portion 9d and the fourth guide portion 9e, while the first joint pin 10c slides along the first guide portion 8a in the E-direction. Thus, the first joint pin 10c reaches a vicinity of the second joint arm 21d of the first switching lever 21.

In this state, the rack drive gear 19 becomes disengaged from the rack portion 10a, and the rotation of the tray gear member 16 will not be transmitted to the rack portion 10a, thereby stopping the rack member 10.

On the other hand, as the upper gear 16a and the tray rack 4e are engaged, as shown in FIG. 2(c), even while the rack member 10 is in its stoppage position, the rotation of the tray gear member 16 will be transmitted to the tray rack 4e through the upper gear 16a. Thus, the second tray is further moved in the A-direction as shown in FIGS. 22(a) and (b). As a result, the second joint pin 10d slides along the fourth guide portion 9e relatively in the B-direction to reach the boundary between the fourth guide portion 9e and the cam portion 9f as shown in FIG. 22(b).

The movement of the second tray 4 in the A–B direction is guided by the guide portions 6c and 6f of the housing 6 in mesh with the guide groove 4c, the guide portion 6d in mesh with the guide groove 4d, and by the small guide piece 7d formed on the disk holding plate 7. Additionally, since the float of the second tray 4 in the G-direction is prevented by the float-preventing pieces 6i and 6j of the housing 6 and the projections 7e, 7f and 7g of the disk pushing plate 7, even when the disk reproducing device 1 is inclined from the horizontal state, the operation will not be adversely affected.

When the tray gear member 16 further pivots in the I-direction from the state shown in FIGS. 22(a) through (c), the upper gear 16a drives the tray rack 4e. As a result, as shown in FIG. 23(b), the second joint pin 10d fits in the cam portion 9f, and slides to the end portion in the B-direction of the second tray 4. Since this cam portion 9f is bent in the F-direction, with the movement of the second tray 4 in the A-direction, the inner wall on the E-direction side of the cam portion 9f pushes the second joint pin 10d in the F-direction. As a result, the first joint pin 10c slides along the first guide portion 8a in the E-direction, and thus the first contact piece 10g is made in contact with the second joint arm 21d of the first switching lever 21, thereby rotating the first switching lever 21 in the J-direction.

When the first switching lever 21 pivots in the J-direction in the described manner, the second pressing section $21b_2$ of the switch contact arm 21b move the position of the movable piece 26a so as to come in contact with the second contact 26c. When the first switch 26 is set in the ON position by making the movable piece 26a in contact with the second contact 26c, the control section recognizes that opening operation of the second tray 4 has been completed by detecting that the second tray reaches the unloading position. Based on this recognition, the control section stops the drive source such as a motor, etc., and the rotation of the tray gear member 16 stops, and each section is held in its stoppage position. In this state, the CD on the second tray 4 can be exchanged with another CD.

Additionally, when the second joint pin 10d reaches the end portion in the B-direction of the cam portion 9f, as shown in FIG. 23(a), the second tray 4 is moved to the front limit position in the A-direction. Additionally, as shown in FIG. 23(c), since the release hole 10i is formed in a vicinity of the first contact piece 10g in the rack member 10, even if the first switching lever 21 pivots in the J-direction, the leading end of the first joint arm 21c can be released in the A-direction through the release hole 10i.

FIG. 2 shows an appearance of the CD radio cassette unit 2 in the state where the first tray 3 is in the unloading state. FIG. 3 shows an appearance of the disk reproducing device 1 in the state where the second tray 4 is in the unloading state. In the respective unloading states of the trays 3 and 4, the CDs can be accommodated in respective disk placement parts 3a and 4a, and the CDs 5 accommodated in the disk placement parts 3a and 4a can be exchanged for other CDs.

[Tray Closing Operation]

Next, a closing operation of the second tray 4 for setting it back from the unloading position to the loading position will be explained.

When the tray gear member 16 pivots in the J-direction in an opposite direction to the opening operation from the state shown in FIGS. 23(a) through (c), as shown in FIG. 25(a), the tray rack 4e is driven back in the B-direction by the rotation of the upper gear 16a in the J-direction. As a result, as shown in FIG. 24(b) and FIG. 25(b), the second joint pin 10d is moved from the cam portion 9f to the fourth guide portion 9e. Here, by the bent shape of the cam portion 9f, the second joint pin 10d is moved back in the E-direction. With this movement, since the first contact piece 10g in contact with the second joint arm 21d is moved back in the F-direction, and is separated from the second joint arm 21d and becomes apart from the second joint arm 21d. As a result, the first switching lever 21 is moved back to the neutral position by the restoring force exerted from the spring 24. As a result, the first switch 26 is switched OFF.

Furthermore, when the tray gear member 16 pivots in the J-direction, as shown in FIGS. 26(a) and (b), the tray rack 4e is moved back in the B-direction, and the second joint pin 10d slides the fourth guide portion 9e relatively in the A-direction, and reaches a boundary between the fourth guide portion 9e and the contact portion 9d. As in the opening operation of the second tray 4, since the rack drive gear 19 is disengaged from the rack portion 10a while the second joint pin 10d is positioned at the second guide portion 9e and the cam portion 9f, as shown in FIG. 25(c) and FIG. 26(c), the reproducing unit 29 and the rack member 10 are kept in their stoppage position.

When the second joint pin 10d reaches the boundary between the fourth guide portion 9e and the contact portion 9d by further rotating the tray gear member 16 in the J-direction, as shown in FIG. 27(b), the second joint pin 10d slides the contact portion 9d to the third guide portion 9c. As a result, as also shown in FIG. 27(a), the second tray 4 is further moved back in the B-direction, and the second joint pin 10d of the rack portion 10a is biased to the E-direction, as shown in FIG. 27(c), thereby restarting the engagement between the first tooth on the second joint pin 10d side of the rack portion 10a and the rack drive gear 19.

The upper gear 16a is disengaged from the tray rack 4e before the second joint pin 10d which slides along the contact portion 9d reaches the third guide portion 9c. Therefore, after the disengagement, the rack portion 10a is driven in the E-direction by the rack drive gear 19. This, in turn, makes the second joint pin 10d pushes the contact portion 9d in the B-direction and further move the second tray 4 backward in the B-direction.

Then, as shown in FIG. 28(b), when the second joint pin 10d fits in the third guide portion 9c from the contact portion 9d, the second tray 4 is moved back to the loading position, thereby completing the closing operation of the second tray 4.

While the second joint pin 10 is sliding at the contact portion 9d, as shown in FIG. 27(c) and FIG. 28(c), the support bar 30b relatively moves the first cam 11c in the F-direction. In this state, however, as the reproducing unit 29 is kept in its horizontal reproducible position, the reproducing operation from the CD can be continued as already explained.

Figure 29A:
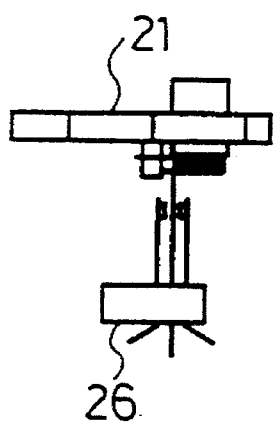
Figure 29B:
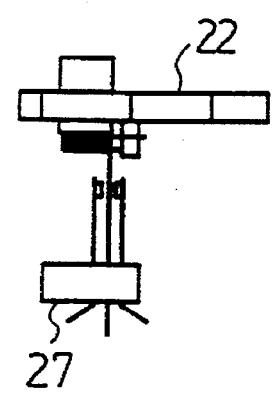
Figure 30:
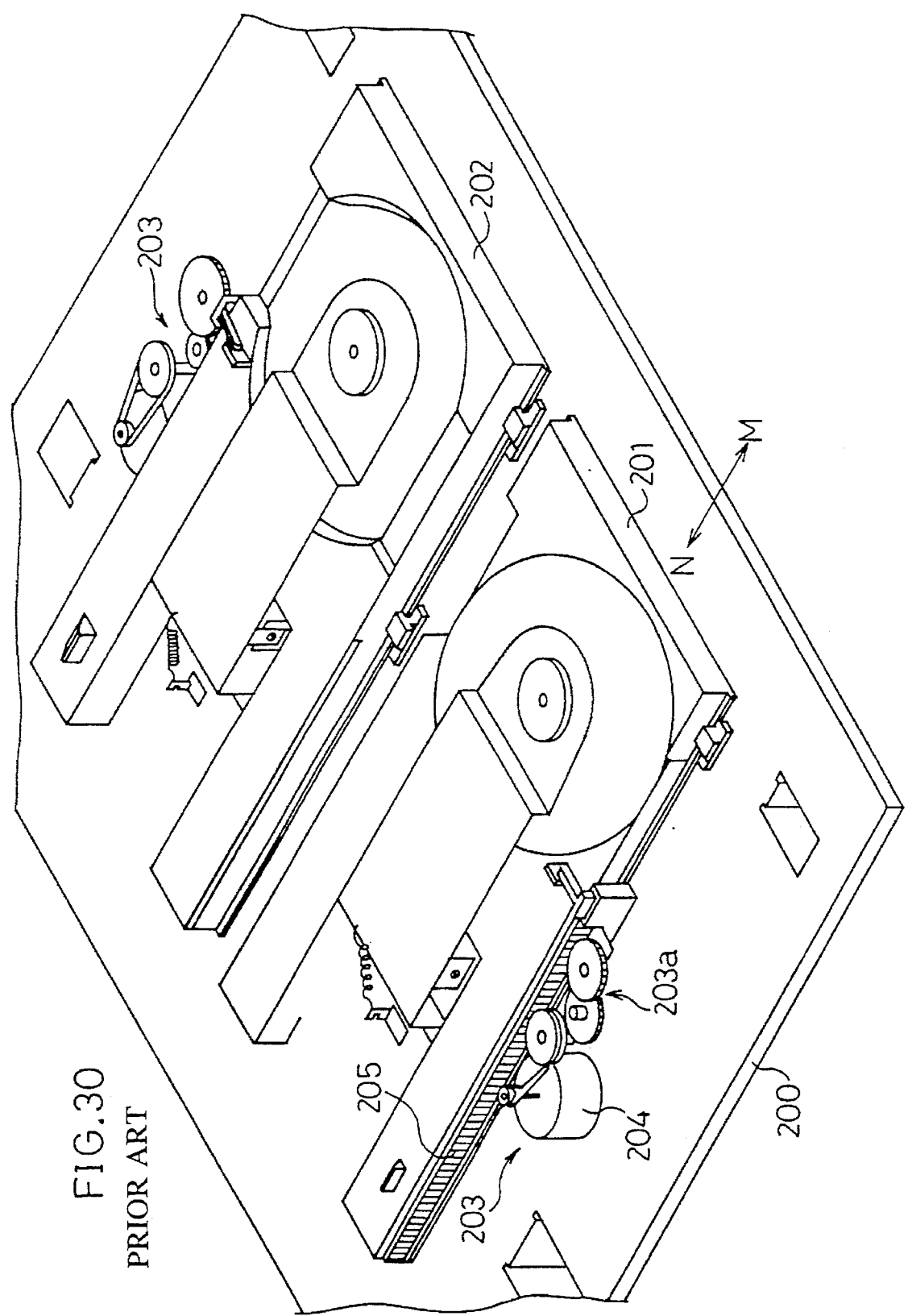
FIG. 30 is a perspective view illustrating one example of the conventional disk reproducing device.
Figure 31:
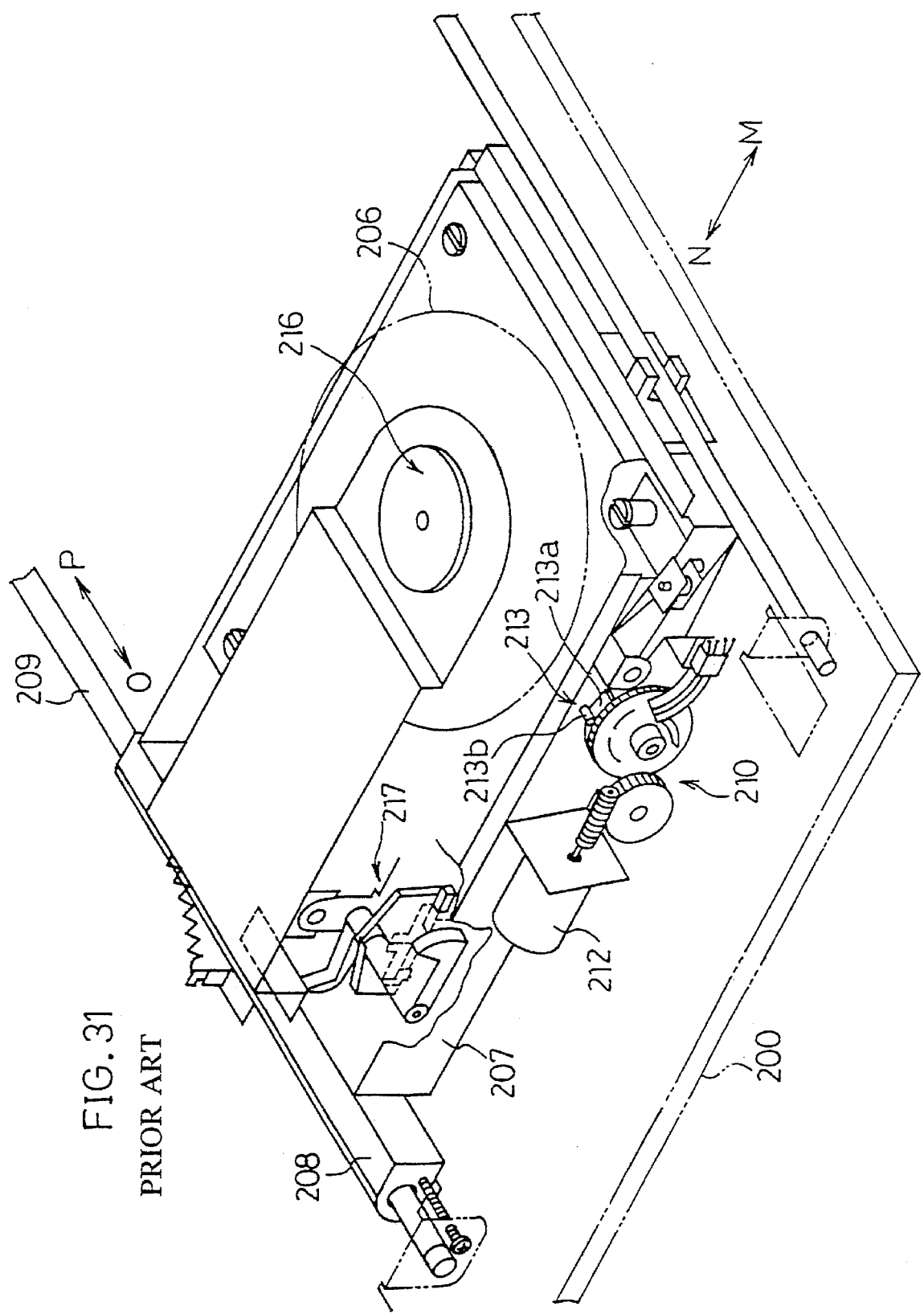
FIG. 31 is a perspective view showing the configuration of the cut portion of the reproduction drive unit equipped with the disk reproducing device shown in FIG. 30
Figure 32:
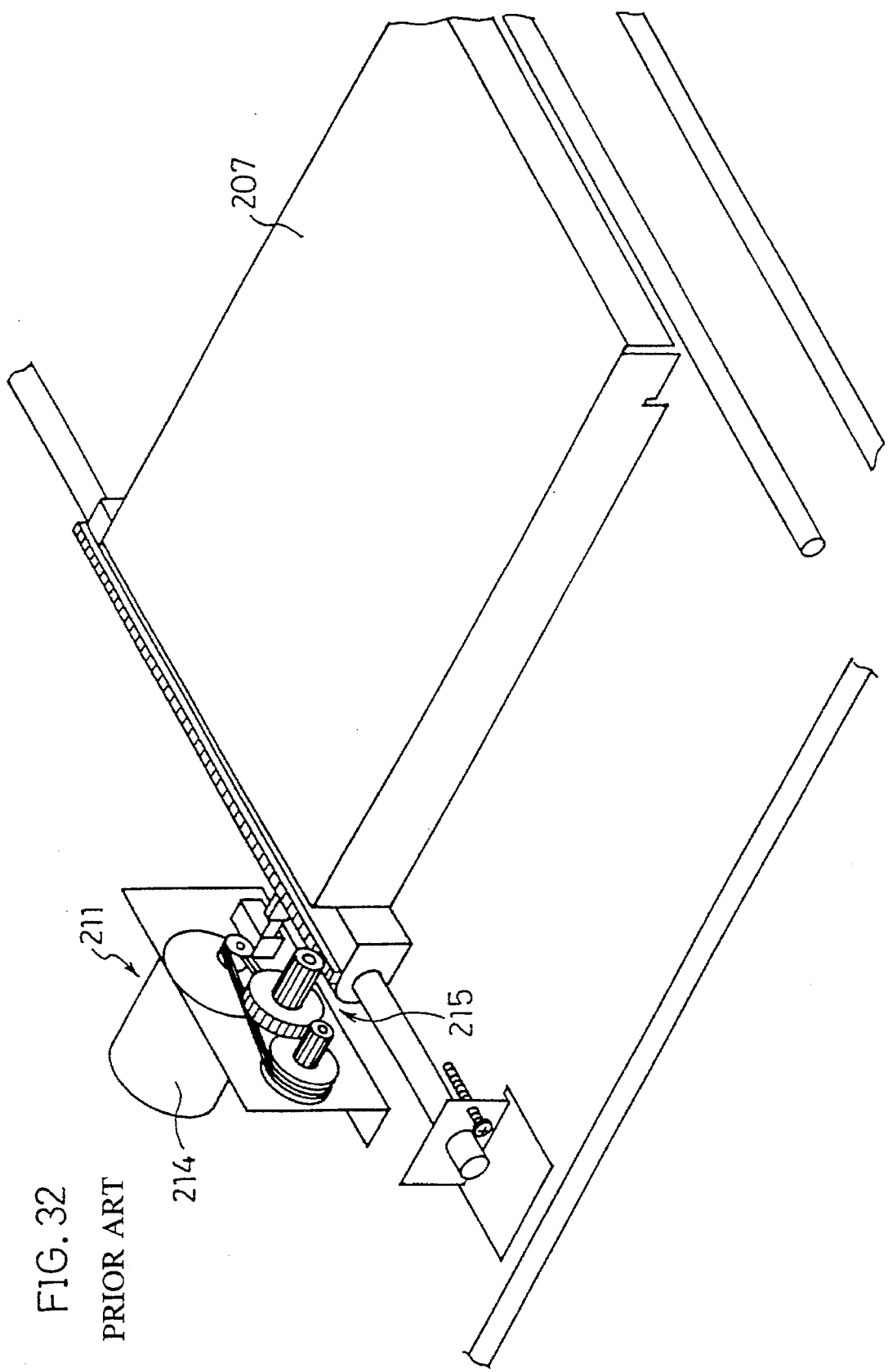
FIG. 32 is a perspective view of the slide drive unit for sliding the reproduction drive portion shown in FIG. 31 taken from the bottom side of the reproduction drive portion.
Figure 33:
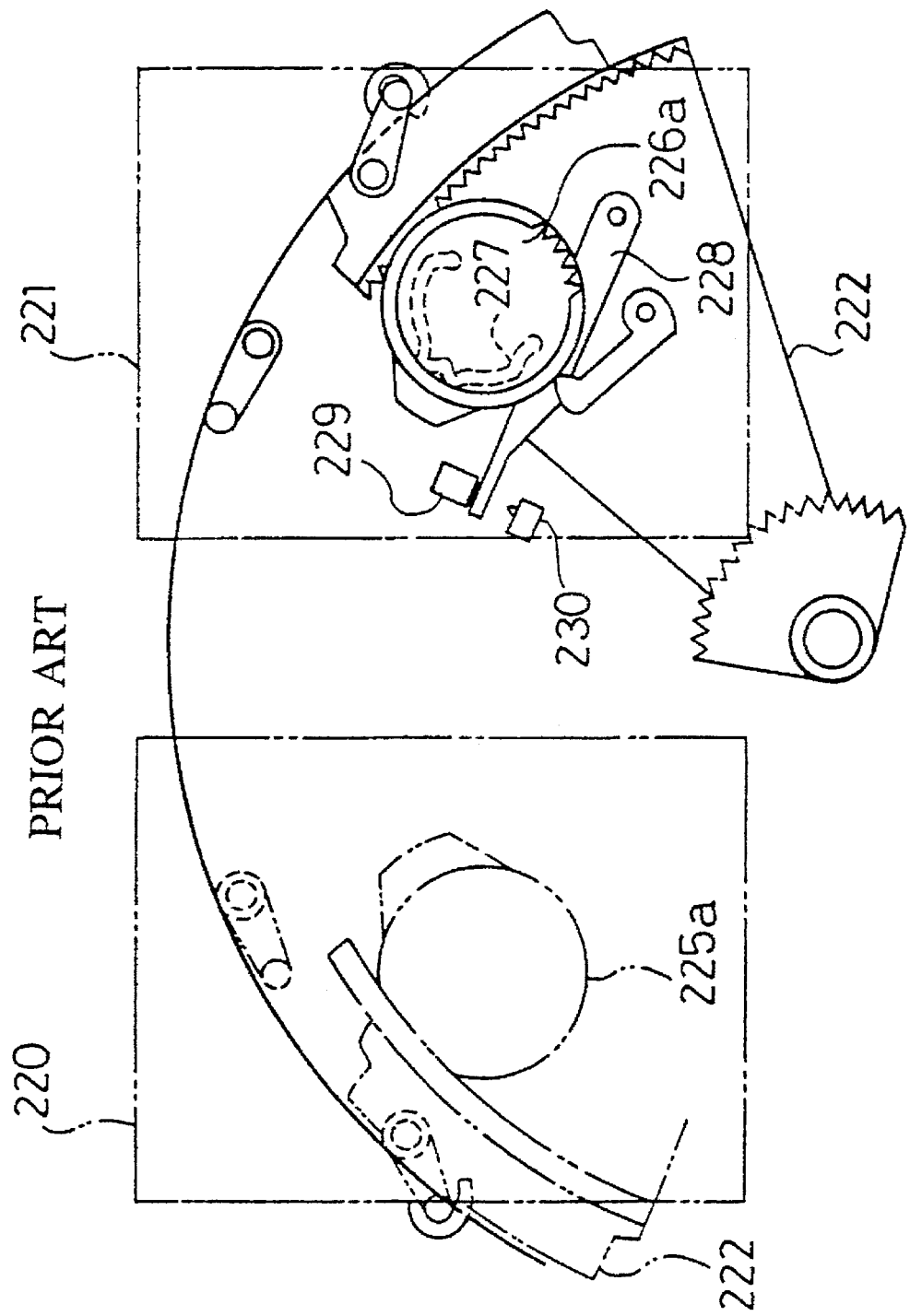
FIG. 33 is a plan view showing the configuration of another conventional disk reproducing device.
Figure 34:
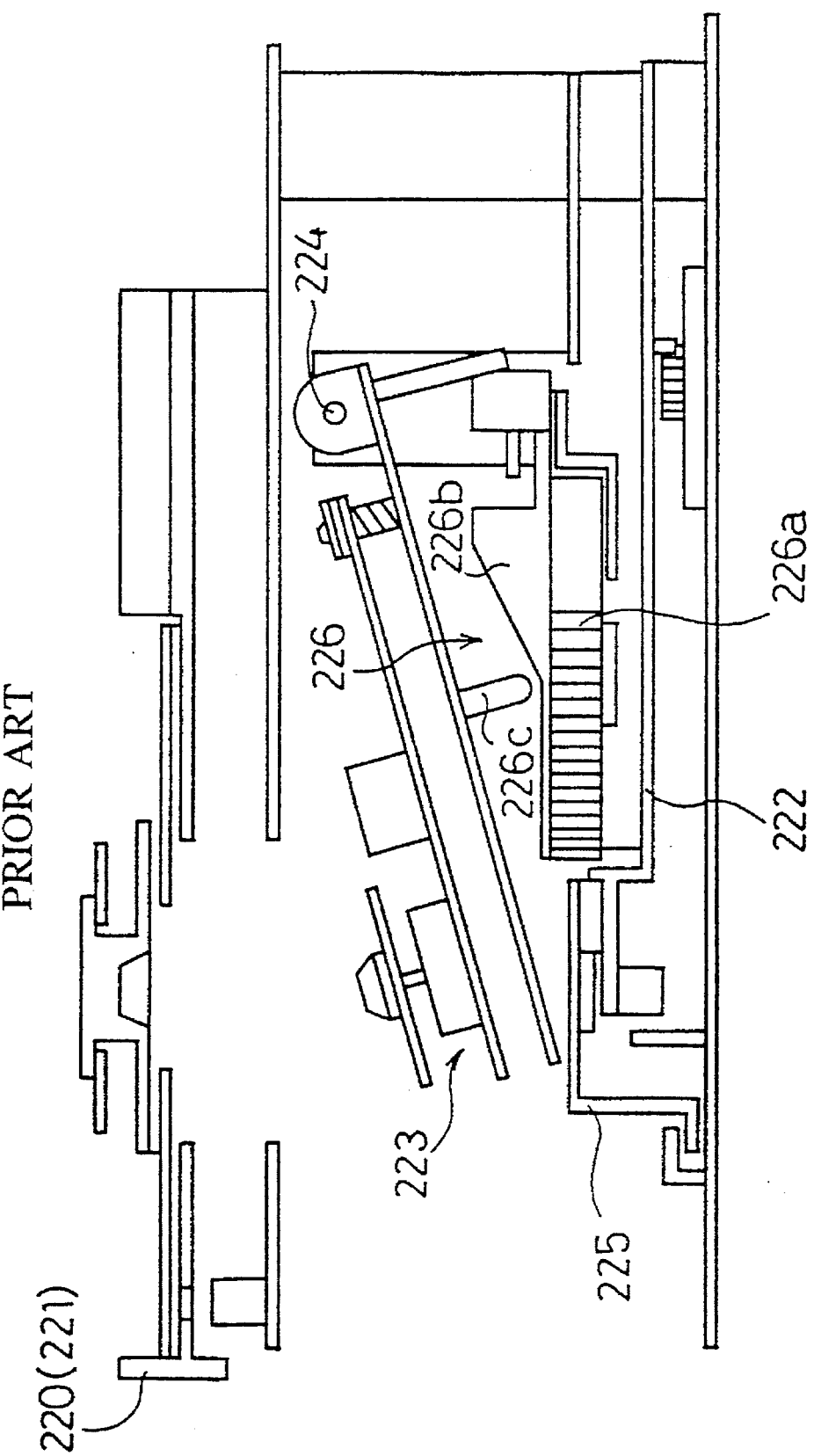
FIG. 34 is a side view showing the disk reproducing unit shown in FIG. 33.

Additionally, while the second joint pin 10d is sliding at the contact portion 9d, the first contact piece 10g slides between the second joint arm 21d and the first joint arm 21c of the first switching lever 21 in the F-direction. Therefore, as shown in FIGS. 29(a) and (b), not only the second switch 27, but also the first switch 26 is in the OFF position as the first switching lever 21 is in an neutral position.

Thereafter, by further rotating the tray gear member 16 in the J-direction, the second joint pin 10d slides in the third guide portion 9c in the E-direction, and the first joint pin 10c slides in the first guide portion 8a in the F-direction. As a result, as already explained in reference to FIGS. 4(a) through (c), the reproducible state of the reproducing unit 29 with respect to the first tray 3 is detected based on the ON state of the first switch 26. Based on the detection of the reproducible state of the reproducing unit 29 with respect to the first tray 3, the control section recognizes that the second tray 4 has been moved to the loading position, thereby stopping the drive source such as a motor, etc.

By the described operations, while reproducing information from the CD on the first tray 3, the CD on the second tray 4 can be exchanged for another disk.

Similarly, while reproducing from the CD on the second tray 4 (maintaining the state shown in FIGS. 18(a) through (c)), the CD on the first tray 3 can be exchanged for another disk by rotating the tray gear member 16 in the I-direction, i.e., the opposite direction to the J-direction. The detailed operations will be the same since members in the disk reproducing device 1 are symmetrically placed about a plane including the rib plate 7b of the disk pushing plate 7. However, the completion of the opening operation of the first tray 3 is detected based on the ON-position of the second switch 27 by the contact between the movable piece 27a and the second contact 27c.

[Summary of the Detection of Each Operation State]

The correlation among the reproducible state of the reproducing unit 29, the unloading/loading state of each tray 3, 4, and the respective ON-positions of the switches 26 and 27 are summarized below.

(1) The detection of the reproducible state of the reproducing unit 29 with respect to the first tray 3(FIG. 4(a)).

The first contact 26b of the first switch 26 is switched ON (FIG. 6(a)).

(2) The detection of the reproducible state of the reproducing unit 29 with respect to the second tray 4 (FIG. 18(b)).

The first contact 27b of the second switch 27 is switched ON (FIG. 18(c)).

(3) The unloading state of the first tray 3 (FIG. 2)

The second contact 27c of the second switch 27 is switched ON (not shown in figure).

(4) The unloading state of the second tray 4 (FIG. 23(a))

The second contact 26c of the first switch 26 is switched ON (FIG. 24).

As previously described, the control section recognizes the loading state of the first tray 3 based on (2), while recognizes the loading state of the second tray 4 based on (1).

As described, in the disk reproducing device 1 of the present embodiment, the positions of the slit-like cam portion 11 formed on the band-like rack member 10 and the guide slit 25 formed in a U-shape on the housing 6 are adjusted so as to fit the support bar 30b of the holding chassis 30 in both the cam portion 11 and the slit 25. Then, only by fitting the rack member 10 in the guide groove 8 and 9 formed on the back surface of each tray 3, 4 so as to reciprocate the rack member 10 between the trays 3 and 4, the reproducing unit 29 at the reproducible position of the tray 3 or 4 can be lowered for moving it to the other tray, and in the other one of the tray 3 or 4, can be raised to set in the reproducible state.

By the molding process, the rack member 10 and the cam portion 11 can be integrally formed. Moreover, the guide slit 25 and the housing 6 can be also integrated. This permits a special cam mechanism for transforming the rotations of the tray gear member 16 to the up-and-down movement or the horizontal movement of the reproducing unit 29 to be eliminated, thereby manufacturing the disk reproducing unit 1 at a low cost.

Additionally, since the rack member 10 made of a flexible material is adopted, the rack member 10 can be stored in the rack storage groove 15 of the housing 6 by bending the both ends thereof, and the rack member 10 can be moved on the housing 6 in such a manner that at least a part of a moving stroke thereof draws a bent line. As a result, while ensuring the moving stroke of the rack member 10 required for reciprocating the reproducing unit 29 between the trays 3 and 4, the width of the housing 6 can be set slightly larger than the sum of the width of each tray 3 and 4, thereby enabling the disk reproducible device 1 to be made smaller in size.

It is also arranged such that the rotations of the single tray gear member 16 are transmitted to both the rack drive gear 19 for driving the rack member 10a of the rack member 10 and to the tray racks 3e and 4e formed on the side face of each tray 3 and 4. Moreover, when engaging the rack portion 10a with the rack drive gear 19, only with the reciprocating movement of the rack member 10 between the trays 3 and 4, the upper gear 16a of the tray gear member 16 is disengaged from the tray racks 3e, 4e, while when the tray rack 3e or 4e is engaged with the upper gear 16a. To achieve this, the shape of the guide groove 8, 9 formed on the back surface of each tray 3, 4 is devised.

According to the described arrangement, it is not necessarily to independently provide drive sources for the rack member 10 and each tray 3, 4, and the control circuit, for adjusting the drive timing that would be required when the drive sources are separately provided. Since the transforming between the up-and-down movement and the horizontal movement of the reproducing unit 29 is achieved by the change in shape of the continuous slit in the cam portion 11 and the guide slit 25, this transformation can be made accurately with a simple arrangement compared with the switch control by the control circuit.

Similarly, the engagement between the rack member 10 and the rack drive gear 19 and the engagement between the tray rack 3e, 4e and the upper gear 16a can be switched by a change in shape of the continuous groove in the guide grooves 8 and 9. As a result, only by engaging the first joint pin 10c and the second joint pin 10d of the rack member 10 in the guide groove 8, 9 to reciprocate the rack member 10 between the trays 3 and 4, the up-and-down movement and the horizontal movement of the reproducing unit 29 and the opening and closing movement of each tray 3 or 4 is transformable.

When the rack member 10 is in mesh with the rack drive gear 19, and the reproducing unit 29 is in a reproducible state with respect to the tray 3 or 4, one of the first joint pin 10c and the second joint pin 10d is moved away from the deformed portion of the guide groove 8 or 9, i.e., a contact portion 8d or 9d, and thus the incorrect opening operation of the tray in the reproducible state cannot be performed.

Furthermore, since the loading position of each tray 3 or 4 is held by the engagement between the rack member 10 and the tray 3 or 4, a special mechanism is not needed.

The first oblique cam 11b and the second oblique cam 11d of the cam portion 11 respectively serve as the elevator cam portion for raising the reproducing unit 29. Moreover, the respective lower end portions of the first oblique cam 11b and the second oblique cam 11d serve as the joint portion for moving the reproducing unit 29 between the respective retreat positions. As a result, the reproducing unit 29 performs a sliding movement in link with the elevator cam portion and the joint portion successively. As a result, the switching the movement between reproducible position and retreat position and movement between retreat positions can be performed with a simple mechanism. Furthermore, only by switching the engagement between the reproducing unit 29 and the elevator cam portion to the engagement between the reproducing unit 29 and the joint portion, the switching the movement between the reproducible position and retreat position and the movement between respective retreat positions can be performed at an accurate timing.

Additionally, by driving the rack member 10 having formed thereon the rack portion 10a by the drive gear 19, the driving mechanism of the rack member 10 can be simplified. Furthermore, by forming the cam portion 11 in the rack member 10, a significant reduction in manufacturing cost of the moving mechanism of the reproducing unit 29 can be achieved.

The first contact piece 10g and the second contact piece 10h are formed on the rack member 10 so as to be integrally moved therewith, thereby switching the first switch 26 and the second switch 27. This eliminates a special drive mechanism for driving the first contact piece 10g and the second contact piece 10h. In addition, since the first contact piece 10g, the second contact piece 10h and the rack member 10 are integrally formed, it is not necessarily to increase in the number of the components for the first contact piece 10g and the second contact piece 10h.

Furthermore, both a timing at which the reproducing unit 29 is set in the reproducible position by the rack member 10 and a timing at which the first switch 26 and the second switch 27 are switched respectively by the first contact piece 10g and the second contact piece 10h can be adjusted by setting the placement positions of the contact pieces 10g and 10h of the rack member 10. Therefore, the reproducible position of the reproducing unit 29 can be detected at timing of an improved accuracy with a simple mechanism at low cost.

By fitting the support bar 30b of the reproducing unit in the cam portion 11 through the guide slit 25 formed on the wall of the housing 6, and by the force exerted on the support bar 30b from the cam portion 11, the support bar 30b can be moved along the guide slit 25. Furthermore, extension lines of the first vertical slit 25a and the second vertical slit 25e are orthogonal to the extension line of the horizontal slit 25c, and since both the vertical slits 25a and 25e are connected to the horizontal slit 25c through the first oblique slit 25b and the second oblique slit 25d, the movement of the support bar 30b in the guide slit 25 can be smoothly performed.

Therefore, even if the disk reproducing device is used by placing it upside down, for example, the problem that the support bar 30b cannot be moved from the first vertical slit 25a to the horizontal slit 25c which may cause the support bar 30b to inversely move along the first vertical slit 25a can be avoided.

As described, with the simple arrangement where the guide slit 25 is formed on the wall of the housing 6, and oblique slits 25b and 25d are formed in the guide slit 25, the disk reproducing device which offers an excellent operability without an operation error irrespectively of the position in use can be provided.

Additionally, since the contact portions 8d, 9d which mate with the rack member 10 are included as the reciprocating cam portion, for example, the movement of the rack member 10 for moving the reproducing unit 29 to the reproducible position of the first tray 3 is converted in the forward movement to the unloading position of the second tray 4 by the contact piece 9d. As a result, since the upper gear 16a becomes in mesh with the tray rack 4e, the drive force of the tray gear member 16 is transmitted to the tray rack 4e through the upper gear 16a, thereby further driving the second tray 4 to unloading position.

Since this forward movement of the second tray 4 is transformed to the movement of the rack member 10 to the first tray 3 by the operation of the contact portion 9d, the rack drive gear 19 becomes disengaged from the rack portion 10a. This, in turn, stops the movement of the rack member 10, the reproducing unit 29 is maintained at a reproducible position with respect to the first tray 3. In this state, the engagement between the upper gear 16a and the tray rack 4e is maintained, and thus the second tray 4 can reciprocate while keeping the reproducing unit 29 at the reproducible position of the first tray 3. Namely, while maintaining one of the tray at a reproducible state, the disk on the other tray can be exchanged for another disk.

On the other hand, the backward movement of the second tray 4 to the loading position is transformed to the movement of the rack member 10 in an inverse direction by the operation of the contact portion 9d. As a result, the rack drive gear 19 becomes in mesh with the rack portion 10a again, thereby further moving the rack member 10. Here, since the rack drive gear 19 is inversely driven by the tray gear 16 from the described case, the rack member is still moved. When this movement is transformed to the movement of the second tray 4 in the backward direction by the contact portion 9d, the upper gear 16a becomes disengaged from the tray rack 4e. As a result, since the drive force of the tray gear member 16 transmitted to the second tray 4 is shut off, the second tray 4 is maintained at its loading position.

As described, since the contact portions 8d and 9d are respectively formed on the trays 3 and 4, for engaging and disengaging the upper gear 16a from the tray rack 4e, and also for engaging the rack drive gear 19 with the rack portion 10a and cancelling them, a special mechanism is not needed.

Furthermore, a simplified transmission mechanism is adopted for switching the movement of the tray rack and the contact portion rack member 10 to the reciprocating movement of the tray 3 or 4. This offers an improved accuracy in switching the timing of the movement of the rack member 10 and the reciprocating movement of the trays 3 and 4.

The guide grooves 8 and 9 formed on the trays 3 and 4 respectively include the third guide portions 8c and 9c as the moving member guide groove for guiding the movement of the rack member 10.

In this arrangement, the rack member 10 is moved in the direction from one tray to the other tray, and thus in order to enable such movement of the rack member 10, the third guide portions 8c and 9c are formed along the line from one tray to the other tray. Namely, the third guide portions 8c and 9c are formed in a direction crossing the direction of the reciprocating movement of the trays 3 and 4 between the loading position and the unloading position.

Therefore, when the rack member 10 is moved from the second tray 4 to the first tray 3 so as to place, for example, the reproducing unit 29 to the reproducible position of the first tray 3, the second joint pin 10d slides along the third guide portion 9c of the first tray 4 at least to the position where it comes in contact with the contact portion 9d. As a result, while moving the reproducing unit 29 from the second tray 4 to the first tray 3, and while the reproducing unit 29 is held at the reproducible position of the first tray 3, since the second joint pin 10d is at the third guide portion 9c, the second joint pin 10d can prevent the reciprocating movement of the second tray 4 which is not set in the reproducible state.

As described, a special mechanism for maintaining the holding position of the tray in non-reproduction is not needed, and a disk reproducing device having a tray lock mechanism with an inexpensive simple structure can be achieved.

Additionally, the trays 3 and 4 respectively provided with the stoppers 8h and 9h for preventing the tray 3, 4 from being moved to the unloading position by contacting the main body of the rack member 10 when the reproducing unit 29 is at the reproducing position of the tray 3 or 4.

In the described arrangement, when the reproducing unit 29 is at the reproducible position of the first tray 3, the reproducible position of the first tray 3 can be maintained by the rack member 10 while maintaining the second tray 4 in the position at which a reciprocating movement between the loading position and the unloading position is permitted. Similarly, while the reproducing unit 29 is at the reproducible position of the second tray 4, the reproducible state of the second tray 4 can be maintained by the rack member 10.

Since this eliminates the locking mechanism for holding the reproducible state of the tray 3 or 4 to be newly provided, a disk reproducing device with a simplified structure without an operation error can be provided at low cost.

The first contact piece 10g and the second contact piece 10h for switching ON/OFF the first switch 26 and the second switch 27 which are formed on the housing 6 and the first joint pin 10c and the second joint pin 10d are integrally formed on the rack member 10.

As a result, upon detecting the reproducible state of the reproducing unit 29 with respect to the first tray 3, the timing at which the second joint pin 10d approximates to the contact portion 9d and the timing at which the first joint pin 10c approximates to the contact portion 8d upon detecting the reproducible state of the reproducing unit 29 with respect to the second tray 4 can be easily set by adjusting the respective positions of the first joint pin 10c and the first contact piece 10g or by adjusting the respective positions of the second joint pin 10d and the second contact piece 10h of the rack member 10. Therefore, after moving the reproducing unit 29 at the reproducing position, the tray which is not in use can reciprocate between the loading position and the unloading position with a simple structure smoothly and accurately; in the meantime, each tray can be surely held at a predetermined position.

As described, the disk reproducing unit 1 of the present embodiment can ensure an accurate switching of each operation with a simple and inexpensive mechanism, thereby achieving a still improved cost performance of the disk reproducing device 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A disk reproducing device, comprising:

a reproducing unit for reproducing information recorded on a disk;

first and second trays mounted on a housing so as to be aligned in parallel to one another, said first and second trays arranged so as to reciprocate between an unloading position at which said disk is detachable and a loading position at which information can be reproduced from said disk;

a moving member arranged so as to reciprocate between said first tray and said second tray;

a moving cam for moving said reproducing unit by being linked with said moving member which moves from one of said first and second trays to the other of said first and second trays, said moving cam moving said reproducing unit from a reproducible position at which information can be reproduced from a selected disk accommodated in one of said first and second trays to a retreat position which is apart from a recording surface of the selected disk in a substantially vertical direction, said moving cam further moving said reproducing unit to a retreat position of the other of said first and second trays and to its reproducible position; and drive means for driving the other of said first and second trays to reciprocate between its loading position and its unloading position when said reproducing unit is at the reproducible position with respect to one of said first and second trays, wherein a reciprocating movement of the other of said first and second trays by said drive means is guided by an engagement with said moving member, and said drive means also serves as a drive source for said moving member.

2. The disk reproducing device as set forth in claim 1, further comprising:

a drive gear for transforming a drive force generated from said drive means to said moving member, wherein said moving member includes said moving cam and a rack in mesh with said drive gear, said rack arranged to move parallel to a moving direction of said reproducing unit;

said moving cam includes:

an elevator cam portion for substantially vertically moving said reproducing unit by applying thereto a component force exerted in a substantially vertical direction to said reproducing unit with a movement of said rack, a joint portion for moving said reproducing unit between respective retreat positions, and said reproducing unit is continuously engaged with said elevator cam portion and said joint portion with a movement of said rack.

3. The disk reproducing device as set forth in claim 2, wherein:

said moving member is made of a flexible material.

4. The disk reproducing device as set forth in claim 2, further comprising:

a first switch for detecting that said reproducing unit is at a reproducible position with respect to said first tray and in a reproducible state; and a second switch for detecting that said reproducing unit is in a reproducible position with respect to said second tray and in a reproducible state, said first and second switches being mounted on said housing, wherein said moving member includes:

a first switching member for switching ON/OFF said first switch based on a movement of said moving member, and a second switching member for switching ON/OFF said second switch based on the movement of said moving member.

5. The disk reproducing device as set forth in claim 4, wherein:

said first switch and said second switch are two-circuit two-contact switches.

6. The disk reproducing device as set forth in claim 2, wherein:

said reproducing unit includes a joint pin formed thereon so as to be projected, said housing includes a wall for separating said moving member from said reproducing unit said joint pin is inserted in said moving cam so as to be engaged with said moving cam of said moving member, a guide slit for guiding a movement of the joint pin by said moving cam is formed on said wall, said guide slit which is formed in an almost U-shape is composed of a first vertical guide slit for guiding a movement of said joint pin by said elevator cam portion in the substantially vertical direction to said first tray, a second vertical guide slit for guiding a movement of said joint pin by said elevator cam portion in the substantially vertical direction to said second tray, and a horizontal guide slit for guiding a movement of said joint pin by said joint portion between said respective retreat positions, and said first vertical guide slit and said horizontal guide slit are connected via a first oblique slit, and said second vertical guide slit and said horizontal guide slit are connected via a second oblique slit, said first and second oblique slits being formed at angled positions with respect to both the substantially vertical direction and a moving direction of said joint pin between said respective retreat positions.

7. The disk reproducing device as set forth in claim 2, wherein:

said first tray includes a stopping member formed thereon for preventing said first tray from being moved to its unloading position by contacting a main body of said moving member when said reproducing unit is in the reproducible position with respect to said first tray, and said second tray includes a stopping member formed thereon for preventing said second tray from being moved to its unloading position by contacting the main body of said moving member when said reproducing unit is in the reproducible position with respect to said second tray.

8. The disk reproducing device as set forth in claim 2, wherein:

said drive means includes a drive source gear in mesh with said drive gear;

said first and second trays respectively include tray racks formed thereon which are in mesh with said drive source gear; and when said reproducing unit is in the reproducible position with respect to one of said first and second trays, said drive source gear is in mesh with said tray rack of the other of said first and second trays.

9. The disk reproducing device as set forth in claim 8, wherein:

said tray racks are formed on respective side surfaces facing one another of said first and second trays.

10. The disk reproducing device as set forth in claim 8, wherein:

reciprocating cam portions are respectively formed on said first and second trays so as to maintain the engagement with said moving member, said reciprocating cam portions transforming the movement of said moving member in a first direction (F) towards one of said first and second trays to the movement of the other of said first and second trays in a forward direction (A) from its loading position to its unloading position, and transforming the movement of said moving member in a second direction (E) which is a reverse direction of said first direction (F) to the movement of the other of said first and second trays in a backward direction (B) from its unloading position to its loading position, and with the movement of said moving member for moving said reproducing unit to the reproducing position of one of said first and second trays, one of said reciprocating cam portions engages said drive gear with a tray rack for the other of said first and second trays and subsequently disengages said drive gear from said rack of said moving member, while with the movement of the other of said first and second trays in the backward direction (B), one of said reciprocating cam portions engages said drive gear with said rack of said moving member and subsequently disengages said drive source gear from the tray rack for the other of said first and second trays.

11. The disk reproducing device as set forth in claim 10, wherein:

said tray racks are not formed on respective end portions in the forward direction and end portions in the backward direction (B) of said first and second trays, said rack of said moving member is not formed on an end portion on a first tray side and an end portion on a second tray side of said moving member, and said drive source gear is positioned in a clearance formed between said first and second trays at the end portion in the forward direction (A).

12. The disk reproducing device as set forth in claim 8, wherein:

said moving member includes a first joint member formed at an end portion on a first tray side of said moving member and a second joint member formed at an end portion on a second tray side of said moving member a first guide groove along which said first joint member slides while being in mesh therewith is formed on said first tray;

a second guide groove along which said second joint member slides while being in mesh therewith is formed on said second tray;

said first guide groove includes a first reciprocating cam portion for engaging said drive source gear with said tray rack of said first tray and disengaging said rack of said moving member from said drive gear at the end portion on the first tray side of said moving member by transforming the reciprocating movement of said moving member between said first and second trays to a reciprocating movement of said first tray, and said second guide groove includes a second reciprocating cam portion for engaging said drive source gear with said tray rack of said second tray and disengaging said rack of said moving member from said drive gear at an end portion on the second tray side of said moving member by transforming the reciprocating movement of said moving member between said first and second trays to a reciprocating movement of said second tray.

13. The disk reproducing device as set forth in claim 12, wherein:

said first guide groove includes a first lateral groove portion extending in a direction parallel to the first direction (F) from said second tray to said first tray and a first longitudinal groove portion extending in a direction orthogonal to said first lateral groove portion, said first reciprocating cam portion connects said first lateral groove portion and said first longitudinal groove portion so as to form an angle of 45 degrees respectively with respect to said first lateral groove portion and said first longitudinal groove portion, said second guide groove includes a second lateral groove portion extending in a direction parallel to the second direction (E) from said first tray to said second tray and a second longitudinal groove portion extending in a direction orthogonal to said second lateral groove portion, and said second reciprocating cam portion connects said second lateral groove portion and the second longitudinal groove portion so as to form an angle of 45 degrees with respect to said second lateral groove portion and said second longitudinal groove portion.

14. The disk reproducing device as set forth in claim 13, wherein said first guide groove further includes:

a first circular arc groove which is formed in a circular arc shape extending so as to turn to a third direction (A) from the end portion in the first direction (F) of said first lateral groove portion, to turn back in the second direction (E), said third direction (A) being defined as a direction from the loading position to the unloading position of one of said first and second trays, and a first guide groove extending from said first circular groove parallel to the second direction (E), and said second guide groove further includes:

a second circular arc groove which is formed in a circular arc shape extending so as to turn to the third direction (A) from the end portion in the second direction (E) of said second lateral groove portion, to turn back in the first direction (F), and a second guide groove extending in a direction parallel to the first direction (F) from said second circular arc groove.

15. The disk reproducing device as set forth in claim 14, wherein:

said moving member is made of a flexible material; and a rack storage groove for storing said moving member is formed on said housing in such a position that said rack storage groove faces said first guide groove and said second guide groove when said first and second trays are in said respective loading positions.

16. The disk reproducing device as set forth in claim 15, wherein said reproducing unit includes:

a first switch for detecting that said reproducing unit is in a reproducible position with respect to said first tray and in a reproducible state, and a second switch for detecting that said reproducing unit is in a reproducible position with respect to said second tray and in a reproducible state, said moving member includes:

a first switching member for switching ON/OFF said first switch when said first joint member of said moving member is in the first guide groove, said first switching member being formed on the end portion of the first tray side of said moving member, and a second switching member for switching ON/OFF said second switch when said second joint member of said moving member is in the second guide groove, said second switching member being formed on the end portion on the second tray side of said moving member.

17. The disk reproducing device as set forth in claim 16, further comprising:

a first switching lever formed in said housing near said first switch so as to be freely rotatable, said first switching lever being energized in a direction of switching OFF said first switch and being pushed by said first switching member to rotate in a direction of switching ON said first switch; and a second switching lever formed in said housing near said second switch so as to be freely rotatable, said second switching lever being energized in a direction of switching OFF said second switch and being pushed by said second switching member to rotate in a direction of switching ON said second switch.

18. The disk reproducing device as set forth in claim 17, wherein said first switch is a two-circuit two-contact switch for detecting that said second tray is moved to its unloading position, and said first switching lever includes:

a first joint arm which is pushed by said first switching member when said first switch detects that said reproducing unit is in the reproducible state with respect to said first tray, and a second joint arm which is pushed by said first switching member when said first switch detects that said second tray is to its unloading position.

19. The disk reproducing device as set forth in claim 17, wherein said second switch is a two-circuit two-contact switch for detecting that said first tray is moved to its unloading position, and
said second switching lever includes:
a first joint arm which is pushed by said second switching member when said second switch detects that said reproducing unit is in a reproducible state with respect to said second tray, and
a second joint arm which is pushed by said second switching member when said second switch detects that said first tray is moved to its unloading position.

20. The disk reproducing device as set forth forth in claim 8, wherein:
said moving member includes said a first joint member formed at an end portion on a first tray side and a second joint member formed at an end portion on a second tray side,
said first tray has a first guide groove formed thereon for sliding therealong said first joint member while being engaged therewith,
said second tray has a second guide groove formed thereon for sliding therealong said second joint member while being engaged therewith,
said first and second guide grooves respectively include:
a first reciprocating cam portion and a second reciprocating cam portion for engaging said drive source gear with said tray racks and disengaging said drive source gear from said tray racks by transforming the reciprocating movement of said moving member between said first and second trays to a reciprocating movement of one of said first and second trays,
said moving cam includes:
a first release portion for holding said reproducing unit in the reproducible position with respect to said first tray during the movement of said moving member from said second tray to said third first tray with a sliding movement of said first joint member at the first reciprocating cam portion, and
a second release portion for holding said reproducing unit in the reproducible position with respect to said second tray during the movement of said moving member from said first tray to said second tray with a sliding movement of said second joint member at the second reciprocating cam portion, and
said first reciprocating cam portion and said second reciprocating cam portion are respectively formed on said first tray and said second tray in such a manner that the second joint member is positioned adjacent to said second reciprocating cam portion when said reproducing unit reaches the reproducible position with respect to said first tray, and that said first joint member is positioned adjacent to said first reciprocating cam portion when said reproducing unit reaches the reproducible position with respect to said second tray.

21. The disk reproducing device as set forth in claim 20, wherein:
said first and second guide grooves respectively include moving member guide grooves for guiding the movement of said moving member.

22. The disk reproducing device as set forth in claim 20, further comprising:

a first switch for detecting that said reproducing unit is in its reproducible position with respect to said first tray and in a reproducible state; and
a second switch for detecting that said reproducing unit is in its reproducible position with respect to said second tray and in a reproducible state, said first and second switches being mounted on said housing,
said moving member includes:
a first switching member formed thereon for switching ON/OFF said first switch by a movement of said moving member, and
a second switching member formed thereon for switching ON/OFF said second switch by a movement of said moving member, and
said first joint member and said first switching member are integrally formed with said moving member, and said second joint member and said second switching member are integrally formed with said moving member.

23. The disk reproducing device as set forth in claim 20, wherein said elevator cam portion includes:
a first elevator cam portion for moving said reproducing unit in a direction substantially vertical to said first tray, and
a second elevator cam portion for moving said reproducing unit in a direction substantially vertical to said second tray.

24. The disk reproducing device as set forth in claim 23, wherein:
a joint pin is formed on said reproducing unit so as to be projected therefrom,
said moving cam is a substantially V-shaped slit formed on said moving member, for fitting therein said joint pin, wherein said moving cam includes:
said joint portion being formed at a bottom of said V-shaped slit,
said first elevator cam portion and said second elevator cam portion being formed in a V-shape on both sides of said joint portion,
said first release portion being formed so as to be connected to said first elevator cam portion, and
said second release portion being formed so as to be connected to said second elevator cam portion.

25. The disk reproducing device as set forth in claim 24, wherein:
said first release portion is formed parallel to a first direction (F), while said second release portion is formed parallel to a second direction (E), wherein the first direction (F) is defined as a direction from said second tray to said first tray, and the second direction (E) is defined as a direction from said first tray to said second tray.

26. The disk reproducing device as set forth in claim 8, wherein:
said drive gear and said drive source gear, respectively, have teeth of a same shape in a same number, and rotate in mutually opposite directions.

27. The disk reproducing device as set forth in claim 8, wherein said housing includes a window portion which is mounted thereon for manually rotating said drive source gear.

28. The disk reproducing device as set forth in claim 1, wherein:
said reproducing unit includes anti-vibration means for absorbing vibrations.

29. A disk reproducing device comprising:

a reproducing unit for reproducing information recorded on a disk;

first and second trays mounted on a housing so as to be aligned in parallel to one another, said first and second trays being capable of reciprocating between an unloading position at which said disk is detachable and a loading position at which information can be reproduced from said disk;

a drive source for generating a drive force;

a drive source gear provided in said drive source;

a drive gear in mesh with said drive source gear; and a rack which is in mesh with said drive gear and is engaged with said reproducing unit, for linearly moving said reproducing unit between a retreat position of said first tray and a retreat position of said second tray, wherein tray racks which are engaged with said drive source gear are respectively formed on said first and second trays, and when said reproducing unit is in a reproducible position with respect to one of said first and second trays, said drive source gear is in mesh with a tray rack of the other of said first and second trays, reciprocating cam portions being engaged with said rack, for transforming a linear movement of said rack from one of said first and second trays to the other of said first and second trays to a said reciprocating movement of one of said first and second trays are respectively formed on said first and second trays, an elevator cam groove for generating a component force in a direction substantially vertical to said reproducing unit is formed on said rack for moving said reproducing unit between the reproducible position for reproducing the information from said disk accommodated in each tray and a retreat position which is apart from a recording surface of said disk in a substantially vertical direction, a holding groove for holding said reproducing unit in the reproducible position with respect to either one of said first and second trays while engaging or disengaging said tray rack formed on the other one of said first and second trays which is not in the reproducible position with or from said drive source gear by activating said reciprocating cam portion using the linear movement of said rack, and said elevator cam groove also serves as a joint portion for linearly moving said reproducing unit.

* * * * *